United States Patent
Haridas et al.

(10) Patent No.: US 11,681,587 B2
(45) Date of Patent: *Jun. 20, 2023

(54) GENERATING COPIES THROUGH INTEROPERABILITY BETWEEN A DATA STORAGE MANAGEMENT SYSTEM AND APPLIANCES FOR DATA STORAGE AND DEDUPLICATION

(71) Applicant: Commvault Systems, Inc., Tinton Falls, NJ (US)

(72) Inventors: Ganesh Haridas, Eatontown, NJ (US); Manoj Kumar Vijayan, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 125 days.

This patent is subject to a terminal disclaimer.

(21) Appl. No.: 17/214,628

(22) Filed: Mar. 26, 2021

(65) Prior Publication Data

US 2021/0216409 A1 Jul. 15, 2021

Related U.S. Application Data

(63) Continuation of application No. 16/201,897, filed on Nov. 27, 2018, now Pat. No. 11,010,258.

(51) Int. Cl.
*G06F 11/14* (2006.01)
*G06F 16/17* (2019.01)
*G06F 16/174* (2019.01)

(52) U.S. Cl.
CPC ...... *G06F 11/1453* (2013.01); *G06F 11/1458* (2013.01); *G06F 16/174* (2019.01); *G06F 2201/84* (2013.01)

(58) Field of Classification Search
CPC ............. G06F 11/1453; G06F 11/1458; G06F 2201/84; G06F 16/174; G06F 16/1744; G06F 16/1752

See application file for complete search history.

(56) References Cited

U.S. PATENT DOCUMENTS 4,084,231 A 4/1978 Capozzi et al.
4,267,568 A 5/1981 Dechant et al.
(Continued)

FOREIGN PATENT DOCUMENTS

EP 0259912 3/1988
EP 0405926 1/1991
(Continued)

OTHER PUBLICATIONS

U.S. Appl. No. 16/201,856 (and its file history), filed Nov. 27, 2018, Haridas et al.

(Continued)

*Primary Examiner* — Hares Jami
(74) *Attorney, Agent, or Firm* — Commvault Systems, Inc.

(57) ABSTRACT

Illustrative storage manager and media agent are enhanced to interoperate with deduplication appliances. Advantages are realized when making secondary and tertiary copies and also when restoring from a deduplication appliance. Tiered indexing minimizes how much data is retained and stored at media agents. Tiered indexing enables media agents to efficiently extract needed information from deduplication appliances to make tertiary copies and to restore backed up copies. Interoperability techniques include media agents generating separate data streams to the deduplication appliance. Each data stream carries a different kind of data, e.g., payload data, metadata content, or high-level index information. On initial backup, the media agent instructs the deduplication appliance to deduplicate the payload data (Continued)

stream but not the other data streams, thus intelligently applying resources to data most likely to benefit from deduplication. For tertiary copies (copies of pre-existing copies at the deduplication appliance), the media agent avoids handling payload data altogether.

20 Claims, 23 Drawing Sheets

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,333,315 A | 7/1994 | Saether et al. |
| 5,347,653 A | 9/1994 | Flynn et al. |
| 5,403,639 A | 4/1995 | Belsan |
| 5,410,700 A | 4/1995 | Fecteau et al. |
| 5,420,996 A | 5/1995 | Aoyagi |
| 5,448,724 A | 9/1995 | Hayashi et al. |
| 5,454,099 A | 9/1995 | Myers et al. |
| 5,491,810 A | 2/1996 | Allen |
| 5,495,607 A | 2/1996 | Pisello et al. |
| 5,499,367 A | 3/1996 | Bamford et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,619,644 A | 4/1997 | Crockett et al. |
| 5,625,793 A | 4/1997 | Mirza |
| 5,638,509 A | 6/1997 | Dunphy et al. |
| 5,642,496 A | 6/1997 | Kanfi |
| 5,673,381 A | 9/1997 | Huai et al. |
| 5,699,361 A | 12/1997 | Ding et al. |
| 5,720,026 A | 2/1998 | Uemura |
| 5,729,743 A | 3/1998 | Squibb |
| 5,732,240 A | 3/1998 | Caccavale |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,765,173 A | 6/1998 | Cane et al. |
| 5,778,395 A | 7/1998 | Whiting et al. |
| 5,790,828 A | 8/1998 | Jost |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,875,478 A | 2/1999 | Blumenau |
| 5,875,481 A | 2/1999 | Ashton |
| 5,878,408 A | 3/1999 | Van Huben |
| 5,887,134 A | 3/1999 | Ebrahim |
| 5,901,327 A | 5/1999 | Ofek |
| 5,907,672 A | 5/1999 | Matze |
| 5,924,102 A | 7/1999 | Perks |
| 5,930,831 A | 7/1999 | Marsh et al. |
| 5,940,833 A | 8/1999 | Benson |
| 5,950,205 A | 9/1999 | Aviani, Jr. |
| 5,956,519 A | 9/1999 | Wise |
| 5,974,563 A | 10/1999 | Beeler, Jr. |
| 5,990,810 A | 11/1999 | Williams |
| 6,021,415 A | 2/2000 | Cannon et al. |
| 6,026,414 A | 2/2000 | Anglin |
| 6,038,379 A | 3/2000 | Fletcher et al. |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,163,856 A | 12/2000 | Dion |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,286,084 B1 | 9/2001 | Wexler et al. |
| 6,289,432 B1 | 9/2001 | Ault et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,353,878 B1 | 3/2002 | Dunham |
| 6,356,801 B1 | 3/2002 | Goodman et al. |
| 6,366,986 B1 | 4/2002 | St. Pierre |
| 6,366,988 B1 | 4/2002 | Skiba |
| 6,374,336 B1 | 4/2002 | Peters |
| 6,389,432 B1 | 5/2002 | Pothapragada et al. |
| 6,397,308 B1 | 5/2002 | Ofek |
| 6,418,478 B1 | 7/2002 | Ignatius et al. |
| 6,421,711 B1 | 7/2002 | Blumenau et al. |
| 6,425,057 B1 | 7/2002 | Cherkasova et al. |
| 6,438,368 B1 | 8/2002 | Phillips |
| 6,487,561 B1 | 11/2002 | Ofek et al. |
| 6,496,850 B1 | 12/2002 | Bowman-Amuah |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,557,030 B1 | 4/2003 | Hoang |
| 6,557,089 B1 | 4/2003 | Reed |
| 6,564,228 B1 | 5/2003 | O'Connor |
| 6,625,623 B1 | 9/2003 | Midgley et al. |
| 6,658,436 B2 | 12/2003 | Oshinsky et al. |
| 6,658,526 B2 | 12/2003 | Nguyen et al. |
| 6,662,198 B2 | 12/2003 | Satyanarayanan |
| 6,665,815 B1 | 12/2003 | Goldstein |
| 6,704,730 B2 | 3/2004 | Moulton et al. |
| 6,721,767 B2 | 4/2004 | De Meno et al. |
| 6,732,125 B1 | 5/2004 | Autry |
| 6,757,794 B2 | 6/2004 | Cabrera et al. |
| 6,760,723 B2 | 7/2004 | Oshinsky et al. |
| 6,760,812 B1 | 7/2004 | Degenaro et al. |
| 6,779,093 B1 | 8/2004 | Gupta |
| 6,789,161 B1 | 9/2004 | Blendermann |
| 6,799,258 B1 | 9/2004 | Linde |
| 6,810,398 B2 | 10/2004 | Moulton |
| 6,823,377 B1 | 11/2004 | Wu et al. |
| 6,865,655 B1 | 3/2005 | Andersen |
| 6,886,020 B1 | 4/2005 | Zahavi |
| 6,912,629 B1 | 6/2005 | West et al. |
| 6,952,758 B2 | 10/2005 | Chron et al. |
| 6,983,351 B2 | 1/2006 | Gibble |
| 7,003,641 B2 | 2/2006 | Prahlad et al. |
| 7,028,096 B1 | 4/2006 | Lee |
| 7,035,880 B1 | 4/2006 | Crescent et al. |
| 7,065,619 B1 | 6/2006 | Zhu et al. |
| 7,082,441 B1 | 7/2006 | Zahavi |
| 7,085,904 B2 | 8/2006 | Mizuno et al. |
| 7,100,089 B1 | 8/2006 | Phelps |

(56) References Cited

U.S. PATENT DOCUMENTS

| | | |
|---|---|---|
| 7,103,617 B2 | 9/2006 | Phatak |
| 7,107,298 B2 | 9/2006 | Prahlad et al. |
| 7,107,395 B1 | 9/2006 | Ofek |
| 7,117,246 B2 | 10/2006 | Christenson et al. |
| 7,130,860 B2 | 10/2006 | Pachet |
| 7,130,970 B2 | 10/2006 | Devassy et al. |
| 7,143,091 B2 | 11/2006 | Charnock |
| 7,155,465 B2 | 12/2006 | Lee |
| 7,155,633 B2 | 12/2006 | Tuma |
| 7,162,496 B2 | 1/2007 | Amarendran et al. |
| 7,174,433 B2 | 2/2007 | Kottomtharayil et al. |
| 7,194,454 B2 | 3/2007 | Hansen |
| 7,197,665 B2 | 3/2007 | Goldstein |
| 7,225,210 B2 | 5/2007 | Guthrie, II |
| 7,243,163 B1 | 7/2007 | Friend et al. |
| 7,246,207 B2 | 7/2007 | Kottomtharayil et al. |
| 7,246,272 B2 | 7/2007 | Cabezas et al. |
| 7,272,606 B2 | 9/2007 | Borthakur et al. |
| 7,284,030 B2 | 10/2007 | Ackaouy et al. |
| 7,287,252 B2 | 10/2007 | Bussiere et al. |
| 7,315,923 B2 | 1/2008 | Retnamma et al. |
| 7,343,356 B2 | 3/2008 | Prahlad |
| 7,343,453 B2 | 3/2008 | Prahlad et al. |
| 7,343,459 B2 | 3/2008 | Prahlad |
| 7,346,751 B2 | 3/2008 | Prahlad |
| 7,383,462 B2 | 6/2008 | Osaki et al. |
| 7,389,311 B1 | 6/2008 | Crescenti et al. |
| 7,395,282 B1 | 7/2008 | Crescenti et al. |
| 7,412,583 B2 | 8/2008 | Burton |
| 7,437,388 B1 | 10/2008 | DeVos |
| 7,440,982 B2 | 10/2008 | Lu et al. |
| 7,454,569 B2 | 11/2008 | Kavuri et al. |
| 7,472,238 B1 | 12/2008 | Gokhale et al. |
| 7,472,242 B1 | 12/2008 | Deshmukh et al. |
| 7,490,207 B2 | 2/2009 | Amarendran et al. |
| 7,500,053 B1 | 3/2009 | Kavuri et al. |
| 7,516,186 B1 | 4/2009 | Borghetti et al. |
| 7,519,726 B2 | 4/2009 | Palliyll et al. |
| 7,529,782 B2 | 5/2009 | Prahlad et al. |
| 7,536,291 B1 | 5/2009 | Vijayan Retnamma et al. |
| 7,539,710 B1 | 5/2009 | Haustein et al. |
| 7,543,125 B2 | 6/2009 | Gokhale |
| 7,546,324 B2 | 6/2009 | Prahlad et al. |
| 7,552,358 B1 | 6/2009 | Asgar-Deen et al. |
| 7,568,080 B2 | 7/2009 | Prahlad et al. |
| 7,574,692 B2 | 8/2009 | Herscu |
| 7,577,806 B2 | 8/2009 | Rowan |
| 7,581,077 B2 | 8/2009 | Ignatius et al. |
| 7,584,338 B1 | 9/2009 | Bricker et al. |
| 7,603,386 B2 | 10/2009 | Amarendran et al. |
| 7,606,844 B2 | 10/2009 | Kottomtharayil |
| 7,613,748 B2 | 11/2009 | Brockway et al. |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,631,194 B2 | 12/2009 | Wahlert et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Prahlad et al. |
| 7,664,771 B2 | 2/2010 | Kusters |
| 7,685,126 B2 | 3/2010 | Patel et al. |
| 7,702,782 B1 | 4/2010 | Pai |
| 7,720,841 B2 | 5/2010 | Gu et al. |
| 7,730,113 B1 | 6/2010 | Payette et al. |
| 7,734,669 B2 | 6/2010 | Kottomtharayil et al. |
| 7,734,820 B1 | 6/2010 | Ranade et al. |
| 7,739,235 B2 | 6/2010 | Rousseau |
| 7,743,051 B1 | 6/2010 | Kashyap et al. |
| 7,747,577 B2 | 6/2010 | Cannon et al. |
| 7,747,579 B2 | 6/2010 | Prahlad et al. |
| 7,761,425 B1 | 7/2010 | Erickson et al. |
| 7,797,279 B1 | 9/2010 | Starling et al. |
| 7,801,864 B2 | 9/2010 | Prahlad et al. |
| 7,809,914 B2 | 10/2010 | Kottomtharayil et al. |
| 7,814,074 B2 | 10/2010 | Anglin et al. |
| 7,814,149 B1 | 10/2010 | Stringham |
| 7,822,939 B1 | 10/2010 | Veprinsky et al. |
| 7,827,150 B1 | 11/2010 | Wu et al. |
| 7,831,795 B2 | 11/2010 | Prahlad et al. |
| 7,840,533 B2 | 11/2010 | Prahlad et al. |
| 7,899,871 B1 | 3/2011 | Kumar et al. |
| 7,962,452 B2 | 6/2011 | Anglin et al. |
| 8,074,043 B1 | 12/2011 | Zeis |
| 8,095,756 B1 | 1/2012 | Somavarapu |
| 8,108,446 B1 | 1/2012 | Christiaens |
| 8,108,638 B2 | 1/2012 | Kishi |
| 8,131,669 B2 | 3/2012 | Cannon et al. |
| 8,145,614 B1 | 3/2012 | Zimran et al. |
| 8,156,086 B2 | 4/2012 | Lu et al. |
| 8,170,995 B2 | 5/2012 | Prahlad et al. |
| 8,199,911 B1 | 6/2012 | Tsaur et al. |
| 8,200,638 B1 | 6/2012 | Zheng et al. |
| 8,200,923 B1 | 6/2012 | Healey et al. |
| 8,204,862 B1 | 6/2012 | Paulzagade et al. |
| 8,209,334 B1 | 6/2012 | Doerner |
| 8,224,875 B1 | 7/2012 | Christiaens et al. |
| 8,229,954 B2 | 7/2012 | Kottomtharayil et al. |
| 8,230,195 B2 | 7/2012 | Amarendran et al. |
| 8,261,240 B2 | 9/2012 | Hoban |
| 8,280,854 B1 | 10/2012 | Emmert |
| 8,285,681 B2 | 10/2012 | Prahlad et al. |
| 8,307,177 B2 | 11/2012 | Prahlad et al. |
| 8,352,422 B2 | 1/2013 | Prahlad et al. |
| 8,364,652 B2 | 1/2013 | Vijayan Retnamma et al. |
| 8,370,315 B1 | 2/2013 | Efstathopoulos et al. |
| 8,370,542 B2 | 2/2013 | Lu et al. |
| 8,375,008 B1 | 2/2013 | Gomes |
| 8,375,181 B1 | 2/2013 | Kekre et al. |
| 8,407,190 B2 | 3/2013 | Prahlad et al. |
| 8,442,952 B1* | 5/2013 | Armangau .......... G06F 16/1752 706/14 |
| 8,468,320 B1 | 6/2013 | Stringham |
| 8,484,162 B2 | 7/2013 | Prahlad et al. |
| 8,510,573 B2 | 8/2013 | Muller et al. |
| 8,527,469 B2 | 9/2013 | Hwang et al. |
| 8,549,350 B1 | 10/2013 | Dutch et al. |
| 8,572,340 B2 | 10/2013 | Vijayan Retnamma et al. |
| 8,577,851 B2 | 11/2013 | Vijayan Retnamma et al. |
| 8,578,109 B2 | 11/2013 | Vijayan Retnamma et al. |
| 8,578,120 B2 | 11/2013 | Attarde et al. |
| 8,595,191 B2 | 11/2013 | Prahlad et al. |
| 8,621,240 B1 | 12/2013 | Auchmoody et al. |
| 8,645,320 B2 | 2/2014 | Prahlad et al. |
| 8,719,264 B2 | 5/2014 | Varadharajan |
| 8,725,688 B2 | 5/2014 | Lad |
| 8,726,242 B2 | 5/2014 | Ngo |
| 8,745,105 B2 | 6/2014 | Erofeev |
| 8,775,823 B2 | 7/2014 | Gokhale et al. |
| 8,849,762 B2 | 9/2014 | Kumarasamy et al. |
| 8,909,980 B1 | 12/2014 | Lewis et al. |
| 8,930,306 B1 | 1/2015 | Ngo et al. |
| 8,938,481 B2 | 1/2015 | Kumarasamy et al. |
| 8,954,446 B2 | 2/2015 | Vijayan Retnamma et al. |
| 9,020,900 B2 | 4/2015 | Vijayan Retnamma et al. |
| 9,069,707 B1* | 6/2015 | Fortson ............... G06F 16/137 |
| 9,092,441 B1 | 7/2015 | Patiejunas et al. |
| 9,098,495 B2 | 8/2015 | Gokhale |
| 9,104,623 B2 | 8/2015 | Vijayan Retnamma et al. |
| 9,110,602 B2 | 8/2015 | Vijayan Retnamma et al. |
| 9,116,850 B2 | 8/2015 | Vijayan Retnamma et al. |
| 9,128,901 B1 | 9/2015 | Nickurak |
| 9,171,008 B2 | 10/2015 | Prahlad et al. |
| 9,208,160 B2 | 12/2015 | Prahlad et al. |
| 9,218,374 B2 | 12/2015 | Muller et al. |
| 9,218,375 B2 | 12/2015 | Muller et al. |
| 9,218,376 B2 | 12/2015 | Muller et al. |
| 9,239,687 B2 | 1/2016 | Vijayan Retnamma et al. |
| 9,251,186 B2 | 2/2016 | Muller et al. |
| 9,298,715 B2 | 3/2016 | Kumarasamy et al. |
| 9,298,724 B1 | 3/2016 | Patil et al. |
| 9,323,820 B1 | 4/2016 | Lauinger et al. |

(56) References Cited

U.S. PATENT DOCUMENTS

| | | |
|---|---|---|
| 9,342,537 B2 | 5/2016 | Kumarasamy et al. |
| 9,405,631 B2 | 8/2016 | Prahlad et al. |
| 9,405,763 B2 | 8/2016 | Prahlad et al. |
| 9,442,806 B1 | 9/2016 | Bardale |
| 9,575,673 B2 | 2/2017 | Mitkar et al. |
| 9,619,480 B2 | 4/2017 | Vijayan et al. |
| 9,633,033 B2 | 4/2017 | Vijayan et al. |
| 9,633,056 B2 | 4/2017 | Attarde et al. |
| 9,639,289 B2 | 5/2017 | Vijayan Retnamma et al. |
| 9,665,591 B2 | 5/2017 | Vijayan et al. |
| 9,678,968 B1 | 6/2017 | Taylor et al. |
| 9,858,156 B2 | 1/2018 | Muller et al. |
| 9,898,225 B2 | 2/2018 | Vijayan et al. |
| 9,898,478 B2 | 2/2018 | Vijayan et al. |
| 9,904,598 B2 | 2/2018 | Kumarasamy |
| 9,934,238 B2 | 4/2018 | Mitkar et al. |
| 9,990,253 B1 | 6/2018 | Rajimwale et al. |
| 10,061,663 B2 | 8/2018 | Vijayan et al. |
| 10,078,555 B1 | 9/2018 | Kumar et al. |
| 10,108,647 B1 | 10/2018 | Kumar et al. |
| 10,120,875 B1 | 11/2018 | Duggal et al. |
| 10,126,973 B2 | 11/2018 | Vijayan et al. |
| 10,176,053 B2 | 1/2019 | Muller et al. |
| 10,191,816 B2 | 1/2019 | Vijayan et al. |
| 10,229,133 B2 | 3/2019 | Vijayan et al. |
| 10,255,143 B2 | 4/2019 | Vijayan et al. |
| 10,310,953 B2 | 6/2019 | Vijayan et al. |
| 10,339,106 B2 | 7/2019 | Vijayan et al. |
| 10,339,112 B1 * | 7/2019 | Ranade .............. G06F 11/1453 |
| 10,387,269 B2 | 8/2019 | Muller et al. |
| 10,445,293 B2 | 10/2019 | Attarde et al. |
| 10,474,638 B2 | 11/2019 | Mitkar et al. |
| 10,481,824 B2 | 11/2019 | Vijayan et al. |
| 10,481,825 B2 | 11/2019 | Vijayan et al. |
| 10,481,826 B2 | 11/2019 | Vijayan et al. |
| 10,540,327 B2 | 1/2020 | Ngo et al. |
| 10,592,357 B2 | 3/2020 | Vijayan et al. |
| 10,740,295 B2 | 8/2020 | Vijayan et al. |
| 2001/0052015 A1 | 12/2001 | Lin et al. |
| 2002/0062439 A1 | 5/2002 | Cotugno et al. |
| 2002/0065892 A1 | 5/2002 | Malik |
| 2002/0083055 A1 | 6/2002 | Pachet |
| 2002/0107877 A1 | 8/2002 | Whiting et al. |
| 2002/0133601 A1 | 9/2002 | Kennamer et al. |
| 2002/0143892 A1 | 10/2002 | Mogul |
| 2002/0144250 A1 | 10/2002 | Yen |
| 2002/0169934 A1 | 11/2002 | Krapp et al. |
| 2003/0033308 A1 | 2/2003 | Patel et al. |
| 2003/0105716 A1 | 6/2003 | Lorin, Jr. et al. |
| 2003/0115346 A1 | 6/2003 | McHenry et al. |
| 2003/0172130 A1 | 9/2003 | Fruchtman et al. |
| 2003/0174648 A1 | 9/2003 | Wang et al. |
| 2003/0182310 A1 | 9/2003 | Charnock et al. |
| 2003/0187917 A1 | 10/2003 | Cohen |
| 2003/0188106 A1 | 10/2003 | Cohen |
| 2004/0010562 A1 | 1/2004 | Itonaga |
| 2004/0148306 A1 | 7/2004 | Moulton et al. |
| 2004/0181519 A1 | 9/2004 | Anwar |
| 2004/0215746 A1 | 10/2004 | McCanne et al. |
| 2004/0230753 A1 | 11/2004 | Amiri et al. |
| 2005/0033756 A1 | 2/2005 | Kottomtharayil et al. |
| 2005/0060643 A1 | 3/2005 | Glass et al. |
| 2005/0066118 A1 | 3/2005 | Perry |
| 2005/0066225 A1 | 3/2005 | Rowan |
| 2005/0108292 A1 | 5/2005 | Burton |
| 2005/0114450 A1 | 5/2005 | DeVos |
| 2005/0117558 A1 | 6/2005 | Angermann et al. |
| 2005/0144202 A1 | 6/2005 | Chen |
| 2005/0204108 A1 | 9/2005 | Ofek et al. |
| 2005/0216659 A1 | 9/2005 | Ogawa et al. |
| 2005/0243609 A1 | 11/2005 | Yang et al. |
| 2005/0246393 A1 | 11/2005 | Coates et al. |
| 2005/0268068 A1 | 12/2005 | Ignatius et al. |
| 2005/0273654 A1 | 12/2005 | Chen et al. |
| 2006/0004808 A1 | 1/2006 | Hsu et al. |
| 2006/0005048 A1 | 1/2006 | Osaki |
| 2006/0010227 A1 | 1/2006 | Atluri |
| 2006/0020660 A1 | 1/2006 | Prasad et al. |
| 2006/0064456 A1 | 3/2006 | Kalthoff et al. |
| 2006/0074957 A1 | 4/2006 | Yamamoto et al. |
| 2006/0089954 A1 | 4/2006 | Anschutz |
| 2006/0095527 A1 | 5/2006 | Malik |
| 2006/0101096 A1 | 5/2006 | Fuerst |
| 2006/0129537 A1 | 6/2006 | Torii |
| 2006/0136685 A1 | 6/2006 | Griv |
| 2006/0167900 A1 | 7/2006 | Pingte et al. |
| 2006/0168318 A1 | 7/2006 | Twiss |
| 2006/0179261 A1 | 8/2006 | Twiss |
| 2006/0179405 A1 | 8/2006 | Chao et al. |
| 2006/0224846 A1 | 10/2006 | Amarendran et al. |
| 2007/0006018 A1 | 1/2007 | Thompson |
| 2007/0038714 A1 | 2/2007 | Sell |
| 2007/0043757 A1 | 2/2007 | Benton et al. |
| 2007/0067263 A1 | 3/2007 | Syed |
| 2007/0073814 A1 | 3/2007 | Kamat et al. |
| 2007/0156966 A1 | 7/2007 | Sundarrajan et al. |
| 2007/0162462 A1 | 7/2007 | Zhang et al. |
| 2007/0179990 A1 | 8/2007 | Zimran et al. |
| 2007/0179995 A1 | 8/2007 | Prahlad et al. |
| 2007/0192444 A1 | 8/2007 | Ackaouy et al. |
| 2007/0192542 A1 | 8/2007 | Frolund et al. |
| 2007/0192544 A1 | 8/2007 | Frolund et al. |
| 2007/0203937 A1 | 8/2007 | Prahlad et al. |
| 2007/0250670 A1 | 10/2007 | Fineberg et al. |
| 2007/0255758 A1 | 11/2007 | Zheng et al. |
| 2008/0005141 A1 | 1/2008 | Zheng et al. |
| 2008/0005509 A1 | 1/2008 | Smith et al. |
| 2008/0016131 A1 | 1/2008 | Sandorfi et al. |
| 2008/0028149 A1 | 1/2008 | Pardikar et al. |
| 2008/0089342 A1 | 4/2008 | Lansing et al. |
| 2008/0091655 A1 | 4/2008 | Gokhale et al. |
| 2008/0091725 A1 | 4/2008 | Hwang et al. |
| 2008/0098041 A1 | 4/2008 | Chidambaran et al. |
| 2008/0098083 A1 | 4/2008 | Shergill et al. |
| 2008/0133561 A1 | 6/2008 | Dubnicki et al. |
| 2008/0140630 A1 | 6/2008 | Sato et al. |
| 2008/0159331 A1 | 7/2008 | Mace et al. |
| 2008/0229037 A1 | 9/2008 | Bunte et al. |
| 2008/0243879 A1 | 10/2008 | Gokhale et al. |
| 2008/0243914 A1 | 10/2008 | Prahlad et al. |
| 2008/0243953 A1 | 10/2008 | Wu et al. |
| 2008/0243957 A1 | 10/2008 | Prahlad et al. |
| 2008/0243958 A1 | 10/2008 | Prahlad et al. |
| 2008/0244172 A1 | 10/2008 | Kano |
| 2008/0244199 A1 | 10/2008 | Nakamura et al. |
| 2008/0244204 A1 | 10/2008 | Cremelie et al. |
| 2008/0244205 A1 | 10/2008 | Amano |
| 2008/0250204 A1 | 10/2008 | Kavuri et al. |
| 2008/0256326 A1 | 10/2008 | Patterson et al. |
| 2008/0256431 A1 | 10/2008 | Hornberger |
| 2008/0281908 A1 | 11/2008 | McCanne et al. |
| 2008/0294660 A1 | 11/2008 | Patterson et al. |
| 2008/0294696 A1 | 11/2008 | Frandzel |
| 2008/0313236 A1 | 12/2008 | Vijayakumar et al. |
| 2008/0320151 A1 | 12/2008 | McCanne et al. |
| 2009/0013129 A1 | 1/2009 | Bondurant |
| 2009/0043767 A1 | 2/2009 | Joshi et al. |
| 2009/0055425 A1 | 2/2009 | Evans et al. |
| 2009/0055471 A1 | 2/2009 | Kozat et al. |
| 2009/0077140 A1 | 3/2009 | Anglin et al. |
| 2009/0138481 A1 | 5/2009 | Chatley et al. |
| 2009/0144416 A1 | 6/2009 | Chatley et al. |
| 2009/0144422 A1 | 6/2009 | Chatley et al. |
| 2009/0171888 A1 | 7/2009 | Anglin |
| 2009/0172139 A1 | 7/2009 | Wong et al. |
| 2009/0182789 A1 | 7/2009 | Sandorfi et al. |
| 2009/0183162 A1 | 7/2009 | Kindel et al. |
| 2009/0204636 A1 | 8/2009 | Li et al. |
| 2009/0204649 A1 | 8/2009 | Wong et al. |
| 2009/0210431 A1 | 8/2009 | Marinkovic et al. |
| 2009/0243846 A1 | 10/2009 | Yuuki |
| 2009/0254507 A1 | 10/2009 | Hosoya et al. |
| 2009/0268903 A1 | 10/2009 | Bojinov et al. |
| 2009/0271454 A1 | 10/2009 | Anglin et al. |

(56) References Cited

U.S. PATENT DOCUMENTS

| | | |
|---|---|---|
| 2009/0276454 A1 | 11/2009 | Smith |
| 2009/0307251 A1 | 12/2009 | Heller et al. |
| 2009/0319534 A1 | 12/2009 | Gokhale |
| 2009/0319585 A1 | 12/2009 | Gokhale |
| 2009/0327625 A1 | 12/2009 | Jaquette et al. |
| 2010/0005259 A1 | 1/2010 | Prahlad |
| 2010/0011178 A1 | 1/2010 | Feathergill |
| 2010/0031086 A1 | 2/2010 | Leppard |
| 2010/0036887 A1 | 2/2010 | Anglin et al. |
| 2010/0042790 A1 | 2/2010 | Mondal et al. |
| 2010/0049926 A1 | 2/2010 | Fuente et al. |
| 2010/0049927 A1 | 2/2010 | Fuente et al. |
| 2010/0070478 A1 | 3/2010 | Anglin |
| 2010/0077161 A1 | 3/2010 | Stoakes et al. |
| 2010/0082558 A1 | 4/2010 | Anglin et al. |
| 2010/0082672 A1 | 4/2010 | Kottomtharayil et al. |
| 2010/0088296 A1 | 4/2010 | Periyagaram et al. |
| 2010/0094817 A1 | 4/2010 | Ben-Shaul et al. |
| 2010/0100529 A1 | 4/2010 | Erofeev |
| 2010/0114833 A1 | 5/2010 | Mu |
| 2010/0153511 A1 | 6/2010 | Lin et al. |
| 2010/0169287 A1 | 7/2010 | Klose |
| 2010/0180075 A1 | 7/2010 | McCloskey et al. |
| 2010/0198864 A1 | 8/2010 | Ravid et al. |
| 2010/0223495 A1 | 9/2010 | Leppard |
| 2010/0250501 A1 | 9/2010 | Mandagere et al. |
| 2010/0250549 A1 | 9/2010 | Muller et al. |
| 2010/0250896 A1 | 9/2010 | Matze |
| 2010/0257142 A1 | 10/2010 | Murphy et al. |
| 2010/0257346 A1 | 10/2010 | Sosnosky et al. |
| 2010/0257403 A1 | 10/2010 | Virk et al. |
| 2010/0306283 A1 | 12/2010 | Johnson et al. |
| 2010/0312752 A1 | 12/2010 | Zeis et al. |
| 2010/0318759 A1 | 12/2010 | Hamilton et al. |
| 2010/0332454 A1 | 12/2010 | Prahlad et al. |
| 2011/0010498 A1 | 1/2011 | Lay et al. |
| 2011/0060940 A1 | 3/2011 | Taylor et al. |
| 2011/0072291 A1 | 3/2011 | Murase |
| 2011/0113012 A1 | 5/2011 | Gruhl et al. |
| 2011/0113013 A1 | 5/2011 | Reddy et al. |
| 2011/0113016 A1 | 5/2011 | Gruhl et al. |
| 2011/0119741 A1 | 5/2011 | Kelly et al. |
| 2011/0153570 A1 | 6/2011 | Kim et al. |
| 2011/0161723 A1 | 6/2011 | Taleck et al. |
| 2011/0167221 A1 | 7/2011 | Pangal et al. |
| 2011/0258161 A1 | 10/2011 | Constantinescu et al. |
| 2011/0276543 A1 | 11/2011 | Matze |
| 2011/0289281 A1 | 11/2011 | Spackman |
| 2011/0302140 A1 | 12/2011 | Gokhale et al. |
| 2011/0314070 A1 | 12/2011 | Brown et al. |
| 2011/0314400 A1 | 12/2011 | Mital et al. |
| 2012/0011101 A1 | 1/2012 | Fang et al. |
| 2012/0016839 A1 | 1/2012 | Yueh |
| 2012/0016845 A1 | 1/2012 | Bates |
| 2012/0078881 A1 | 3/2012 | Crump et al. |
| 2012/0084272 A1 | 4/2012 | Garces-Erice et al. |
| 2012/0089574 A1 | 4/2012 | Doerner |
| 2012/0150818 A1 | 6/2012 | Vijayan Retnamma et al. |
| 2012/0166403 A1 | 6/2012 | Kim et al. |
| 2012/0185437 A1 | 7/2012 | Pavlov et al. |
| 2012/0221817 A1 | 8/2012 | Yueh |
| 2012/0233417 A1 | 9/2012 | Kalach |
| 2012/0303622 A1 | 11/2012 | Dean et al. |
| 2013/0006943 A1 | 1/2013 | Chavda et al. |
| 2013/0238562 A1 | 9/2013 | Kumarasamy et al. |
| 2013/0238572 A1 | 9/2013 | Prahlad et al. |
| 2013/0262396 A1 | 10/2013 | Kripalani et al. |
| 2013/0339298 A1 | 12/2013 | Muller et al. |
| 2013/0339310 A1 | 12/2013 | Muller et al. |
| 2014/0032940 A1 | 1/2014 | Sartirana et al. |
| 2014/0115287 A1 | 4/2014 | Schnapp et al. |
| 2014/0181028 A1 | 6/2014 | Prahlad et al. |
| 2014/0195749 A1 | 7/2014 | Colgrove et al. |
| 2014/0201142 A1 | 7/2014 | Varadharajan et al. |
| 2014/0201150 A1 | 7/2014 | Kumarasamy et al. |
| 2014/0201153 A1 | 7/2014 | Vijayan et al. |
| 2014/0229451 A1 | 8/2014 | Venkatesh et al. |
| 2014/0250076 A1 | 9/2014 | Lad |
| 2014/0258245 A1 | 9/2014 | Estes |
| 2014/0281758 A1 | 9/2014 | Klein et al. |
| 2014/0337285 A1 | 11/2014 | Gokhale et al. |
| 2014/0337664 A1 | 11/2014 | Gokhale et al. |
| 2015/0012698 A1 | 1/2015 | Bolla et al. |
| 2015/0088821 A1 | 3/2015 | Blea et al. |
| 2015/0154220 A1 | 6/2015 | Ngo et al. |
| 2015/0161015 A1 | 6/2015 | Kumarasamy et al. |
| 2015/0212893 A1 | 7/2015 | Pawar et al. |
| 2015/0212894 A1 | 7/2015 | Pawar et al. |
| 2015/0212895 A1 | 7/2015 | Pawar et al. |
| 2015/0212896 A1 | 7/2015 | Pawar et al. |
| 2015/0212897 A1 | 7/2015 | Pawar et al. |
| 2015/0248466 A1 | 9/2015 | Jernigan, IV et al. |
| 2015/0269032 A1 | 9/2015 | Muthyala et al. |
| 2015/0278104 A1 | 10/2015 | Moon et al. |
| 2015/0347306 A1 | 12/2015 | Gschwind |
| 2015/0378839 A1 | 12/2015 | Langouev et al. |
| 2016/0026405 A1 | 1/2016 | Dhuse |
| 2016/0026652 A1 | 1/2016 | Zheng |
| 2016/0041880 A1 | 2/2016 | Mitkar et al. |
| 2016/0042090 A1 | 2/2016 | Mitkar et al. |
| 2016/0062846 A1 | 3/2016 | Nallathambi et al. |
| 2016/0065671 A1 | 3/2016 | Nallathambi et al. |
| 2016/0139836 A1 | 5/2016 | Nallathambi et al. |
| 2016/0142483 A1 | 5/2016 | Nallathambi et al. |
| 2016/0154709 A1 | 6/2016 | Mitkar et al. |
| 2016/0170657 A1 | 6/2016 | Suehr et al. |
| 2016/0188416 A1 | 6/2016 | Muller et al. |
| 2016/0196070 A1 | 7/2016 | Vijayan Retnamma et al. |
| 2016/0299818 A1* | 10/2016 | Vijayan .............. G06F 16/1748 |
| 2016/0306707 A1 | 10/2016 | Vijayan Retnamma et al. |
| 2016/0306708 A1 | 10/2016 | Prahlad et al. |
| 2016/0306818 A1 | 10/2016 | Vijayan Retnamma et al. |
| 2016/0350391 A1 | 12/2016 | Vijayan Retnamma et al. |
| 2017/0031768 A1 | 2/2017 | Sarab |
| 2017/0090786 A1 | 3/2017 | Parab et al. |
| 2017/0123889 A1* | 5/2017 | Haridas ............... G06F 11/0793 |
| 2017/0168903 A1 | 5/2017 | Dornemann et al. |
| 2017/0185488 A1 | 6/2017 | Kumarasamy et al. |
| 2017/0192868 A1 | 7/2017 | Vijayan et al. |
| 2017/0193003 A1 | 7/2017 | Vijayan et al. |
| 2017/0235647 A1 | 8/2017 | Kilaru et al. |
| 2017/0242871 A1 | 8/2017 | Kilaru et al. |
| 2017/0255525 A1 | 9/2017 | Dain et al. |
| 2017/0286233 A1 | 10/2017 | Dain et al. |
| 2017/0315876 A1 | 11/2017 | Dornquast et al. |
| 2019/0012237 A1 | 1/2019 | Prahlad et al. |
| 2019/0129970 A1 | 5/2019 | Armangau et al. |
| 2020/0167091 A1 | 5/2020 | Haridas et al. |
| 2020/0167240 A1 | 5/2020 | Haridas et al. |
| 2020/0192760 A1* | 6/2020 | Toaff .................. G06F 16/215 |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 1995/013580 | 5/1995 |
| WO | WO 99/009480 A1 | 2/1999 |
| WO | WO 1999/012098 | 3/1999 |
| WO | WO 2002/005466 | 1/2002 |
| WO | WO 2006/052872 | 5/2006 |
| WO | WO 2010/013292 A1 | 2/2010 |
| WO | WO 2010/140264 | 12/2010 |
| WO | WO 2012/044366 | 4/2012 |
| WO | WO 2012/044367 | 4/2012 |
| WO | WO 2013/188550 | 12/2013 |
| WO | WO-2019037878 A1 * | 2/2019 .......... G06F 11/1453 |

(56) References Cited

OTHER PUBLICATIONS

Armstead et al., "Implementation of a Campus-Wide Distributed Mass Storage Service: The Dream vs. Reality," IEEE, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, p. 19.
Bhagwat, Extreme Binning: Scalable, Parallel Deduplication for Chunk-based File Backup. IEEE 2009, 9 pages.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Cohen, Edith, et al., "The Age Penalty and its Effect on Cache Performance." In USITS, pp. 73-84. 2001.
Cohen, Edith, et al.,."Aging through cascaded caches: Performance issues in the distribution of web content." In ACM SIGCOMM Computer Communication Review, vol. 31, No. 4, pp. 41-53. ACM, 2001.
Cohen, Edith, et al., "Refreshment policies for web content caches." Computer Networks 38.6 (2002): 795-808.
CommVault Systems, Inc. "Continuous Data Replicator 7.0," Product Data Sheet, 2007.
CommVault Systems, Inc., "Deduplication—How To," http://documentation.commvault.com/commvault/release_8_0_0/books_online_1/english_US/features/single_instance/single_instance_how_to.htm, internet accessed on Jan. 26, 2009, 7 pages.
CommVault Systems, Inc., "Deduplication," http://documentation.commvault.com/commvault/release_8_0_0/books_online_1/english_US/features/single_instance/single_instance.htm, internet accessed on Jan. 26, 2009, 9 pages.
Diligent Technologies HyperFactor, http://www.dilligent.com/products:protecTIER-1:HyperFactor-1, Internet accessed on Dec. 5, 2008, 2 pages.
Dubnicki, et al. "HYDRAstor: A Scalable Secondary Storage." FAST. vol. 9.2009, 74 pages.
Eitel, "Backup and Storage Management in Distributed Heterogeneous Environments," IEEE, 1994, pp. 124-126.
Gait, "The Optical File Cabinet: A Random-Access File system for Write-Once Optical Disks," IEEE Computer, vol. 21, No. 6, pp. 11-22 (1988).
Gray (#2 of 2, pp. 604-609), Jim; Reuter Andreas, Transaction Processing Concepts and Techniques, Morgan Kaufmann Publisher, USA 1994, pp. 604-609.
Guo et al., Building a High-performance Deduplication System, Jun. 15, 2011, retrieved from the Internet at <U RL: http://dl.acm.org/citation.cfm?id=2002206>, pp. 1-14.
Huff, KL, "Data Set Usage Sequence Number," IBM Technical Disclosure Bulletin, vol. 24, No. 5, Oct. 1981 New York, US, pp. 2404-2406.
Jander, "Launching Storage-Area Net," Data Communications, US, McGraw Hill, NY, vol. 27, No. 4(Mar. 21, 1998), pp. 64-72.
Kashyap, et al., "Professional Services Automation: A knowledge Management approach using LSI and Domain specific Ontologies", FLAIRS-01 Proceedings, 2001, pp. 300-302.
Kornblum, Jesse, "Identifying Almost Identical Files Using Context Triggered Piecewise Hashing," www.sciencedirect.com, Digital Investigation 3S (2006), pp. S91-S97.
Lortu Software Development, "Kondar Technology-Deduplication," http://www.lortu.com/en/deduplication.asp, Internet accessed on Dec. 5, 2008, 3 pages.
Overland Storage, "Data Deduplication," http://www.overlandstorage.com/topics/data_deduplication.html, Internet accessed on Dec. 5, 2008, 2 pages.
Quantum Corporation, "Data De-Duplication Background: A Technical White Paper," May 2008, 13 pages.
Rosenblum et al., "The Design and Implementation of a Log-Structure File System," Operating Systems Review SIGOPS, vol. 25, No. 5, New York, US, pp. 1-15 (May 1991).
Wei, et al. "MAD2: A scalable high-throughput exact deduplication approach for network backup services." Mass Storage Systems and Technologies (MSST), 2010 IEEE 26th Symposium on. IEEE, 2010, 14 pages.
Wolman et al., On the scale and performance of cooperative Web proxy caching, 1999.
Wu, et al., Load Balancing and Hot Spot Relief for Hash Routing among a Collection of Proxy Caches, 1999.
Final Office Action for Japanese Application No. 2003531581, dated Mar. 24, 2009, 6 pages.
International Search Report and Written Opinion, International Application No. PCT/US2009/58137, dated Dec. 23, 2009, 14 pages.
International Search Report and Written Opinion, International Application No. PCT/US2011/030804, dated Jun. 9, 2011.
International Search Report and Written Opinion, International Application No. PCT/US2011/030814, dated Jun. 9, 2011.
International Search Report and Written Opinion, International Application No. PCT/US2013/045443 dated Nov. 14, 2013, 16 pages.
International Preliminary Report on Patentability, International Application No. PCT/US2013/045443 dated Dec. 16, 2014 11 pages.

\* cited by examiner

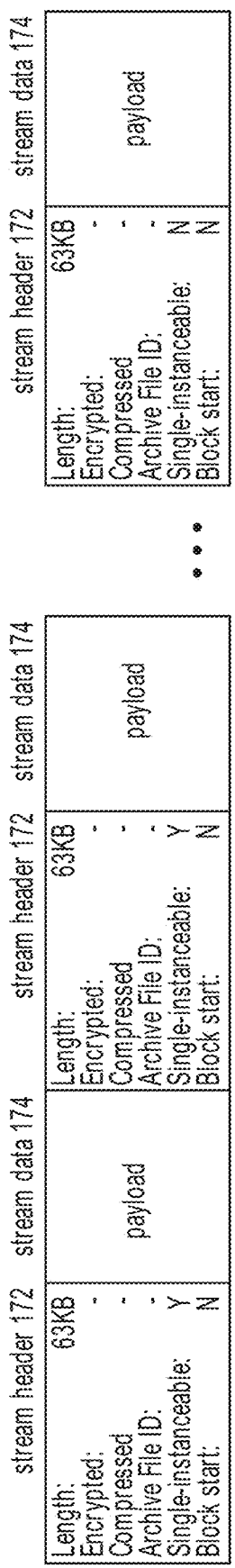
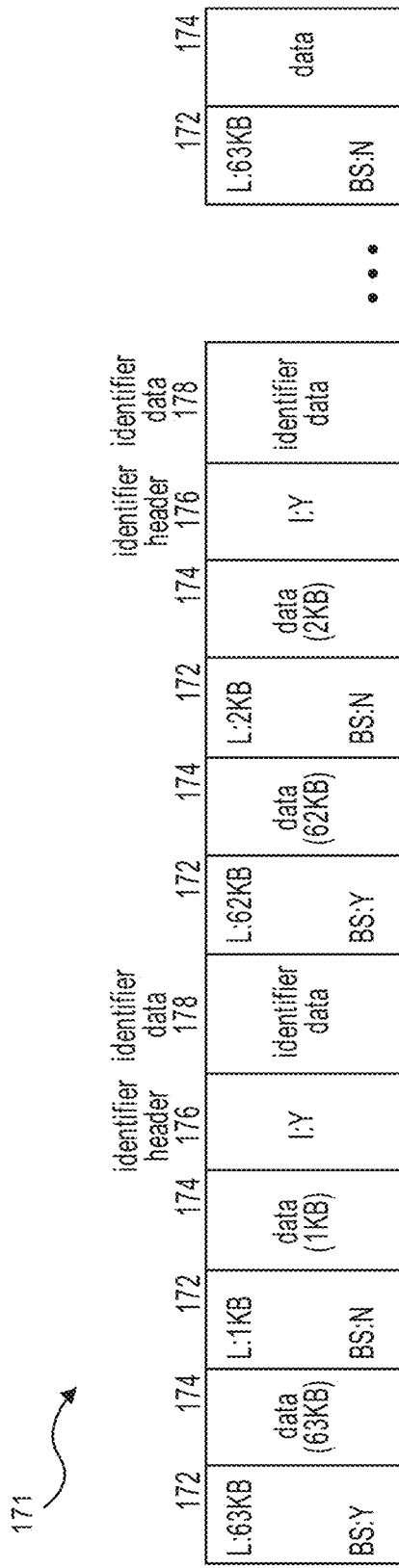
FIG. 1F
FIG. 1G

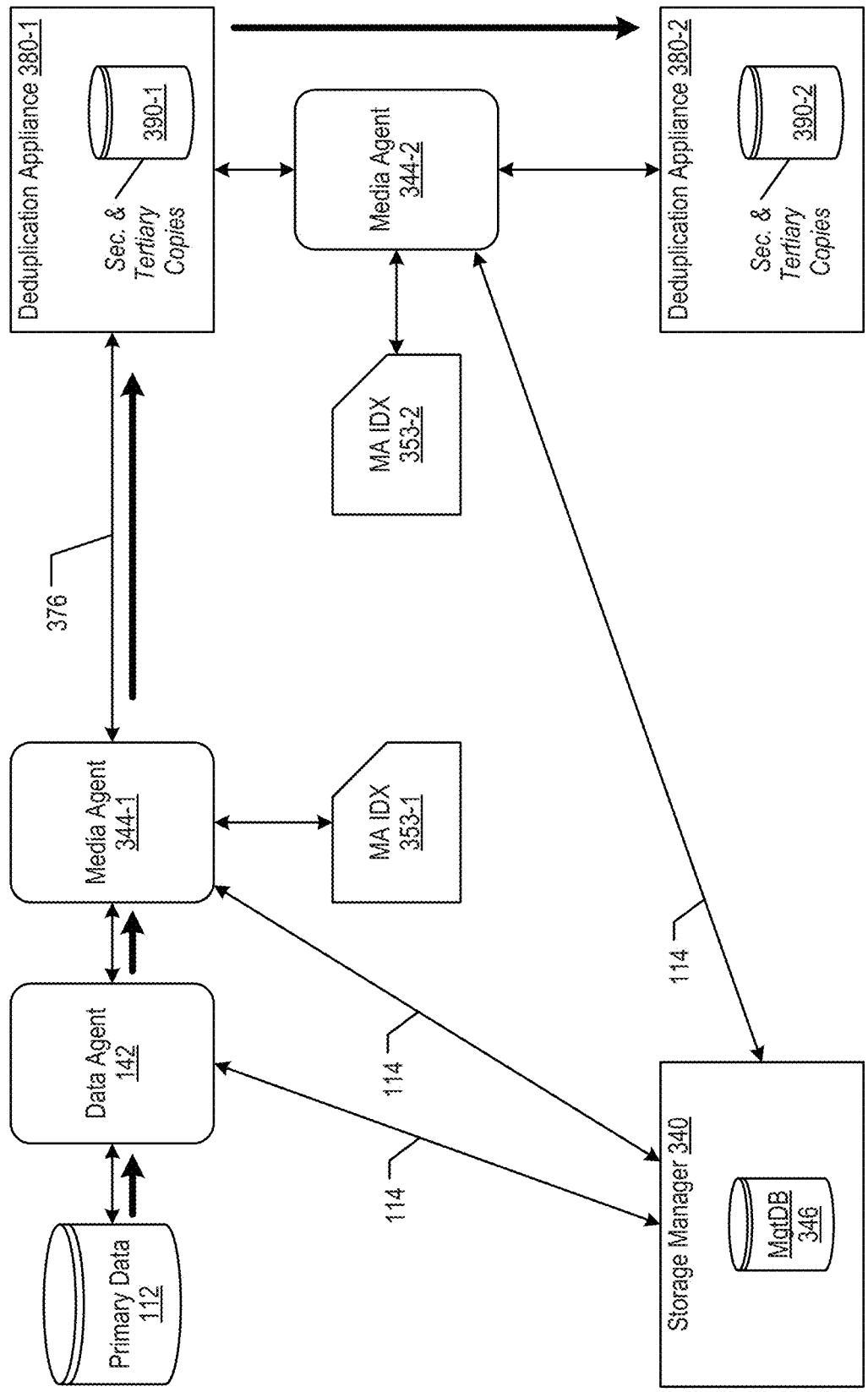

GENERATING COPIES THROUGH INTEROPERABILITY BETWEEN A DATA STORAGE MANAGEMENT SYSTEM AND APPLIANCES FOR DATA STORAGE AND DEDUPLICATION

INCORPORATION BY REFERENCE TO ANY PRIORITY APPLICATIONS

This application is a Continuation of U.S. patent application Ser. No. 16/201,897 filed on Nov. 27, 2018. Any and all applications for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses recognize the commercial value of their data and seek reliable, cost-effective ways to protect the information stored on their computer networks while minimizing impact on productivity. A company might back up critical computing systems such as databases, file servers, web servers, virtual machines, and so on as part of a daily, weekly, or monthly maintenance schedule. The company may similarly protect computing systems used by its employees, such as those used by an accounting department, marketing department, engineering department, and so forth.

SUMMARY

Traditional data storage management systems place substantial data processing loads upon key components that process and prepare copies for secondary storage. Appliances have emerged that natively perform efficient storage techniques, such as compression, deduplication, etc.

The present inventors devised a number of interoperability techniques between certain components of a data storage management system and appliances with data storage and deduplication capabilities (hereinafter "deduplication appliances"). Illustrative data storage management components such as storage manager, media agent, and media agent index are enhanced to interoperate with deduplication appliances. Illustrative advantages are realized in several scenarios, including when making initial secondary copies, when making tertiary copies (i.e., copies of copies), and also when restoring backed up data from a deduplication appliance.

The illustrative embodiments feature a tiered indexing approach that minimizes how much data is retained and stored at media agents. The tiered indexing enables media agents to efficiently extract needed information from the example deduplication appliance in order to make tertiary copies and to restore backed up copies.

The illustrative storage manager and media agents rely on the deduplication appliance to handle deduplication, storage, and tracking of data stored therein, while retaining indexing and tracking strengths designed into the illustrative data storage management system. Interoperability techniques include the media agent generating separate special-purpose data streams transmitted to the deduplication appliance. Each special-purpose data stream carries a different kind of data, e.g., payload data, metadata content, or high-level index information. On initial backup, the illustrative media agent instructs the deduplication appliance to deduplicate the payload data stream but not the other data streams, thus intelligently applying resources to data that is most likely to benefit from deduplication. The illustrative media agent also retains useful index information and metadata content from the backed up copies that it uses autonomously without the deduplication appliance, e.g., for reporting, browsing, etc.

When tertiary copies are created, i.e., copies made from pre-existing copies that are already stored at the deduplication appliance, the media agent avoids handling payload data. No payload data passes through or plays back at the illustrative media agent in tertiary copy operations, e.g., synthetic-full copies, auxiliary copies, etc. Instead, the illustrative media agent uses tiered indexing to instruct the deduplication appliance to find and handle the payload data directly. On restore, the deduplication appliance takes care of rehydrating deduplicated data using its own native capabilities, so that the receiving media agent has a relatively light data processing load to finish restoring the data.

BRIEF DESCRIPTION OF THE DRAWINGS

FIGS. 1F-1H are block diagrams illustrating suitable data structures that may be employed by the information management system.

FIG. 3A depicts a data storage management system 300 for interoperability between storage management components and one or more appliances for data storage and deduplication ("deduplication appliance"), according to an illustrative embodiment of the present invention.

DETAILED DESCRIPTION

Detailed descriptions and examples of systems and methods according to one or more illustrative embodiments of the present invention may be found in the section entitled INTEROPERABILITY BETWEEN COMPONENTS OF A DATA STORAGE MANAGEMENT SYSTEM AND APPLIANCES FOR DATA STORAGE AND DEDUPLICATION, as well as in the section entitled Example Embodiments, and also in FIGS. 3A-13 herein. Furthermore, components and functionality for interoperability between components of a data storage management system and appliances for data storage and deduplication may be configured and/or incorporated into information management systems such as those described herein in FIGS. 1A-1H and 2A-2C.

Various embodiments described herein are intimately tied to, enabled by, and would not exist except for, computer technology. For example, generating data chunks and segregating different types of data chunks to different data streams transmitted to an example deduplication appliance described herein in reference to various embodiments cannot reasonably be performed by humans alone, without the computer technology upon which they are implemented.
Information Management System Overview With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data and for smart and efficient management of data storage. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
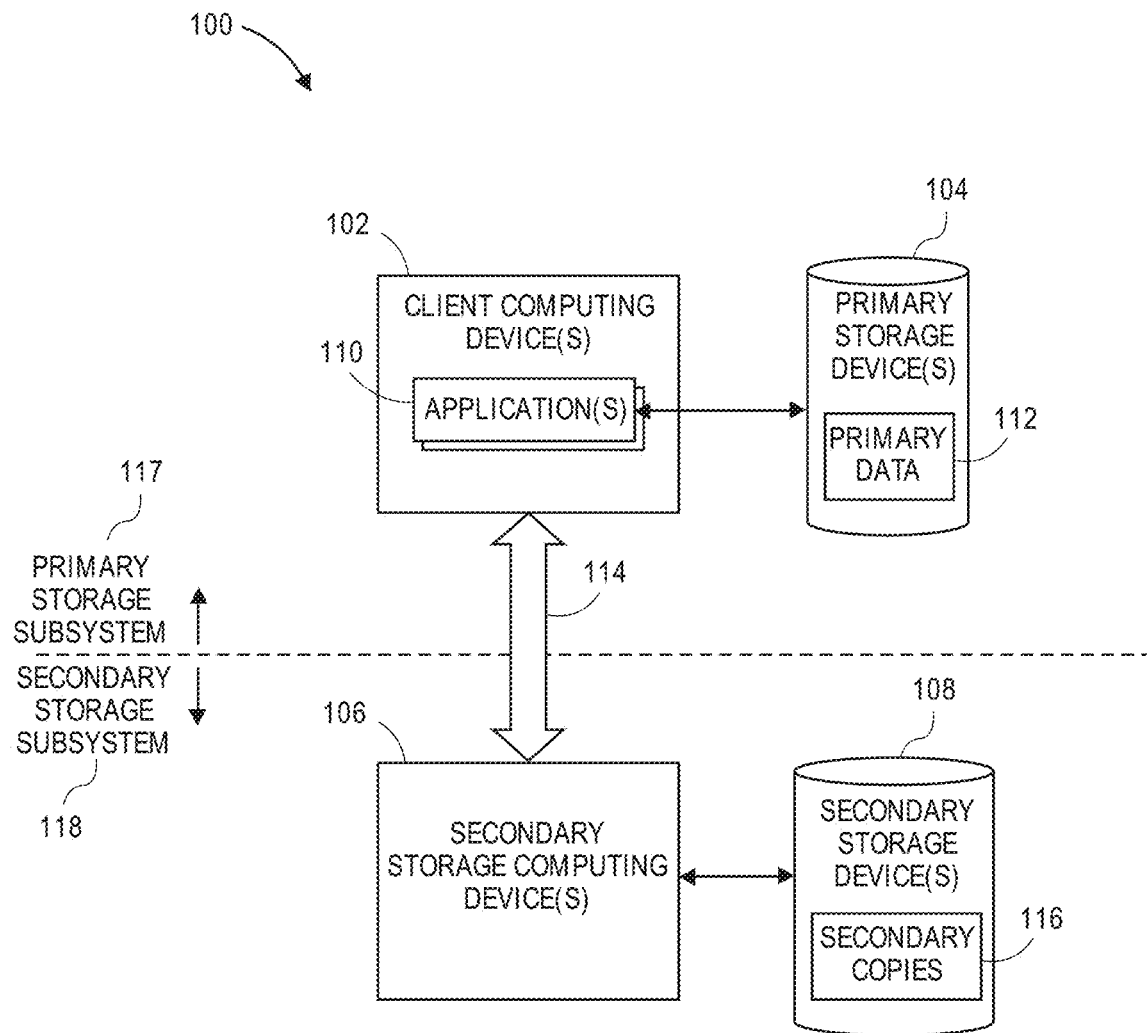
FIG. 1A is a block diagram illustrating an exemplary information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" or a "data storage management system." System 100 performs information management operations, some of which may be referred to as "storage operations" or "data storage operations," to protect and manage the data residing in and/or managed by system 100. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents/publications and patent applications assigned to Commvault Systems, Inc., each of which is hereby incorporated by reference in its entirety herein:

U.S. Pat. No. 7,035,880, entitled "Modular Backup and Retrieval System Used in Conjunction With a Storage Area Network";

U.S. Pat. No. 7,107,298, entitled "System And Method For Archiving Objects In An Information Store";

U.S. Pat. No. 7,246,207, entitled "System and Method for Dynamically Performing Storage Operations in a Computer Network";

U.S. Pat. No. 7,315,923, entitled "System And Method For Combining Data Streams In Pipelined Storage Operations In A Storage Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,529,782, entitled "System and Methods for Performing a Snapshot and for Restoring Data";

U.S. Pat. No. 7,617,262, entitled "System and Methods for Monitoring Application Data in a Data Replication System";

U.S. Pat. No. 7,734,669, entitled "Managing Copies Of Data";

U.S. Pat. No. 7,747,579, entitled "Metabase for Facilitating Data Classification";

U.S. Pat. No. 8,156,086, entitled "Systems And Methods For Stored Data Verification";

U.S. Pat. No. 8,170,995, entitled "Method and System for Offline Indexing of Content and Classifying Stored Data";

U.S. Pat. No. 8,230,195, entitled "System And Method For Performing Auxiliary Storage Operations";

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,364,652, entitled "Content-Aligned, Block-Based Deduplication";

U.S. Pat. No. 8,578,120, entitled "Block-Level Single Instancing";

U.S. Pat. No. 8,954,446, entitled "Client-Side Repository in a Networked Deduplicated Storage System";

U.S. Pat. No. 9,020,900, entitled "Distributed Deduplicated Storage System";

U.S. Pat. No. 9,098,495, entitled "Application-Aware and Remote Single Instance Data Management";

U.S. Pat. No. 9,239,687, entitled "Systems and Methods for Retaining and Using Data Block Signatures in Data Protection Operations";

U.S. Pat. No. 9,633,033, entitled "High Availability Distributed Deduplicated Storage System";

U.S. Pat. No. 9,904,598, entitled "Content-Independent and Database Management System-Independent Synthetic Full Backup of a Database based on Snapshot Technology";

U.S. Pat. Pub. No. 2006/0224846, entitled "System and Method to Support Single Instance Storage Operations";

U.S. Pat. Pub. No. 2016-0350391, entitled "Replication Using Deduplicated Secondary Copy Data";

U.S. Pat. Pub. No. 2017-0168903 A1, entitled "Live Synchronization and Management of Virtual Machines across Computing and Virtualization Platforms and Using Live Synchronization to Support Disaster Recovery";

U.S. Pat. Pub. No. 2017-0185488 A1, entitled "Application-Level Live Synchronization Across Computing Platforms Including Synchronizing Co-Resident Applications To Disparate Standby Destinations And Selectively Synchronizing Some Applications And Not Others";

U.S. Pat. Pub. No. 2017-0192866 A1, entitled "System For Redirecting Requests After A Secondary Storage Computing Device Failure";

U.S. Pat. Pub. No. 2017-0235647 A1, entitled "Data Protection Operations Based on Network Path Information"; and U.S. Pat. Pub. No. 2017-0242871 A1, entitled "Data Restoration Operations Based on Network Path Information".

System 100 includes computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, Calif.; Microsoft Virtual Server and Microsoft Windows Server Hyper-V, both by Microsoft Corporation of Redmond, Wash.; Sun xVM by Oracle America Inc. of Santa Clara, Calif.; and Xen by Citrix Systems, Santa Clara, Calif. The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1B:
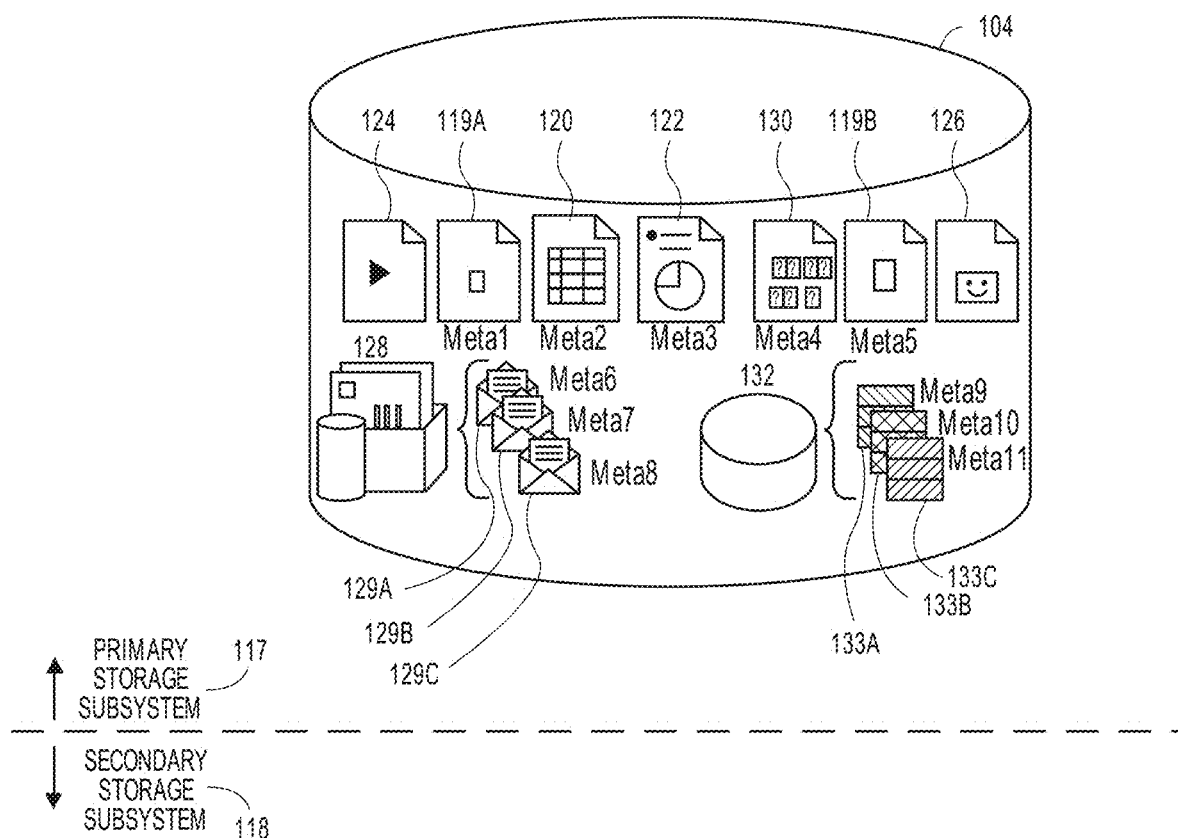
FIG. 1B is a detailed view of a primary storage device, a secondary storage device, and some examples of primary data and secondary copy data.
Figure 1B:
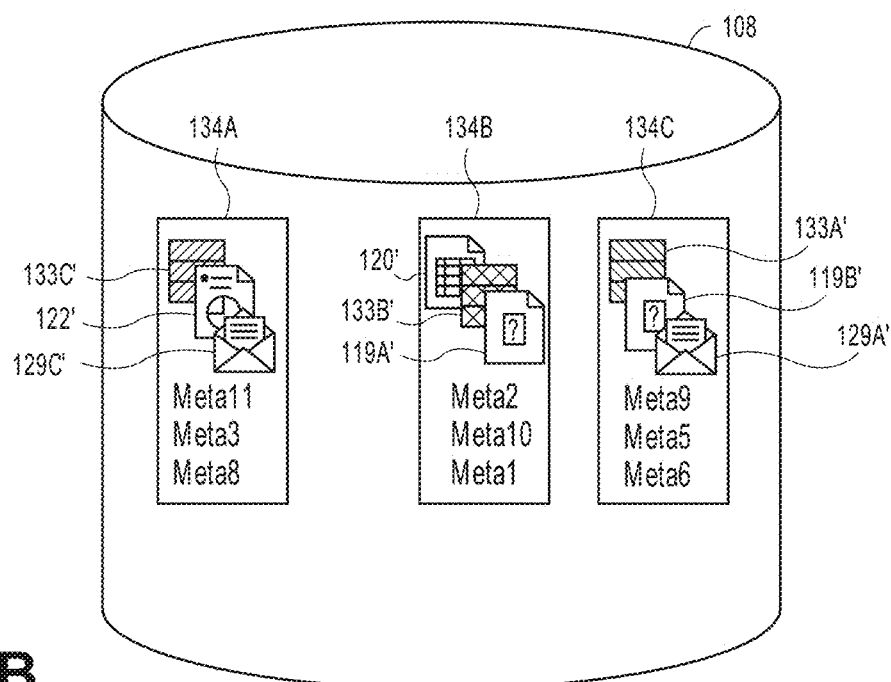
Figure 1C:
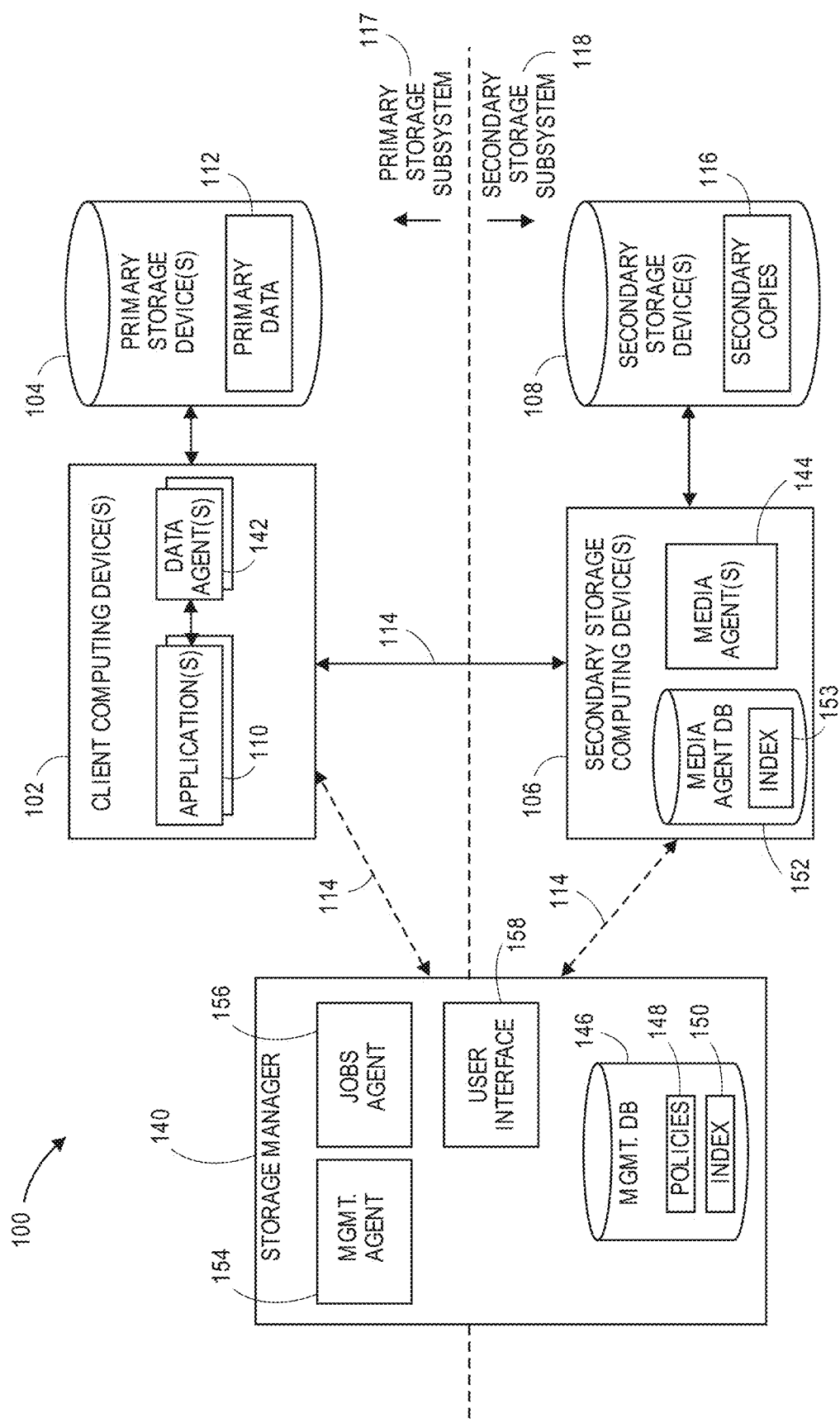
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only application. A file manager application, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Exemplary Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110. Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or other non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E). These special-purpose components of system 100 comprise specialized programmed intelligence and/or hardware capability for writing to, reading from, instructing, communicating with, or otherwise interacting with secondary storage devices 108.

Secondary storage computing device(s) 106 can comprise any of the computing devices described above, without limitation. In some cases, secondary storage computing device(s) 106 also include specialized hardware componentry and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage computing device 106 in turn may further process and convey the data or a processed version thereof to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view of some specific examples of primary data stored on primary storage device(s) 104 and secondary copy data stored on secondary storage device(s) 108, with other components of the system removed for the purposes of illustration. Stored on primary storage device(s) 104 are primary data 112 objects including word processing documents 119A-B, spreadsheets 120, presentation documents 122, video files 124, image files 126, email mailboxes 128 (and corresponding email messages 129A-C), HTML/XML or other types of markup language files 130, databases 132 and corresponding tables or other data structures 133A-133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing, and store the newly generated information along with the secondary copies. Secondary copy data object 134B represents primary data objects 120, 133B, and 119A as 120', 133B', and 119A', respectively, accompanied by corresponding metadata Meta2, Meta10, and Meta1, respectively. Also, secondary copy data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

System 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary storage devices 108.

Storage Manager

Storage manager 140 is a centralized storage and/or information manager that is configured to perform certain control functions and also to store certain critical information about system 100—hence storage manager 140 is said to manage system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:
- communicating with data agents 142 and media agents 144, including transmitting instructions, messages, and/or queries, as well as receiving status reports, index information, messages, and/or queries, and responding to same;
- initiating execution of information management operations;
- initiating restore and recovery operations;
- managing secondary storage devices 108 and inventory/capacity of the same;
- allocating secondary storage devices 108 for secondary copy operations;
- reporting, searching, and/or classification of data in system 100;
- monitoring completion of and status reporting related to information management operations and jobs;
- tracking movement of data within system 100;
- tracking age information relating to secondary copies 116, secondary storage devices 108, comparing the age information against retention guidelines, and initiating data pruning when appropriate;
- tracking logical associations between components in system 100;
- protecting metadata associated with system 100, e.g., in management database 146;
- implementing job management, schedule management, event management, alert management, reporting, job history maintenance, user security management, disaster recovery management, and/or user interfacing for system administrators and/or end users of system 100;
- sending, searching, and/or viewing of log files; and
- implementing operations management functionality.

Storage manager 140 may maintain an associated database 146 (or "storage manager database 146" or "management database 146") of management-related data and information management policies 148. Database 146 is stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 to participate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt certain primary data 112, as well as capture application-related metadata before transmitting the processed data to media agent 144. Data agent 142 also may receive instructions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata. In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106. Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
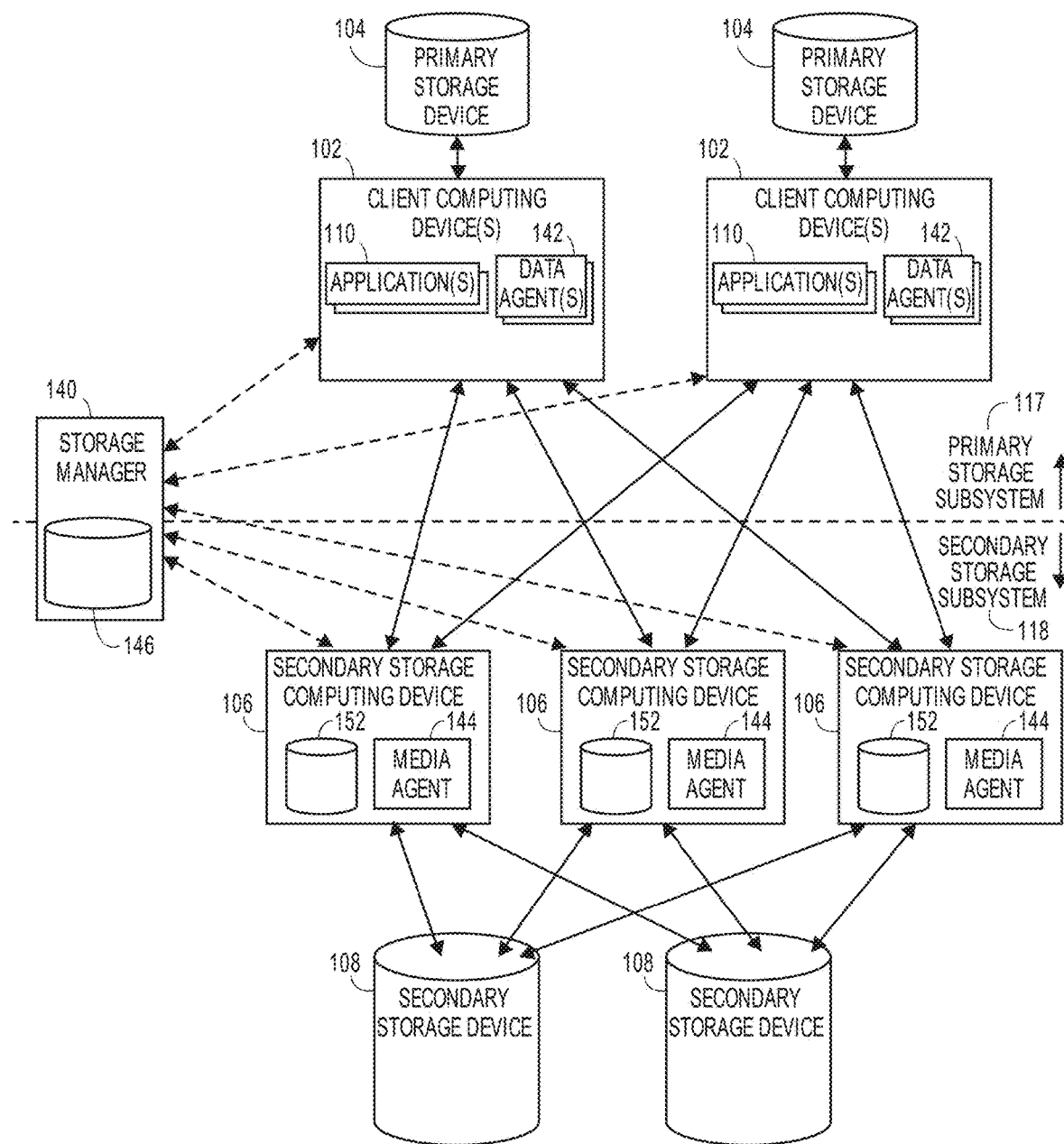
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity, because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., data block signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No.

8,954,446. Some other deduplication/single instancing techniques are described in U.S. Pat. Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "online archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

- schedules or other timing information, e.g., specifying when and/or how often to perform information management operations;
- the type of secondary copy 116 and/or copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation among different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality, importance) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Copy Operations

Figure 1E:
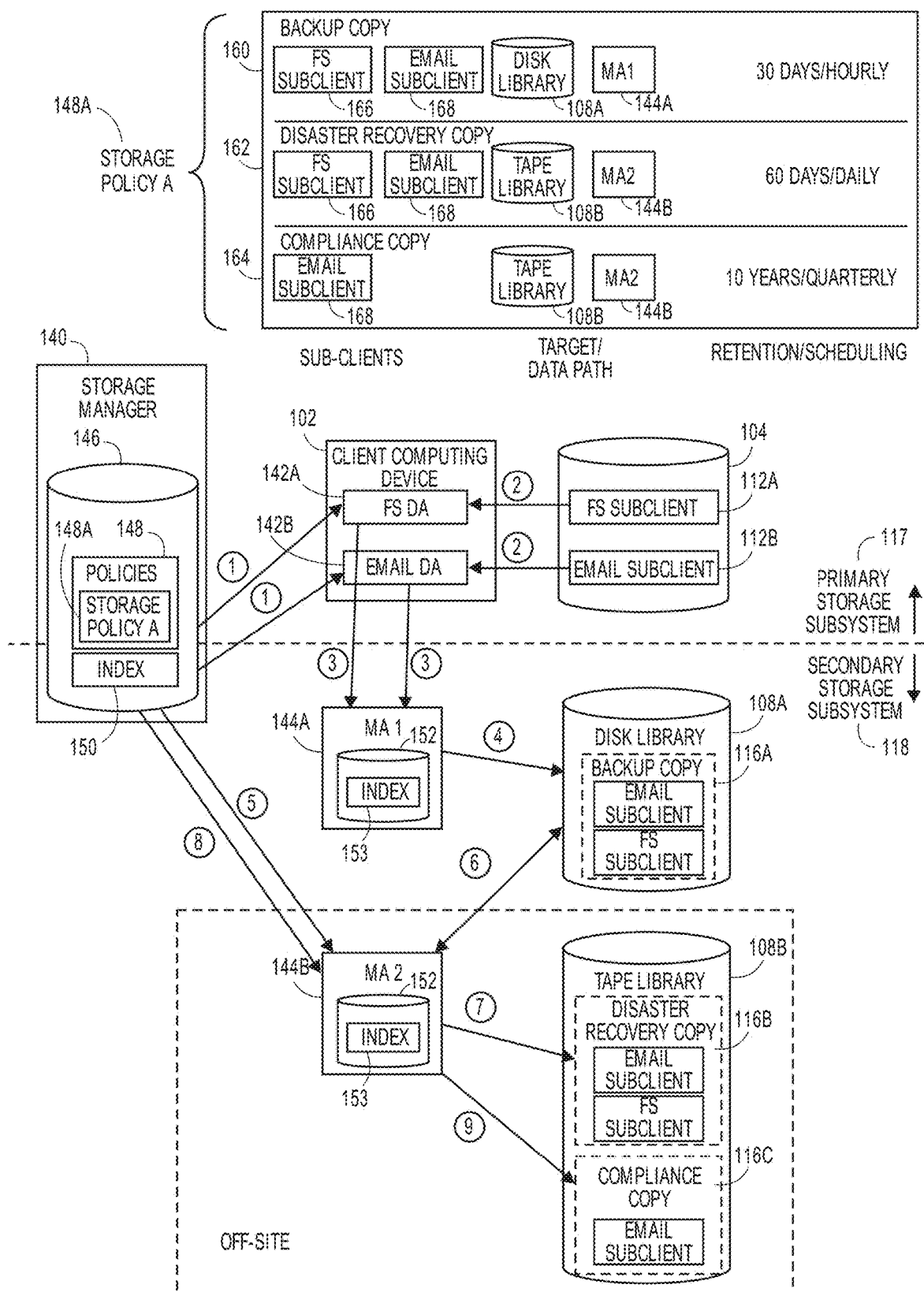
FIG. 1E illustrates certain secondary copy operations according to an exemplary storage policy.

FIG. 1E includes a data flow diagram depicting performance of secondary copy operations by an embodiment of information management system 100, according to an exemplary storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The exemplary storage policy 148A includes backup copy preferences or rule set 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that the copies it governs will be generated quarterly and retained for 10 years.

Secondary Copy Jobs

A logical grouping of secondary copy operations governed by a rule set and being initiated at a point in time may be referred to as a "secondary copy job" (and sometimes may be called a "backup job," even though it is not necessarily limited to creating only backup copies). Secondary copy jobs may be initiated on demand as well. Steps 1-9 below illustrate three secondary copy jobs based on storage policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. Illustratively this includes steps 5-7 occurring daily for creating disaster recovery copy 116B. Illustratively, and by way of illustrating the scalable aspects and off-loading principles embedded in system 100, disaster recovery copy 116B is based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 112B from primary storage device 104 as sources. The disaster recovery copy operation is initiated once a day and disaster recovery copies 116B are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage Policies—Information Governance Policies and Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578,120.

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
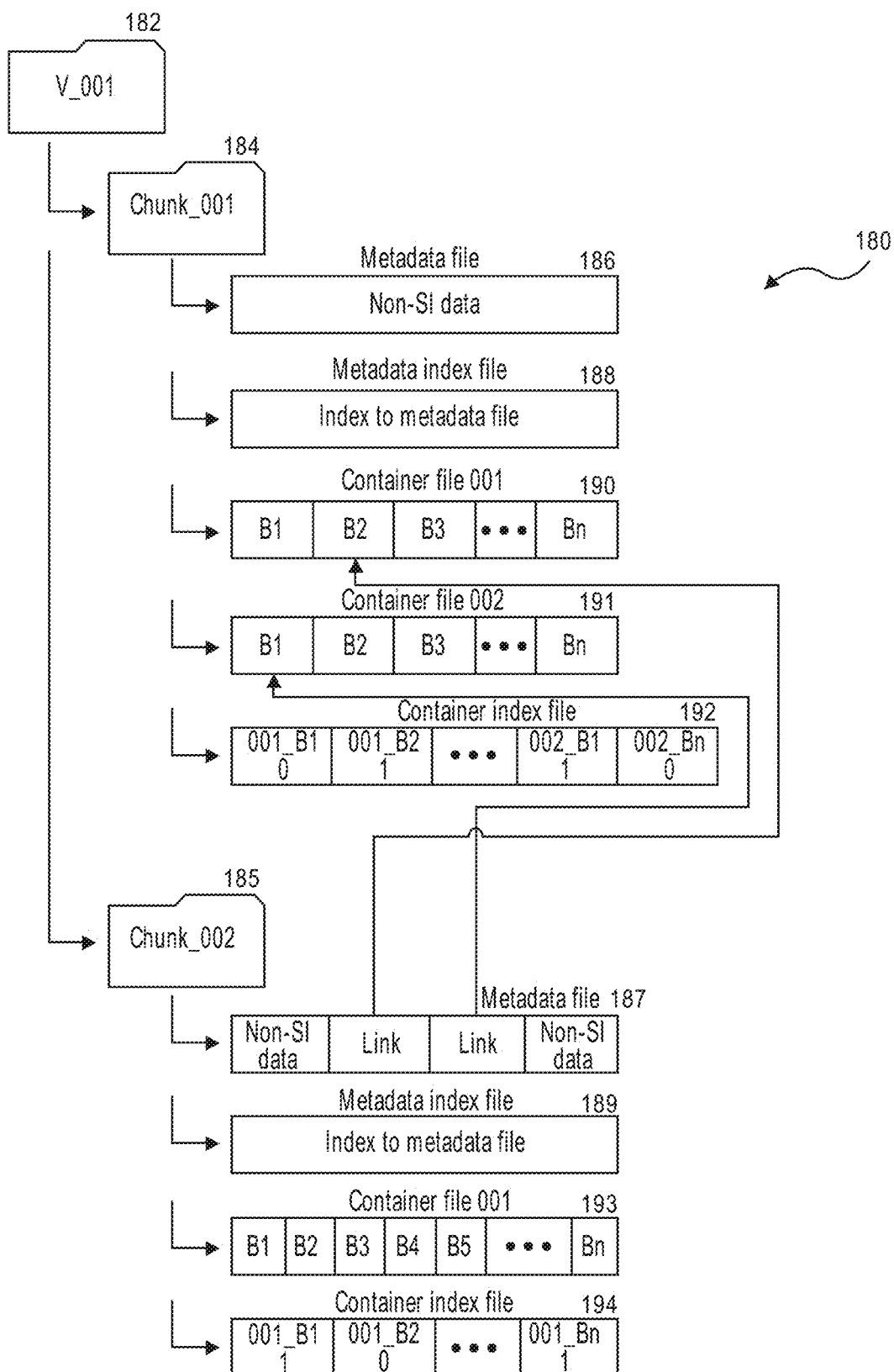

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Using Backup Data for Replication and Disaster Recovery ("Live Synchronization")

There is an increased demand to off-load resource intensive information management tasks (e.g., data replication tasks) away from production devices (e.g., physical or virtual client computing devices) in order to maximize production efficiency. At the same time, enterprises expect access to readily-available up-to-date recovery copies in the event of failure, with little or no production downtime.

Figure 2A:
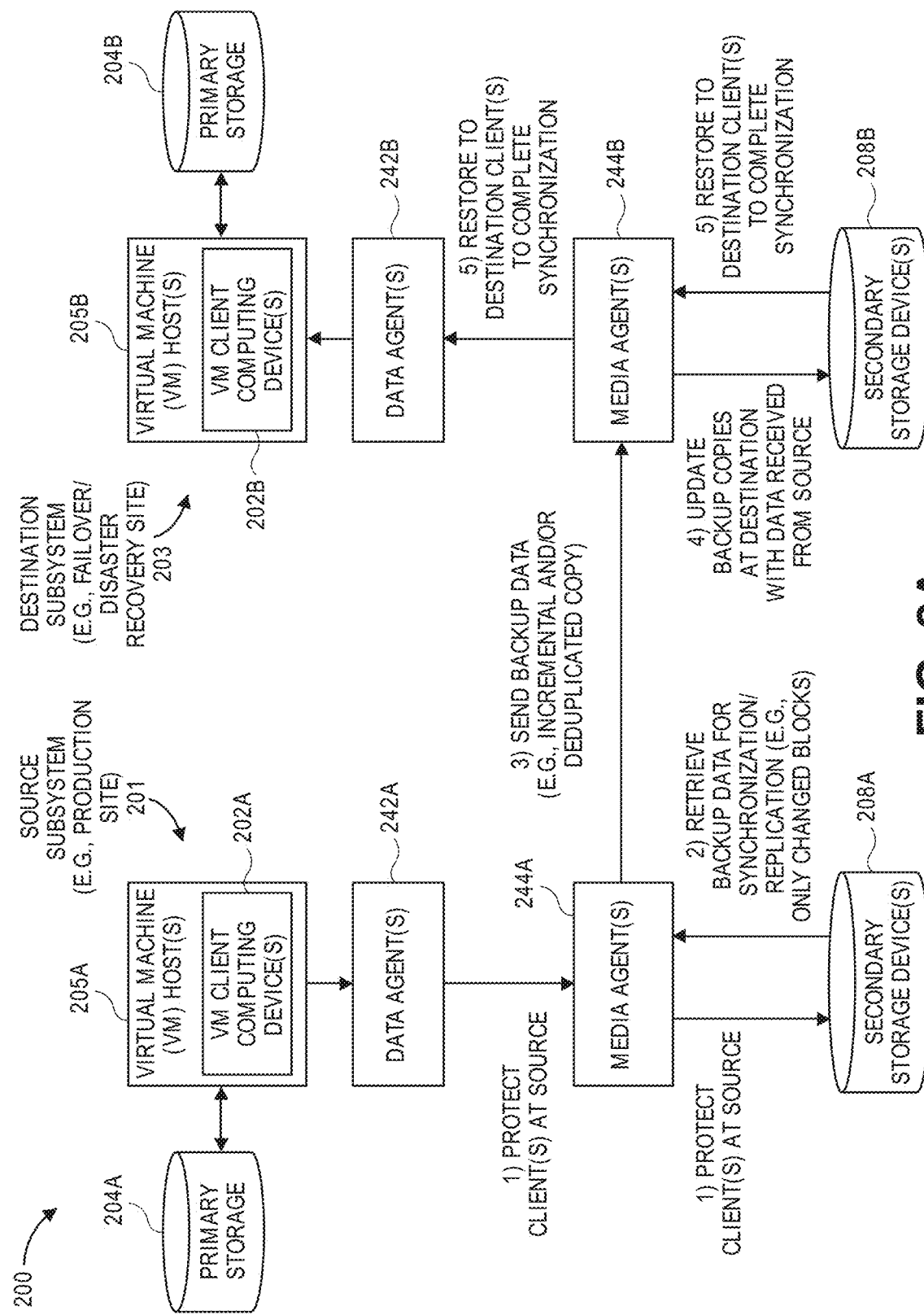
FIG. 2A illustrates a system and technique for synchronizing primary data to a destination such as a failover site using secondary copy data.

FIG. 2A illustrates a system 200 configured to address these and other issues by using backup or other secondary copy data to synchronize a source subsystem 201 (e.g., a production site) with a destination subsystem 203 (e.g., a failover site). Such a technique can be referred to as "live synchronization" and/or "live synchronization replication." In the illustrated embodiment, the source client computing devices 202a include one or more virtual machines (or "VMs") executing on one or more corresponding VM host computers 205a, though the source need not be virtualized. The destination site 203 may be at a location that is remote from the production site 201, or may be located in the same data center, without limitation. One or more of the production site 201 and destination site 203 may reside at data centers at known geographic locations, or alternatively may operate "in the cloud."

The synchronization can be achieved by generally applying an ongoing stream of incremental backups from the source subsystem 201 to the destination subsystem 203, such as according to what can be referred to as an "incremental forever" approach. FIG. 2A illustrates an embodiment of a data flow which may be orchestrated at the direction of one or more storage managers (not shown). At step 1, the source data agent(s) 242a and source media agent(s) 244a work together to write backup or other secondary copies of the primary data generated by the source client computing devices 202a into the source secondary storage device(s) 208a. At step 2, the backup/secondary copies are retrieved by the source media agent(s) 244a from secondary storage. At step 3, source media agent(s) 244a communicate the backup/secondary copies across a network to the destination media agent(s) 244b in destination subsystem 203.

As shown, the data can be copied from source to destination in an incremental fashion, such that only changed blocks are transmitted, and in some cases multiple incremental backups are consolidated at the source so that only the most current changed blocks are transmitted to and applied at the destination. An example of live synchronization of virtual machines using the "incremental forever" approach is found in U.S. Patent Application No. 62/265,339 entitled "Live Synchronization and Management of Virtual Machines across Computing and Virtualization Platforms and Using Live Synchronization to Support Disaster Recovery." Moreover, a deduplicated copy can be employed to further reduce network traffic from source to destination. For instance, the system can utilize the deduplicated copy techniques described in U.S. Pat. No. 9,239,687, entitled "Systems and Methods for Retaining and Using Data Block Signatures in Data Protection Operations."

At step 4, destination media agent(s) 244b write the received backup/secondary copy data to the destination secondary storage device(s) 208b. At step 5, the synchronization is completed when the destination media agent(s) and destination data agent(s) 242b restore the backup/secondary copy data to the destination client computing device(s) 202b. The destination client computing device(s) 202b may be kept "warm" awaiting activation in case failure is detected at the source. This synchronization/replication process can incorporate the techniques described in U.S. patent application Ser. No. 14/721,971, entitled "Replication Using Deduplicated Secondary Copy Data."

Where the incremental backups are applied on a frequent, on-going basis, the synchronized copies can be viewed as mirror or replication copies. Moreover, by applying the incremental backups to the destination site 203 using backup or other secondary copy data, the production site 201 is not burdened with the synchronization operations. Because the destination site 203 can be maintained in a synchronized "warm" state, the downtime for switching over from the production site 201 to the destination site 203 is substantially less than with a typical restore from secondary storage. Thus, the production site 201 may flexibly and efficiently fail over, with minimal downtime and with relatively up-to-date data, to a destination site 203, such as a cloud-based failover site. The destination site 203 can later be reverse synchronized back to the production site 201, such as after repairs have been implemented or after the failure has passed.

Integrating with the Cloud Using File System Protocols

Figure 2B:
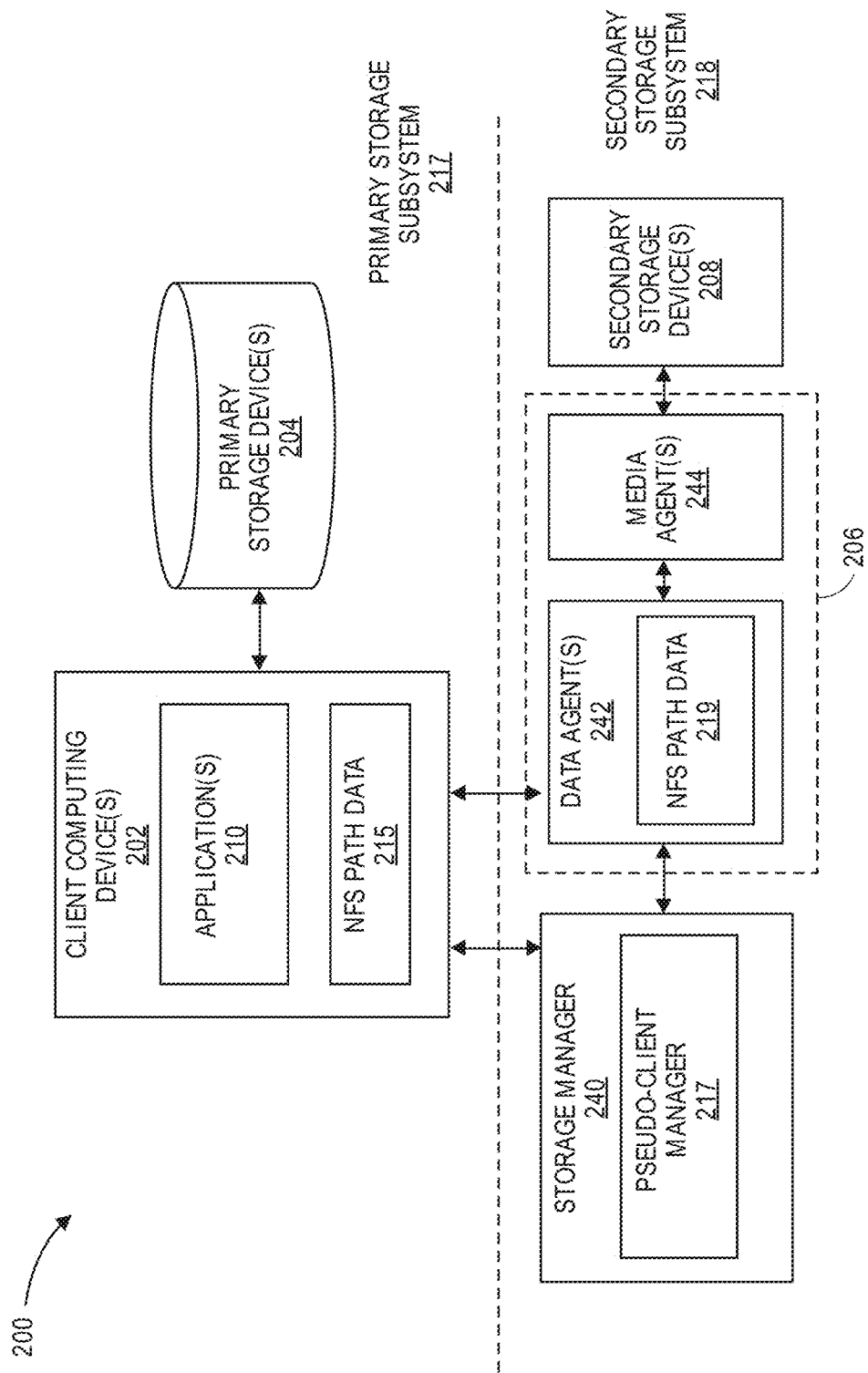
FIG. 2B illustrates an information management system architecture incorporating use of a network file system (NFS) protocol for communicating between the primary and secondary storage subsystems.

Given the ubiquity of cloud computing, it can be increasingly useful to provide data protection and other information management services in a scalable, transparent, and highly plug-able fashion. FIG. 2B illustrates an information management system 200 having an architecture that provides such advantages, and incorporates use of a standard file system protocol between primary and secondary storage subsystems 217, 218. As shown, the use of the network file system (NFS) protocol (or any another appropriate file system protocol such as that of the Common Internet File System (CIFS)) allows data agent 242 to be moved from the primary storage subsystem 217 to the secondary storage subsystem 218. For instance, as indicated by the dashed box 206 around data agent 242 and media agent 244, data agent 242 can co-reside with media agent 244 on the same server (e.g., a secondary storage computing device such as component 106), or in some other location in secondary storage subsystem 218.

Where NFS is used, for example, secondary storage subsystem 218 allocates an NFS network path to the client computing device 202 or to one or more target applications 210 running on client computing device 202. During a backup or other secondary copy operation, the client computing device 202 mounts the designated NFS path and writes data to that NFS path. The NFS path may be obtained from NFS path data 215 stored locally at the client computing device 202, and which may be a copy of or otherwise derived from NFS path data 219 stored in the secondary storage subsystem 218.

Write requests issued by client computing device(s) 202 are received by data agent 242 in secondary storage subsystem 218, which translates the requests and works in conjunction with media agent 244 to process and write data to a secondary storage device(s) 208, thereby creating a backup or other secondary copy. Storage manager 240 can include a pseudo-client manager 217, which coordinates the process by, among other things, communicating information relating to client computing device 202 and application 210 (e.g., application type, client computing device identifier, etc.) to data agent 242, obtaining appropriate NFS path data from the data agent 242 (e.g., NFS path information), and delivering such data to client computing device 202.

Conversely, during a restore or recovery operation client computing device 202 reads from the designated NFS network path, and the read request is translated by data agent 242. The data agent 242 then works with media agent 244 to retrieve, re-process (e.g., re-hydrate, decompress, decrypt), and forward the requested data to client computing device 202 using NFS.

By moving specialized software associated with system 200 such as data agent 242 off the client computing devices 202, the illustrative architecture effectively decouples the client computing devices 202 from the installed components of system 200, improving both scalability and plug-ability of system 200. Indeed, the secondary storage subsystem 218 in such environments can be treated simply as a read/write NFS target for primary storage subsystem 217, without the need for information management software to be installed on client computing devices 202. As one example, an enterprise implementing a cloud production computing environment can add VM client computing devices 202 without installing and configuring specialized information management software on these VMs. Rather, backups and restores are achieved transparently, where the new VMs simply write to and read from the designated NFS path. An example of integrating with the cloud using file system protocols or so-called "infinite backup" using NFS share is found in U.S. Patent Application No. 62/294,920, entitled "Data Protection Operations Based on Network Path Information." Examples of improved data restoration scenarios based on network-path information, including using stored backups effectively as primary data sources, may be found in U.S. Patent Application No. 62/297,057, entitled "Data Restoration Operations Based on Network Path Information."

Highly Scalable Managed Data Pool Architecture

Figure 2C:
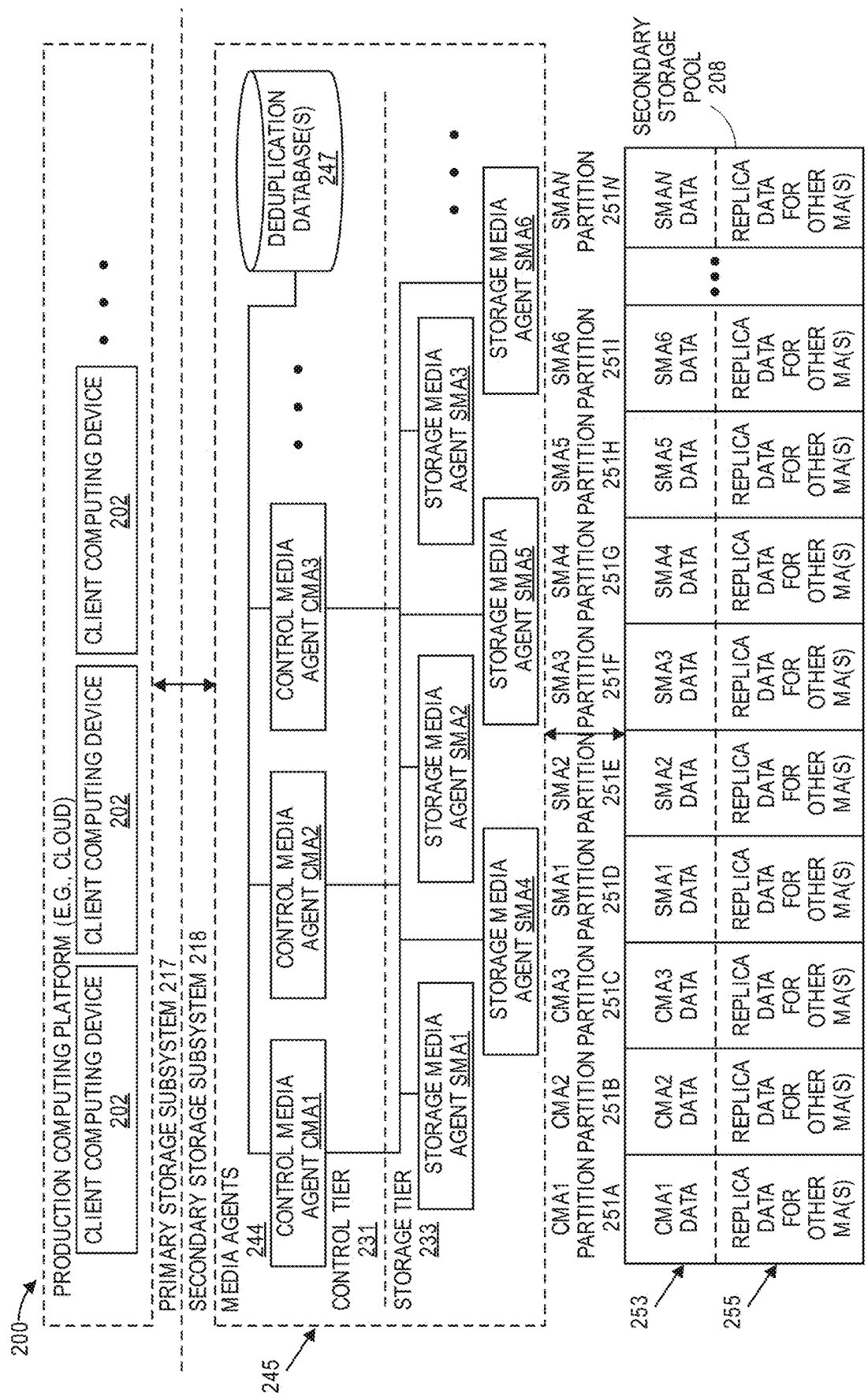
FIG. 2C is a block diagram of an example of a highly scalable managed data pool architecture.

Enterprises are seeing explosive data growth in recent years, often from various applications running in geographically distributed locations. FIG. 2C shows a block diagram of an example of a highly scalable, managed data pool architecture useful in accommodating such data growth. The illustrated system 200, which may be referred to as a "web-scale" architecture according to certain embodiments, can be readily incorporated into both open compute/storage and common-cloud architectures.

The illustrated system 200 includes a grid 245 of media agents 244 logically organized into a control tier 231 and a secondary or storage tier 233. Media agents assigned to the storage tier 233 can be configured to manage a secondary storage pool 208 as a deduplication store, and be configured to receive client write and read requests from the primary storage subsystem 217, and direct those requests to the secondary tier 233 for servicing. For instance, media agents CMA1-CMA3 in the control tier 231 maintain and consult one or more deduplication databases 247, which can include deduplication information (e.g., data block hashes, data block links, file containers for deduplicated files, etc.) sufficient to read deduplicated files from secondary storage pool 208 and write deduplicated files to secondary storage pool 208. For instance, system 200 can incorporate any of the deduplication systems and methods shown and described in U.S. Pat. No. 9,020,900, entitled "Distributed Deduplicated Storage System," and U.S. Pat. Pub. No. 2014/0201170, entitled "High Availability Distributed Deduplicated Storage System."

Media agents SMA1-SMA6 assigned to the secondary tier 233 receive write and read requests from media agents CMA1-CMA3 in control tier 231, and access secondary storage pool 208 to service those requests. Media agents CMA1-CMA3 in control tier 231 can also communicate with secondary storage pool 208, and may execute read and write requests themselves (e.g., in response to requests from other control media agents CMA1-CMA3) in addition to issuing requests to media agents in secondary tier 233. Moreover, while shown as separate from the secondary storage pool 208, deduplication database(s) 247 can in some cases reside in storage devices in secondary storage pool 208.

As shown, each of the media agents 244 (e.g., CMA1-CMA3, SMA1-SMA6, etc.) in grid 245 can be allocated a corresponding dedicated partition 251A-251I, respectively, in secondary storage pool 208. Each partition 251 can include a first portion 253 containing data associated with (e.g., stored by) media agent 244 corresponding to the respective partition 251. System 200 can also implement a desired level of replication, thereby providing redundancy in the event of a failure of a media agent 244 in grid 245. Along these lines, each partition 251 can further include a second portion 255 storing one or more replication copies of the data associated with one or more other media agents 244 in the grid.

System 200 can also be configured to allow for seamless addition of media agents 244 to grid 245 via automatic configuration. As one illustrative example, a storage manager (not shown) or other appropriate component may determine that it is appropriate to add an additional node to control tier 231, and perform some or all of the following: (i) assess the capabilities of a newly added or otherwise available computing device as satisfying a minimum criteria to be configured as or hosting a media agent in control tier 231; (ii) confirm that a sufficient amount of the appropriate type of storage exists to support an additional node in control tier 231 (e.g., enough disk drive capacity exists in storage pool 208 to support an additional deduplication database 247); (iii) install appropriate media agent software on the computing device and configure the computing device according to a pre-determined template; (iv) establish a partition 251 in the storage pool 208 dedicated to the newly established media agent 244; and (v) build any appropriate data structures (e.g., an instance of deduplication database 247). An example of highly scalable managed data pool architecture or so-called web-scale architecture for storage and data management is found in U.S. Patent Application No. 62/273,286 entitled "Redundant and Robust Distributed Deduplication Data Storage System."

The embodiments and components thereof disclosed in FIGS. 2A, 2B, and 2C, as well as those in FIGS. 1A-1H, may be implemented in any combination and permutation to satisfy data storage management and information management needs at one or more locations and/or data centers.

Interoperability Between Components of a Data Storage Management System and Appliances for Data Storage and Deduplication The following paragraphs provide a detailed description of several embodiments of interoperability between certain components of a data storage management system (such as a storage manager component and/or media agent components) and appliances with data storage and deduplication capabilities that are used for efficient storage of secondary and tertiary copies of data (hereinafter "deduplication appliances"). Storage manager 340, media agent 344, media agent index 353, and deduplication appliances 380 are illustrative components that interoperate according the illustrative embodiments herein.

FIG. 3A depicts a data storage management system 300 for interoperability between storage management components and one or more appliances for data storage and deduplication (e.g., deduplication appliance 380), according to an illustrative embodiment of the present invention. FIG. 3A shows a logical view of data flow (bold unidirectional arrows) in system 300 when making secondary and/or tertiary copies to be stored to deduplication appliance(s) 380. FIG. 3A depicts: primary data 112, data agent 142, storage manager 340 comprising management database 346, media agents 344-1 and 344-2, media agent indexes 353-1 and 353-2, and deduplication appliances 380-1 and 380-2, each deduplication appliance comprising one or more storage devices 390 (e.g., 390-1, 390-2, respectively). Communication pathways 114 and 376 are also depicted. The underlying physical infrastructure required to support the depicted communication pathways and interconnectivity is well known in the art. There is no limitation on the number of data agents 142, media agents 344, and deduplication appliances 380 that can be configured within an illustrative system 300. Deduplication appliances 380 are shown here as part of system 300, but in other embodiments they are in communication with but not part of system 300.

Primary data 112 and data agent 142 are described in more detail elsewhere herein. Likewise, communication pathways 114, which connect storage manager 340 with data agent 142 and media agent 344 as well as connecting media agent 344 with data agent 142, are described in more detail elsewhere herein.

System 300 is a data storage management system analogous to system 100 and includes features and components for protecting and managing data, comprising storage manager 340, data agents 142, and media agents 344. Media agents 144 also are included in some embodiments.

Storage manager 340 is analogous to storage manager 140 and additionally comprises features for supporting interoperability with deduplication appliances (e.g., 380) that are used for efficient storage of secondary and tertiary copies of data. Storage manager 340 is generally embodied as software that executes on a computing device having one or more processors and computer memory, which can be implemented in a data center or in a cloud computing environment without limitation. Storage manager 340 manages system 300 as a whole, including managing storage management operations (e.g., making secondary and tertiary copies, restoring data, indexing and classifying data, tracking copies and components, and tracking status of storage management operations and jobs, etc.).

For supporting interoperability with deduplication appliances (e.g., 380), storage manager 340 comprises features that include one or more:
administrative parameters that identify and distinguish deduplication appliances (e.g., 380) from ordinary data storage devices that lack deduplication and other native features;
specialized instructions that direct media agents 344 to segregate payload data apart from metadata apart from indexing information when transmitting to a deduplication appliance (e.g., 380);
specialized instructions that inform media agents 344 that a storage destination at deduplication appliance 380 includes deduplication features (and other native features such as compression and/or encryption) and thus the media agent 344 should not deduplicate (or encrypt/compress) before transmitting data to the deduplication appliance 380;
and
other features as seen in the accompanying figures and described in more detail elsewhere herein.

Management database 346 is analogous to management database 146 and additionally comprises information needed for and resulting from interoperability with deduplication appliances (e.g., 380). For example, one or more of: storage policies for storing secondary and tertiary copies to a deduplication appliance (e.g., 380); deduplication status of secondary and tertiary copies stored to a deduplication appliance (e.g., 380); job status for backup jobs to deduplication appliance destinations; tracking information for secondary/tertiary copies stored at a deduplication appliance (e.g., 380); etc. Management database 346 is logically part of storage manager 340. Management database 346 is shown here as part of storage manager 340, but in other embodiments management database 346 is associated with but not physically part of storage manager 340.

Media agent 344 (e.g., 344-1, 344-2) is analogous to media agent 144 and additionally comprises features for interoperability with deduplication appliances (e.g., 380) in contrast with ordinary secondary storage devices 108. Accordingly, media agent 344 is configured to:
receive and interpret instructions from storage manager 340 indicating that data is to be backed up to or restored from deduplication appliance 380 in contrast to ordinary secondary storage 108;
recognize that a deduplication appliance (e.g., 380) is a designated destination for storing secondary and/or tertiary copies;
recognize that a copy to be restored is currently in a deduplication appliance (e.g., 380);
recognize and segregate payload data from metadata from index information when transmitting to a deduplication appliance (e.g., 380);
instruct the destination deduplication appliance (e.g., 380) to deduplicate certain data such as payload data chunks, and not to deduplicate certain other data such as metadata, pointers, and index information when making copies;
recognize that the deduplication appliance (e.g., 380) is capable of natively deduplicating and/or rehydrating and/or moving data it stores, and therefore avoiding data flowing through media agent 344 when generating synthetic-full and auxiliary copies and other tertiary copies in conjunction with a deduplication appliance (e.g., 380);
recognize that the deduplication appliance (e.g., 380) will rehydrate data chunks on restore operations, thus avoiding the media agent 344 having to rehydrate;
recognize that the deduplication appliance (e.g., 380) also has native encryption and compression features, thus avoiding media agent 344 having to compress/encrypt data destined for the deduplication appliance;
and
other features as seen in the accompanying figures and described in more detail elsewhere herein.

Illustratively, when media agent 344 supplies instructions to deduplicate to deduplication appliance 380, media agent 344 indicates whether deduplication should be based on fixed block size or variable block size; illustratively the choice of fixed-versus-variable is based on the type of data agent 142 that is involved in the backup job. For example, backups for SAP HANA and Virtual Server are illustratively based on fixed block size deduplication based on the respective data agent 142, whereas other backups using other types of data agents 142 use variable size block deduplication (e.g., data agents for SQL Server database, Oracle database, Sybase database, DB2 database, Informix database, Postgres database, File system).

Figure 5A:
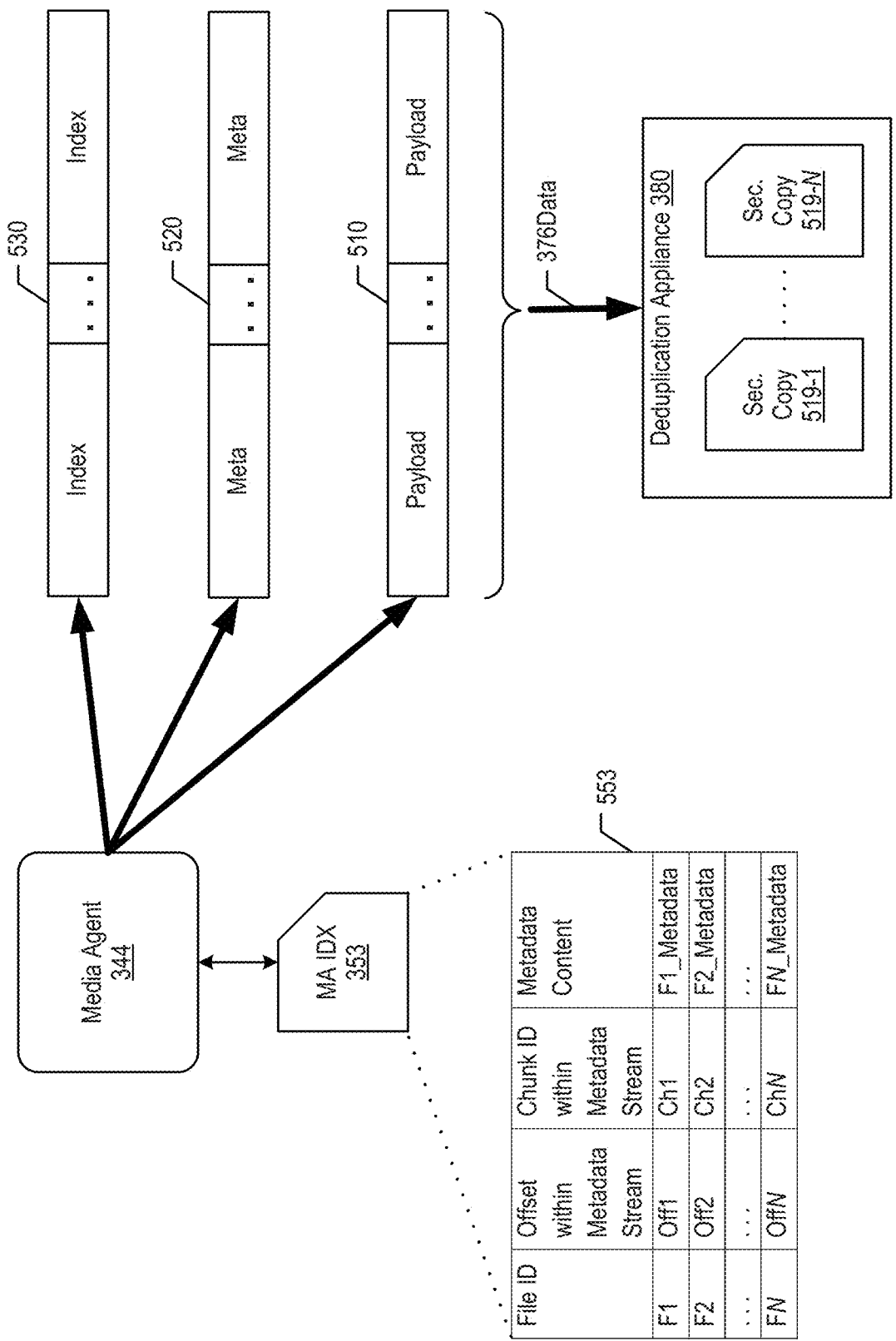
FIG. 5A depicts a logical view of a backup operation in system 300 for generating secondary copies based on primary data by segregating payload, metadata, and index into separate data streams transmitted to an example deduplication appliance.

Media agent index 353 (e.g., 353-1, 353-2) ("index 353") is analogous to media agent index 153 and additionally comprises information for supporting interoperability with deduplication appliances (e.g., 380)—see, e.g., FIG. 5A. Illustratively, index 353 resides on the same computing device that hosts media agent 344—see, e.g., FIG. 3B. Media agent index 353 is associated with media agent 344 and is maintained and used by media agent 344.

Deduplication appliance 380 (e.g., 380-1, 380-2) is a device that comprises one or more data storage devices (e.g., 390) and also comprises features for: deduplicating data stored therein and for tracking the deduplicated data; copying and moving data internally and to/from other deduplication appliances 380; selectively deduplicating some data and not other data; rehydrating data being moved and/or restored from deduplication appliance 380; and other native features such as compression and encryption. Examples of a deduplication appliance 380 include: HPE StoreOnce systems from Hewlett Packard Enterprise of Palo Alto, Calif., USA. Examples of a data storage management system 300 for interoperating with HPE StoreOnce systems include Commvault Complete software from Commvault Systems, Inc. of Tinton Falls, N.J., USA. In other embodiments, Commvault Complete software from Commvault Systems, Inc. also interoperates with appliances other than HPE StoreOnce. The example embodiments given herein for illustration purposes do not limit the features/capabilities of deduplication appliance 380 and/or of data storage components 340, 344, 346, 353, and/or 142.

Storage devices 390 (e.g., 390-1, 390-2) are components of deduplication appliance 380 and are used for storing data at deduplication appliance 380. A given deduplication appliance 380 has one or more storage devices 390, depending on configuration and storage capacity, without limitation.

Communication pathway 376 enables media agent 344 (e.g., 344-1) to communicate with deduplication appliance 380. A suitable protocol such as an Application Programming Interface ("API"), which is well known in the art, enables deduplication appliance 380 to communicate with media agent 344 over communication pathway 376.

The bold arrows in the present figure provide a logical view of how data flows from a source of primary data 112 via data agent 142 via media agent 344-1 and on to deduplication appliance 380-1 to be stored in data storage device 390-1 in the form of secondary and/or tertiary copies. In some embodiments, data also flows from a first deduplication appliance 380-1 to a second deduplication appliance 380-2, without flowing through media agent 344-2. In restore scenarios, the data flow shown here is reversed as data is recovered from one more deduplication appliances 380 and is restored as primary data 112 (see also FIG. 9).

Figure 3B:
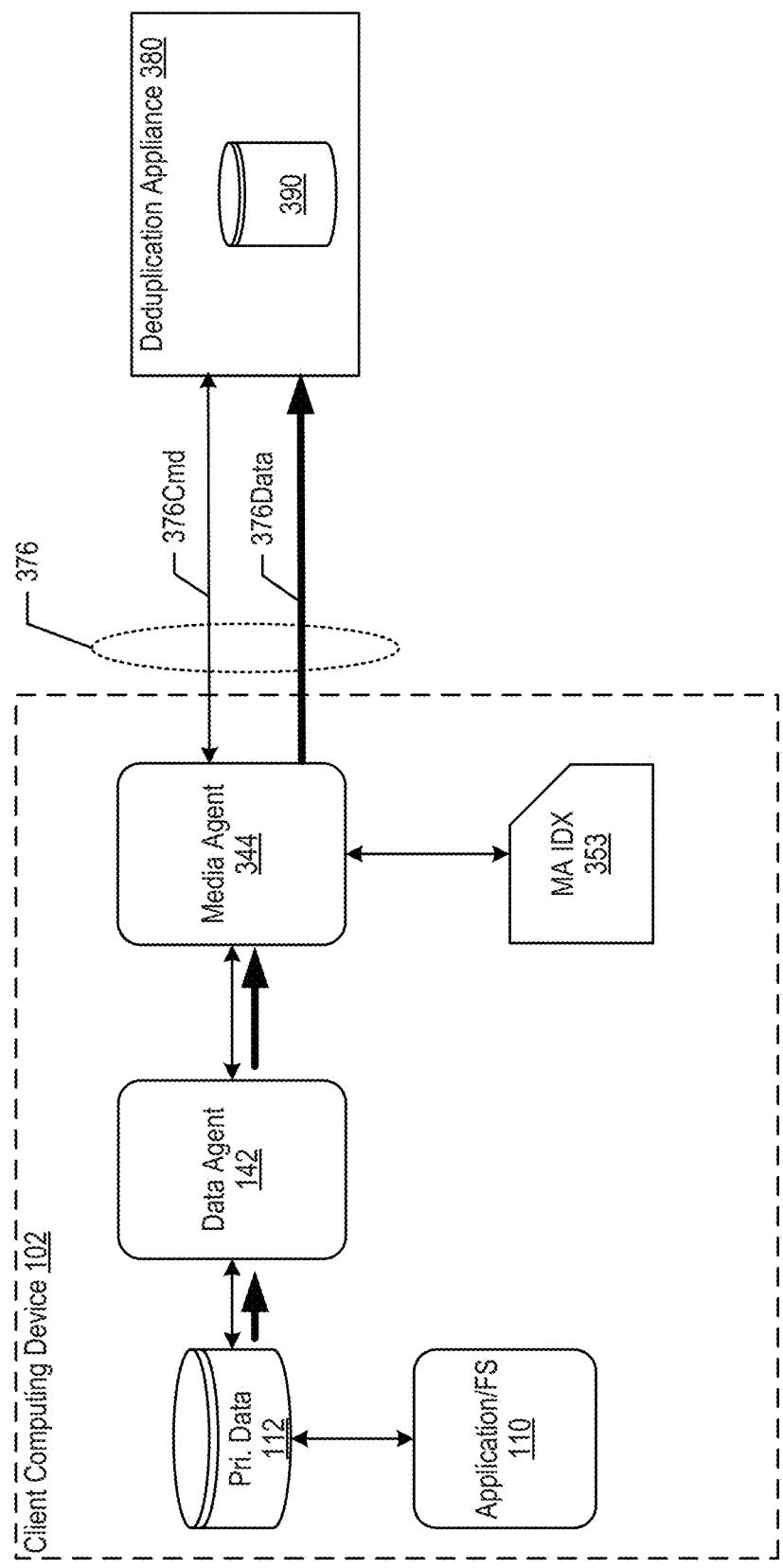
FIG. 3B depicts some details of system 300 including a client configuration and media agent connectivity to a deduplication appliance.

FIG. 3B depicts some details of system 300 including a client configuration and media agent connectivity to a deduplication appliance 380. FIG. 3B depicts: client computing device 102 comprising application/file system 110, primary data 112, data agent 142, media agent 344, and media agent index 353; deduplication appliance 380 comprising one or more data storage devices 390; and communication pathway 376 comprising pathway 376Cmd and pathway 376Data. The bold arrows in the present figure provide a logical view of how data flows from a source of primary data 112 via data agent 142 via media agent 344 and via communication pathway 376Data to deduplication appliance 380 to be stored to data storage device 390.

Client computing device 102, application and/or file system 110, primary data 112, data agent 142, media agent 344, media agent index 353, deduplication appliance 380, and data storage device(s) 390 are described in more detail elsewhere herein. According to an illustrative embodiment, media agent 344 co-resides with data agent 142 on client computing device 102, which comprises one or more processors and computer memory and also hosts an application and/or file system 110, which directly accesses and consumes primary data 112. This arrangement advantageously provides improved performance and lower cost of ownership by avoiding the need for a dedicated secondary storage computing device (e.g., 106) to host media agent 344; however, the invention is not so limited. In some embodiments, one or more media agents 344 are hosted by respective dedicated secondary storage computing devices 106 apart from client computing device 102.

Communication pathway 376 comprises pathway 376Cmd and pathway 376Data. Communication pathway 376Cmd represents a command interface between deduplication appliance 380 and media agent 344, used by an Application Programming Interface ("API"), which is well known in the art. Communication pathway 376Cmd generally comprises commands, instructions, and/or queries issued by media agent 344 to deduplication appliance 380 and responses (e.g., confirmation messages, status reports, query responses, etc.) issued by deduplication appliance 380—and illustratively does not include payload data, metadata content, and/or copies, which are transmitted over communication pathway 376Data instead.

Communication pathway 376Data generally comprises data being transmitted to/from deduplication appliance 380, such as payload data, metadata content, pointers, and index information. Here, the data flow of communication pathway 376Data is shown from media agent 344 to deduplication appliance 380 to illustrate making copies based on primary data 112. In restore scenarios, the data flow direction is reversed (see, e.g., FIG. 9). According to the illustrative embodiments depicted herein, communication pathway 376Data comprises one or more data streams, each data stream comprising different kinds of data (e.g., payload data, metadata, index information)—see, e.g., FIGS. 5A-8.

Figure 4:
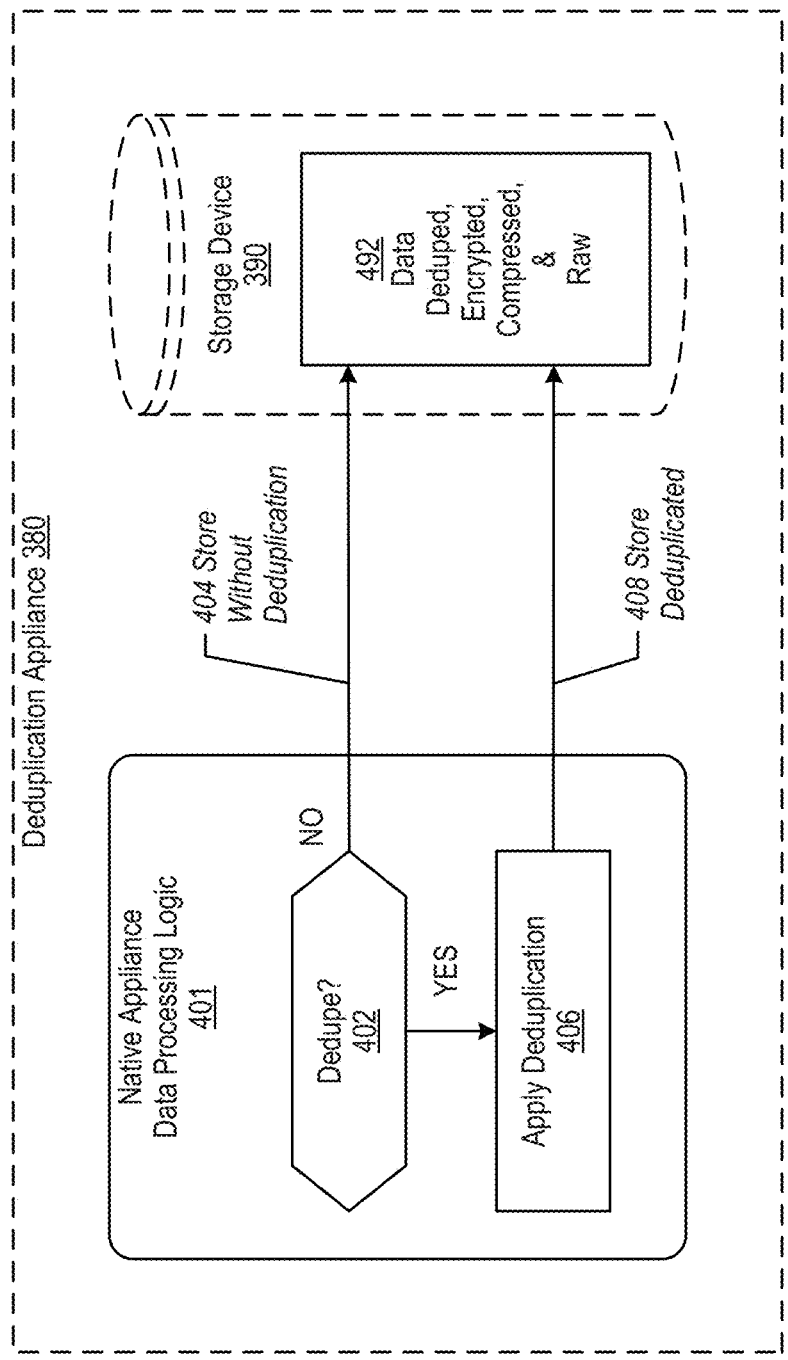
FIG. 4 depicts a high level view of illustrative logic used by an example deduplication appliance.

FIG. 4 depicts a high level view of illustrative logic used by an example deduplication appliance 380. FIG. 4 depicts: deduplication appliance 380 comprising native appliance data processing logic 401 and storage device 390 which comprises data 492 in deduplicated, encrypted, compressed, and/or raw form. Logical blocks 402 and 406 and logical data pathways 404 and 408 are also depicted.

Native appliance data processing logic 401 is shown here as a high-level illustration of how deduplication appliance 380 handles certain data before storing it internally to data storage device(s) 390. Logic 401 is merely a logical view and can be implemented in any suitable manner known in the art according to the particular architecture and capabilities of a given deduplication appliance 380.

At block 402, which represents a decision point, deduplication appliance 380 (e.g., using logic 401) determines whether a set of data (e.g., data stream, data chunk, data block, data extent, etc.) should be subjected to deduplication by deduplication appliance 380. The determination is illustratively based upon instructions received from media agent 344 (e.g., using communication pathway 376Cmd); in other embodiments the determination is based on indicators embedded in the set of data (e.g., received via communication pathway 376Data). If deduplication is to be applied, control passes to block 406; otherwise, the set of data is "passed through" to storage 390 without deduplication.

Data that is usually unique (e.g., due to time stamps, indexing entries, header details, access control lists, pointers, etc.) does not make an efficient deduplication target, and therefore making the attempt to deduplicate can be wasteful as it will not yield substantial results—hence logical pathway 404 is used to "store without deduplication." According to illustrative embodiments, media agent 344 instructs that the following kinds of data not be subjected to deduplication at deduplication appliance 380: metadata content and pointers to other data streams and to data within data streams (see, e.g., data streams 520, 530). On the other hand, payload data is more likely to be duplicative of other data and therefore is a good candidate for deduplication—hence block 406 and logical pathway 408 are used for "store deduplicated."

At block 406, deduplication appliance 380 (e.g., using logic 401) applies deduplication to the set of data using its own native deduplication techniques. Accordingly, deduplication appliance 380 follows logical pathway 408 and stores the set of data in deduplicated form to storage device(s) 390. Illustratively, when media agent 344 supplies instructions to deduplicate to deduplication appliance 380, media agent indicates whether deduplication should be based on fixed block size or variable block size; illustratively the choice of fixed-versus-variable is based on the type of data agent 142 that is involved in the backup operation.

Deduplication appliance 380 also comprises other native data manipulation features besides deduplication, which illustratively include compression and encryption. Media agent 344 instructs deduplication appliance 380 to compress and/or encrypt data using the API. Thus, the native features of deduplication appliance 380, including deduplication, compression, encryption, and the corresponding rehydration, decompression, and decryption features off-load media agent 344 from carrying out these computationally demanding operations.

Stored data 492 is a logical depiction of data that is stored within deduplication appliance 380, which includes data in any suitable form, including one or more of raw, compressed, encrypted, deduplicated, etc. For example, secondary copies 519, 629, 729, and 829 all are part of stored data 492. How deduplication appliance 380 manages and tracks the data it stores is not shown here. However, according to an illustrative embodiment media agent 344 is aware of storage resources 390 at deduplication appliance 380 and can direct data to be stored to certain specific locations and/or using offsets within data storage device(s) 390 and/or using offsets with data streams, which can be mapped to storage locations. Thus, media agent 344 "knows" where certain data chunks are to be stored.

FIG. 5A depicts a logical view of a backup operation in system 300 for generating secondary copies based on primary data by segregating payload, metadata, and index information into separate data streams transmitted to an example deduplication appliance 380. This scenario is used when making one or more initial secondary copies (e.g., 519-1 . . . 519-N) based on primary data, wherein the secondary copies are stored at deduplication appliance 380. FIG. 5A depicts: media agent 344; media agent index 353 comprising an illustrative data structure 553; deduplication appliance 380 comprising secondary copies 519-1 . . . 519-N; and data streams 510, 520, and 530 that originate at media agent 344 and terminate at deduplication appliance 380 over communication pathway 376Data.

Media agent 344 generates three distinct data streams comprising mutually segregated types of data (e.g., payload, metadata content, index information). The distinct data streams 510, 520, and 530 are collectively transmitted to deduplication appliance 380 via communication pathway 376Data. This approach is distinguishable from the traditional approach used by media agents 144, in which payload and metadata are interleaved within the same data stream as shown in FIGS. 1F and 1G. That traditional approach is advantageous with ordinary data storage devices 108, where control over the data formatting and organization resides with media agent 144, but is not advantageous for the illustrative deduplication appliance 380.

Data stream 510 ("payload data stream 510") originates at media agent 344. Data stream 510 comprises a plurality of data chunks that comprise only payload data extracted from the data source (e.g., from primary data 112, from a snapshot of primary data 112). Data sources illustratively include data files stored as primary data 112. Media agent 344 is capable of determining what portions of source data (e.g., what parts of a data file) is payload data versus metadata. Accordingly, media agent 344 segregates the payload data into data chunks that form data stream 510. Each payload data chunk is uniquely identified. Payload data chunks in data stream 510 can be of any size without limitation. More details are given in the next figure.

Secondary copies 519 (e.g., 519-1 . . . 519-N), are stored at deduplication appliance 380 in one or more storage devices 390 (not shown in the present figure). Each secondary copy 519 is based on primary data 112. As explained in more detail elsewhere herein, data agent 142 and media agent 344 are responsible for generating a secondary copy 519 based on primary data 112, but after receiving data streams 510, 520, and 530 from media agent 344 deduplication appliance 380 also contributes one or more of its own native features, such as storage, tracking, deduplication, compression, encryption, etc. Secondary copies 519 are sources of data for tertiary copies such as 629, 729, and/or 829. Secondary copies 519 can be restored to a native data format that is directly accessible as primary data 112 to an application/file system 110 that executes at a client computing device 102—whether the same as the original source primary data 112 or elsewhere. There is no limit on how many secondary copies 519 are generated and stored to deduplication appliance 380 according to the illustrative embodiments.

A backup job based on source primary data 112 generates the depicted data streams 510, 520, and 530, which are transmitted by media agent 344 to deduplication appliance 380. Deduplication appliance 380 applies further processing to the received data streams (see, e.g., FIGS. 4, 10, 11) and stores the resultant secondary copy(ies) 519 to one or more data storage devices 390. Specific destination storage locations are instructed by media agent 344 according to an illustrative embodiment, but in some embodiments deduplication appliance 380 reports storage locations to media agent 344, which in turn updates its associated media agent index 353.

Data stream 520 ("metadata stream 520") originates at media agent 344. Data stream 520 comprises a plurality of data chunks each of which corresponds to one or more payload data chunks in data stream 510. Each data chunk in data stream 520 (hereinafter "meta-chunk") comprises:
 (i) metadata content extracted from the backup source (e.g., file properties, file header information, access control lists, etc.), and (ii) one or more pointers to payload data chunks in data stream 510 that belong to the same source (e.g., payload for the same data file from which the metadata content was extracted).

Thus, meta-chunks in data stream 520 directly relate to payload data chunks in data stream 510. For any given data source, such as a file, a database, etc., payload data is transmitted to deduplication appliance 380 in data stream 510, while its associated metadata content is segregated into and separately transmitted in data stream 520 along with pointers to the payload data chunks in data stream 510.

Data stream 530 ("index data stream 530" or "index stream 530") originates at media agent 344. Data stream 530 comprises a plurality of data chunks each of which corresponds to a meta-chunk in data stream 520. Each data chunk in data stream 530 (hereinafter "index chunk") comprises index information generated by media agent 344 in reference to meta-chunks in data stream 520. Media agent 344 indexes the meta-chunks of data stream 520 into an illustrative data structure 553 maintained in media agent index 353. The index information enables media agent 344 to track and find meta-chunks transmitted to deduplication appliance 380 in data stream 520, for example keeping identifiers of and pointers to each meta-chunk, which in turn is associated with its source file. This indexing information is packed into the illustrative index chunks of index stream 530. By storing this information at deduplication appliance 380, system 300 enables another media agent 344 to extract data from deduplication appliance 380. See, e.g., FIGS. 6-8.

Data structure 553 is illustratively maintained in media agent index 353, but the invention is not so limited. The information depicted in data structure 553 can be organized and stored by media agent 344 in any suitable fashion and location readily accessible to media agent 344 such as in index 353. Table 553 is an example of data that media agent 344 generates and stores for interoperability with deduplication appliance 380. Table 553 comprises index information (or "indexing information") that media agent 344 generates and/or retains. Illustratively, table 553 comprises indexing information pertaining to metadata streams 520. For example, table 553 comprises one or more rows for each file backed up via media agent 344, e.g., file F1, file F2 . . . File FN. For each backed up file, table 553 stores an offset value and a meta-chunk ID within a metadata stream 520 in which the given meta-chunk was transmitted. Thus, each meta-chunk is uniquely identified (e.g., Ch1) and located (e.g., Off1) within the data stream 520 that carried it to deduplication appliance 380. This information enables data agent 344 to locate each meta-chunk at deduplication appliance 380. From there, media agent 344 can extract pointers to corresponding payload data chunks stored at deduplication appliance 380. The information indexed to data structure 553 is thus used in index stream 530, as shown in more detail in the next figure.

Optionally, media agent 344 also keeps a copy of metadata content that was part of a meta-chunk, such as Ch1. Metadata content differs from a meta-chunk. Metadata content is only part of what a meta-chunk comprises. Metadata content is associated with the source file (e.g., file properties, file header information, access control lists, etc.), but does not comprise pointers to payload data in data stream 510. The pointers can be obtained from the meta-chunk in deduplication appliance 380, i.e., the pointers to payload data are not stored at data structure 553, though the invention is not so limited.

Thus, the illustrative embodiment features a tiered indexing approach that minimizes how much data is retained and stored at media agent 344 (e.g., in table 553), yet enables media agent to efficiently extract what information it needs from deduplication appliance 380. Retaining metadata content at media agent 344 (e.g., in table 553) enables media agent 344 to have fast and local access to important information about the data it backed up to deduplication appliance 380.

Figure 5B:
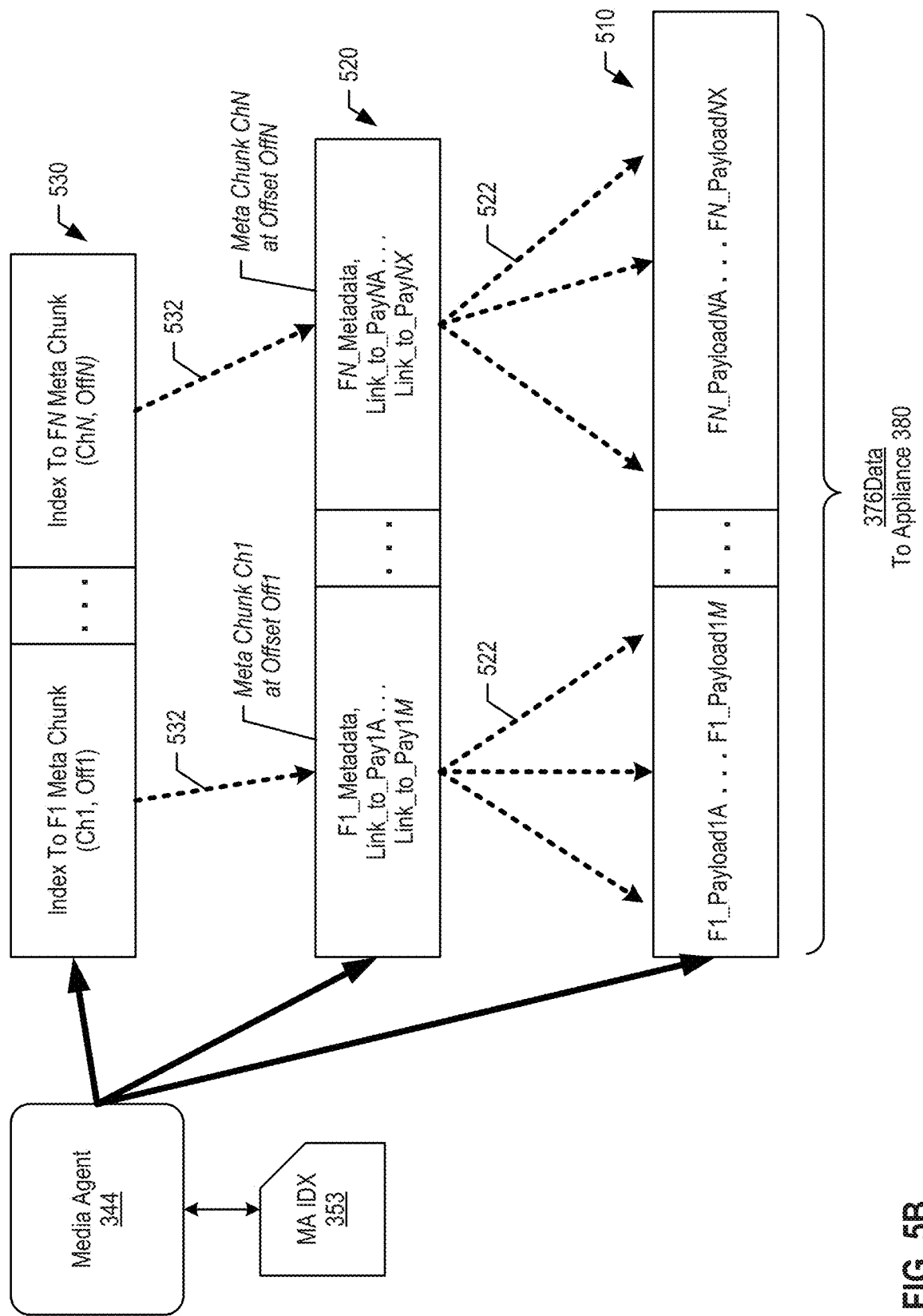
FIG. 5B depicts some details of data streams 510, 520, and 530 for generating secondary copies to be stored in an example deduplication appliance.

FIG. 5B depicts some details of data streams 510, 520, and 530 for generating secondary copies 519 to be stored in an example deduplication appliance 380. FIG. 5B depicts: media agent 344, media agent index 353, communication pathway 376Data to deduplication appliance 380, and data streams 510, 520, and 530.

Data stream 510 comprises payload data extracted from one or more sources of data, e.g., data files F1 . . . FN. For each data file, media agent 344 generates one or more payload data chunks, e.g., F1_Payload1A through F1_Payload1M from file F1, FN_PayloadNA through FN_PayloadNX from file FN, etc. Media agent 344 transmits the payload data chunks in data stream 510 to deduplication appliance 380.

Data stream 520 comprises meta-chunks. Each meta-chunk comprises:
(i) metadata content extracted from the backup source (e.g., file properties, file header information, access control lists, etc.), and
(ii) one or more pointers to payload data chunks in data stream 510 that belong to the same source (e.g., payload for the same data file from which the metadata content was extracted, as depicted by dotted arrows 522.

Thus, for a given source of data, e.g., file F1, metadata stream 520 comprises a meta-chunk identified as Ch1 and located at offset Off1 in metadata stream 520, and the meta-chunk comprises both: (i) metadata content extracted from file F1 (e.g., F1_Metadata), and (ii) a pointer (e.g., link_to_Pay1A . . . link_to_Pay1M) to a corresponding payload data chunk from file F1 that appears in data stream 510. Likewise, for another source data file, e.g., file FN, metadata stream 520 comprises a meta-chunk identified as ChN and located at offset OffN in metadata stream 520, and the meta-chunk comprises both: (i) metadata content extracted from file FN (e.g., FN_Metadata), and (ii) a pointer to a corresponding payload data chunk from file FN (e.g., link_to_PayNA . . . link_to_PayNX). Illustratively, media agent 344 generates only one meta-chunk per data source, e.g., meta-chunk Ch1 for file F1, but the invention is not so limited.

Data stream 530 comprises index information pointing to corresponding meta-chunks in data stream 520, as depicted by dotted arrows 532. Thus for a given data source, e.g., file F1, an index chunk in index data stream 530 comprises a pointer to a meta-chunk for file F1 that is carried in data stream 520. For example, a first index chunk in index data stream 530 corresponds to source file F1 and points to F1 meta-chunk with chunk ID Ch1 at offset Off1 in metadata stream 520. Illustratively, media agent 344 generates only one index chunk per data source, e.g., file F1, but the invention is not so limited.

After secondary copy 519 is generated and stored at deduplication appliance 380, subsequent (tertiary) copies are made without passing the backed up payload data through media agent 344 again. In such scenarios, media agent 344 uses the information it gathered in index 353 (e.g., in data structure 553) to instruct deduplication appliance 380 to make more copies based on the data stored within the appliance, e.g., synthetic-full copies, auxiliary copies, etc.—as described in more detail in other figures herein.

Figure 6:
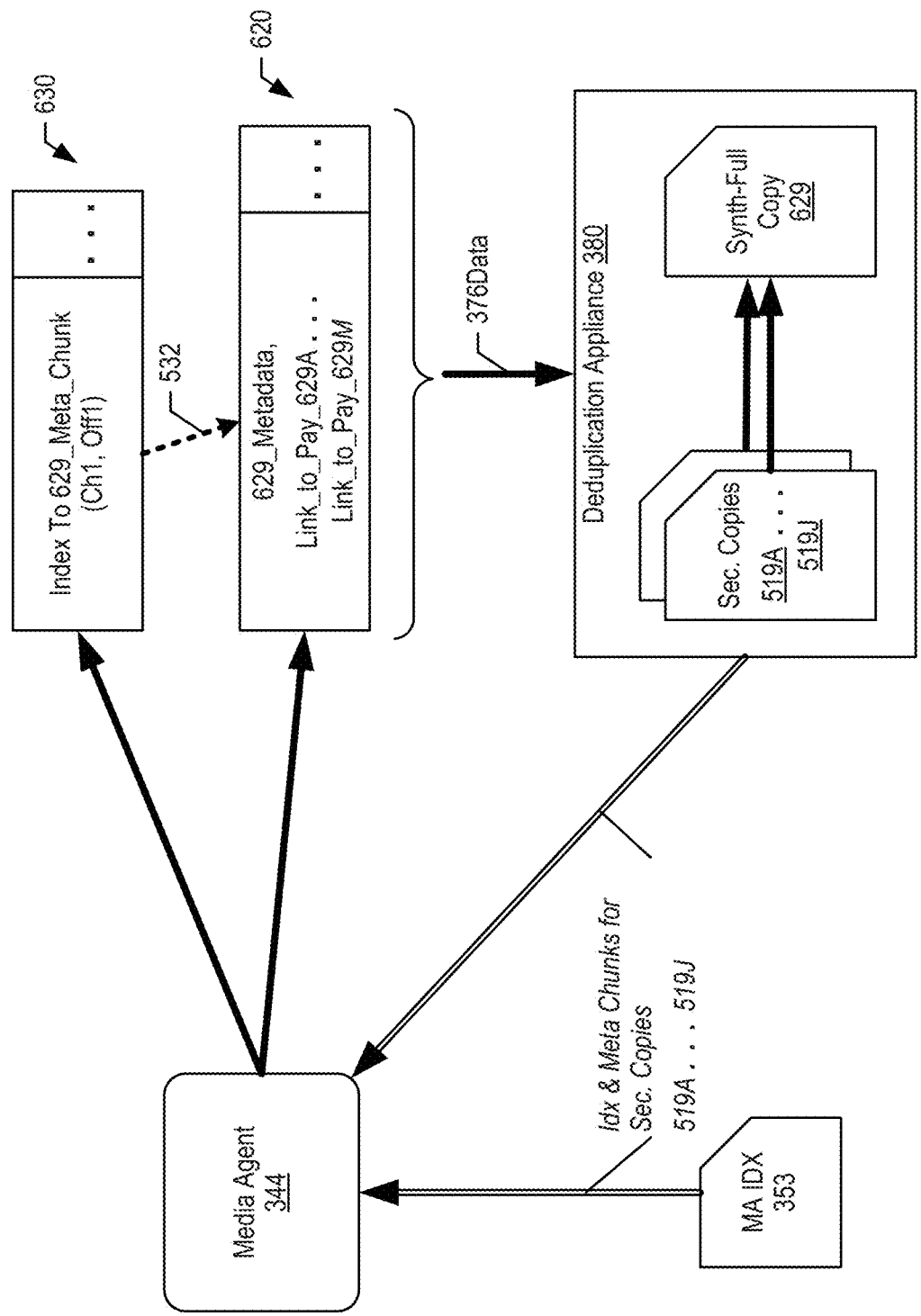
FIG. 6 depicts a logical view of a backup operation in system 300 for generating tertiary copies based on a combination of other copies, e.g., making a synthetic-full copy stored to an example deduplication appliance.

FIG. 6 depicts a logical view of a backup operation in system 300 for generating tertiary copies based on a combination of other copies, e.g., making a synthetic-full copy stored to an example deduplication appliance. FIG. 6 depicts: media agent 344, media agent index 353, data streams 620 and 630 using communication pathway 376Data, and deduplication appliance 380 comprising secondary copies 519A . . . 519J and synthetic-full copy 629. Logical data flows into media agent 344 are depicted by two-line unidirectional arrows, indicating that media agent 344 retrieves index information and meta-chunks for secondary copies 519A . . . 519J. Logical data flows for generating synthetic-full copy 629 are depicted by bold unidirectional arrows.

Secondary copies 519A . . . 519J are copies based on primary data that were generated in a backup job such as described in FIGS. 5A and 5B. Examples of secondary copies 519 include a full backup copy, an incremental backup copy, and a differential backup copy. Each secondary copy 519 is stored at deduplication appliance 380. Using these secondary copies 519 as a source (i.e., not returning to primary data 112), data storage management system 300 is configured to generate one or more synthetic-full copies such as synthetic-full copy 629, which is also stored in deduplication appliance 380 (or in another deduplication appliance 380).

Synthetic-full copy 629 is generated from a plurality of secondary copies 519, e.g., 519A . . . 519J. Because it is created from existing secondary copies and not from primary data, synthetic-full copy 629 is sometimes referred to herein as a tertiary copy. Synthetic-full copies as a concept are well known in the art, i.e., creating a full backup copy of data at a certain point in time by integrating the most recent data present in a full backup copy accompanied by one or more subsequent backup copies (e.g., differential and/or incremental copies). Accordingly a synthetic-full copy is created by manipulating existing secondary copies without accessing primary data, i.e., within the backup system. The synthetic-full copy represents a complete set of data at a certain point in time, which can be further copied and/or archived as needed.

Although the concept of synthetic-full copies is well known in the art, the method of creating synthetic-full copy 629 through interoperability with deduplication appliance 380 presents novel aspects. See also FIG. 12. By interoperating with deduplication appliance 380, media agent 344 avoids many of the traditional data processing operations involved in creating a synthetic-full copy, i.e., reading from the full backup copy in storage, reading from the subsequent (e.g., differential, incremental) copies in storage, generating the resultant synthetic-full copy, and transmitting the synthetic-full copy to suitable secondary storage. These traditional operations include not only data manipulation but also add to network traffic as data is retrieved from secondary storage, processed by the media agent, and transmitted back to secondary storage. Even if the synthetic-full copy is not staged (i.e., not arranged in its entirety) at the media agent and is assembled on the fly, the traditional result is that network traffic is increased from data traveling to and from the media agent.

However, according to the illustrative embodiments that use interoperability with deduplication appliance 380, no payload data flows through media agent 344 to generate synthetic-full copies. Instead, media agent 344 retrieves useful indexing information and meta-chunks created when secondary copies 519 were initially created, as depicted by the two-line unidirectional arrows that feed into media agent 344. Media agent 344 determines which portions of the source secondary copies 519 to include in synthetic-full copy 629, and generates indexing information and meta-chunks for the new synthetic-full copy 629, which are transmitted to deduplication appliance 380 using data streams 620 and 630. No payload data travels to/from media agent 344. Data agent 344 instructs deduplication appliance 380 on how to use data streams 620 and 630 to create synthetic-full copy 629. Instructions are transmitted by data agent 344 to deduplication appliance 380 (e.g., by using communication pathway 376Cmd not shown in the present figure). In some embodiments, media agent 344 uses "clone" commands to instruct deduplication appliance 380 on which payload data to use for synthetic-full copy 629 (e.g., by using communication pathway 376Data rather than 376Cmd). Deduplication appliance 380 performs the payload data manipulation, adds metadata content, and stores synthetic-full copy 629. Deduplication appliance 380 adds deduplication according to its own native features without involving media agent 344 in deduplication operations.

This lightweight approach substantially lightens the data processing load on the media agent 344 and puts only a minimal load on the data network, because communication pathway 376Cmd and data streams 620 and 630 carry relatively little data compared to transmitting payload data between media agent 344 and deduplication appliance 380. After synthetic-full copy 629 is created, media agent 344 updates index 353 to reflect the presence of a new backup copy (629) in the system. Media agent 344 also reports the successful creation of synthetic-full copy 629 to storage manager 340.

Data stream 620 is analogous to metadata stream 520. Data stream 620 is a metadata stream that originates at media agent 344 and terminates at deduplication appliance 380. Data stream 620 comprises one or more meta-chunks for synthetic-full copy 629, each of which comprises: (i) metadata content to be combined with payload data, and (ii) pointers to payload data chunks stored in deduplication appliance 380 that will be assembled into synthetic-full copy 629.

Data stream 630 is analogous to data stream 530. Data stream 630 is an index stream that originates at media agent 344 and terminates at deduplication appliance 380. Data stream 630 comprise one or more index chunks each of which points to a corresponding meta-chunk in data stream 620, as depicted by dotted arrow 532. Index information in data stream 630 is also stored by media agent to its associated media agent index 353 (e.g., in data structure 553). Optionally, metadata content transmitted in metadata stream 620 also is stored therein as discussed in regard to FIG. 5A.

Figure 7:
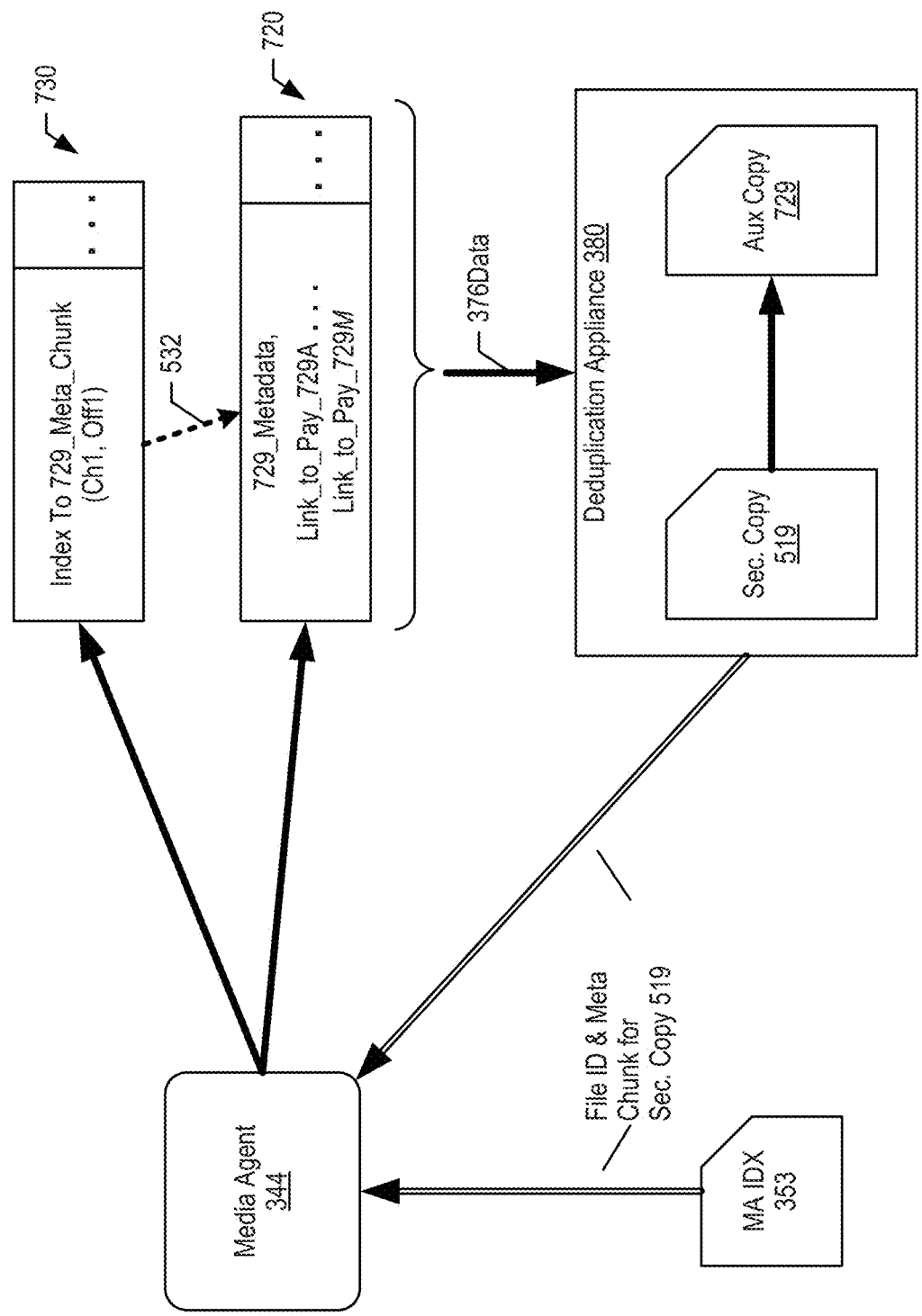
FIG. 7 depicts a logical view of a backup operation in system 300 for generating tertiary copies based on other copies, e.g., making an auxiliary copy stored to an example deduplication appliance.

FIG. 7 depicts a logical view of a backup operation in system 300 for generating tertiary copies based on other copies, e.g., making an auxiliary copy stored to an example deduplication appliance 380. FIG. 7 depicts: media agent 344, media agent index 353, data streams 720 and 730 using communication pathway 376Data, and deduplication appliance 380 comprising secondary copy 519 and auxiliary copy 729. Logical data flows into media agent 344 are depicted by two-line unidirectional arrows, indicating that media agent 344 retrieves information for secondary copies 519A . . . 519J. Logical data flows for generating auxiliary copy 729 are depicted by bold unidirectional arrows.

Secondary copy 519 is a copy based on primary data that was generated in a backup job such as described in FIGS. 5A and 5B. Notably, Auxiliary copies can be created from any pre-existing copy, whether a secondary copy 519 or a synthetic-full copy 629, or another auxiliary copy 729/829, without limitation.

Figure 8:
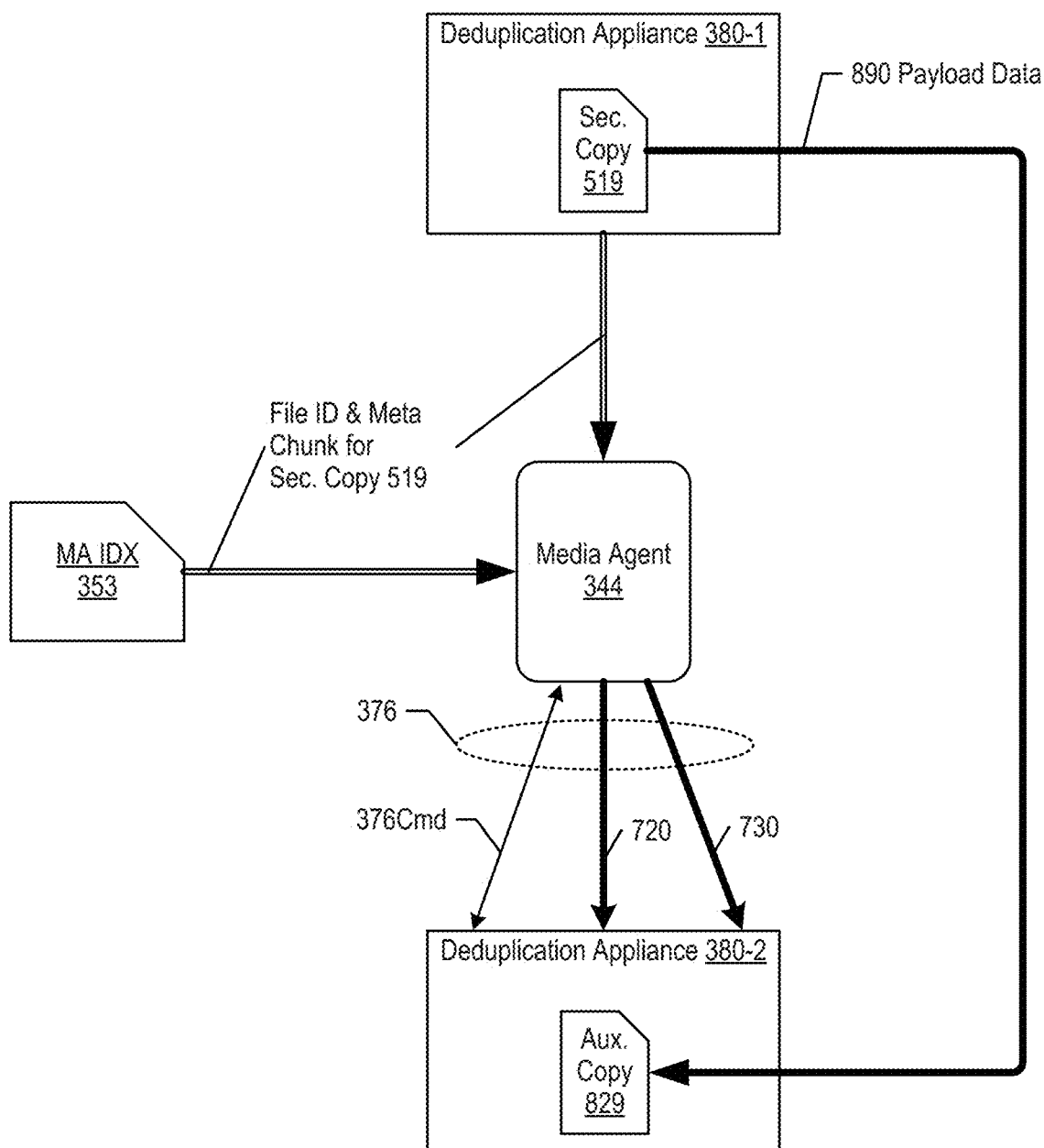
FIG. 8 depicts a logical view of a backup operation in system 300 for generating tertiary copies based on other copies, e.g., making an auxiliary copy from a first deduplication appliance to a second deduplication appliance.

Auxiliary copy 729 is generated from secondary copy 519. Auxiliary copy 729 is a copy of a copy. Because it is created from an existing copy and not from primary data, auxiliary copy 729 is sometimes referred to herein as a tertiary copy. Each secondary copy 519 is stored at deduplication appliance 380. Using secondary copy 519 (or another copy) as a source (i.e., not returning to primary data 112), data storage management system 300 is configured to generate one or more auxiliary copies such as auxiliary copy 729, which is also stored in deduplication appliance 380 (or auxiliary copy 829 stored to another deduplication appliance 380 as shown in FIG. 8). Auxiliary copies as a concept are well known in the art, i.e., creating a copy from a pre-existing copy. Auxiliary copies provide additional standby copies of data and may reside on different secondary storage devices than the initial secondary copies (see, e.g., FIG. 8).

Figure 12:
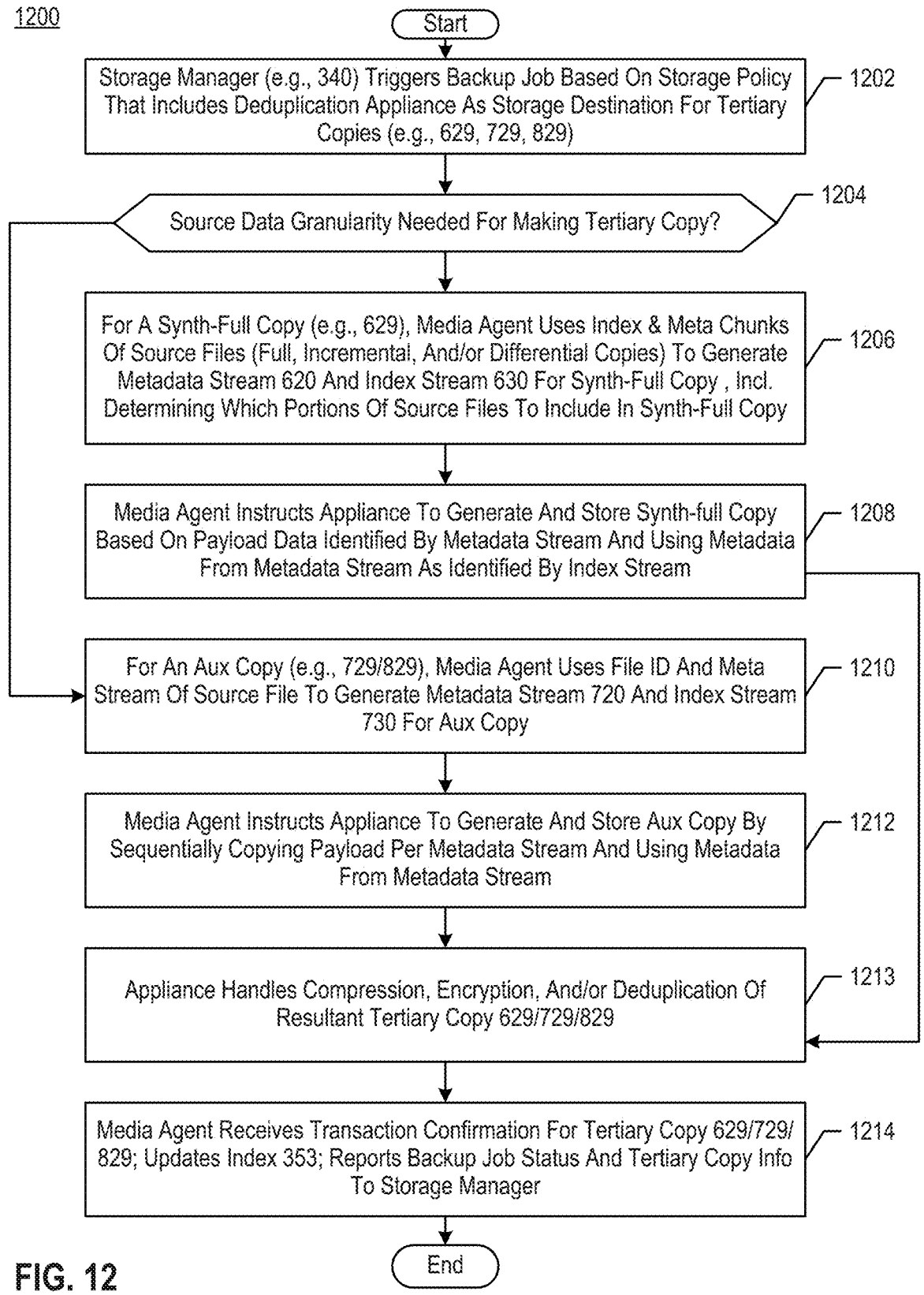
FIG. 12 depicts a method 1200 in system 300 for generating tertiary copies based on other copies, according to an illustrative embodiment of the present invention.

Although the concept of auxiliary copies is well known in the art, the method of creating auxiliary copy 729 through interoperability with one or more deduplication appliances 380 presents novel aspects (see also FIGS. 8, 12). By interoperating with deduplication appliance 380, media agent 344 avoids some of the traditional data processing tasks involved in creating auxiliary copies, such as reading in the source copy from storage and transmitting the auxiliary copy to suitable secondary storage. Even if the auxiliary copy is not staged (i.e., not arranged in its entirety) at the media agent, the auxiliary copy operation created network traffic to and from the media agent.

However, according to the illustrative embodiments that use interoperability with deduplication appliance 380, no payload data flows through media agent 344 to generate auxiliary copies. Instead, media agent 344 retrieves useful information about the source copy, e.g., about secondary copy 519, as depicted by the two-line unidirectional arrows that feed into media agent 344. For example, media agent 344 retrieves a file ID from index 353, which points it to a meta-chunk ID stored at deduplication appliance 380 (see, e.g., data stream 520). Media agent 344 then retrieves the appropriate meta-chunk (e.g., Ch1) from deduplication appliance 380. Now, media agent 344 has the file ID, metadata content, and pointers to payload data chunks at deduplication appliance—collectively enough information to instruct deduplication appliance 380 in how to create auxiliary copy 729 from secondary copy 519. Media agent 344 generates indexing information and meta-chunks for the new auxiliary copy 729, which are transmitted to deduplication appliance 380 using data streams 720 and 730. No payload data travels to/from media agent 344. In contrast to the information needed for creating synthetic-full copy 629 (see FIG. 6), auxiliary copy 629 requires less granularity here, because all of the source copy is copied to make the auxiliary copy. Thus, the file ID is enough to initiate the auxiliary copy process here.

Illustratively metadata content for the auxiliary copy is supplied by media agent 344 from its index 353 (see, e.g., table 553) or, alternatively, from the meta-chunks it retrieves from deduplication appliance 380. In some embodiments, no metadata content flows through media agent 344 for generating auxiliary copies, because deduplication appliance 380 retrieves it from its own storage without involving media agent 344. Data agent 344 instructs deduplication appliance 380 on how to use data streams 720 and 730 to create auxiliary copy 729. Instructions are transmitted by data agent 344 to deduplication appliance 380 (e.g., by using communication pathway 376Cmd not shown in the present figure). In some embodiments, media agent 344 uses "copy" commands to instruct deduplication appliance 380 on which payload data to use for synthetic-full copy 629. Deduplication appliance 380 performs the payload data manipulation, adds metadata content, and stores auxiliary copy 729. Deduplication appliance 380 adds deduplication according to its own native features without involving media agent 344 in deduplication operations.

This lightweight approach substantially lightens the data processing load on the media agent 344 and puts only a minimal load on the data network, because communication pathway 376Cmd and data streams 720 and 730 carry relatively little data compared to transmitting payload data between media agent 344 and deduplication appliance 380. After auxiliary copy 729 is created, media agent 344 updates index 353 to reflect the presence of a new backup copy (729) in the system. Media agent 344 also reports the successful creation of auxiliary copy 729 to storage manager 340.

Data stream 720 is analogous to metadata stream 620. Data stream 720 is a metadata stream that originates at media agent 344 and terminates at deduplication appliance 380. Data stream 720 comprises one or more meta-chunks for auxiliary copy 729, each of which comprises: (i) metadata content to be combined with payload data, and (ii) pointers to payload data chunks stored in deduplication appliance 380 that will be copied to auxiliary copy 729.

Data stream 730 is analogous to data stream 630. Data stream 730 is an index stream that originates at media agent 344 and terminates at deduplication appliance 380. Data stream 730 comprises one or more index chunks each of which points to a corresponding meta-chunk in data stream 720, as depicted by dotted arrow 532. Index information in data stream 730 is also stored by media agent 344 to its associated media agent index 353 (e.g., in data structure 553). Optionally, metadata content transmitted in metadata stream 720 also is stored therein as discussed in regard to FIG. 5A. A scenario that makes an auxiliary copy from a source copy on another deduplication appliance is described in the next figure.

FIG. 8 depicts a logical view of a backup operation in system 300 for generating tertiary copies across deduplication appliances, e.g., making an auxiliary copy 829 from a copy on a first deduplication appliance 380-1 to a second deduplication appliance 380-2. FIG. 8 depicts: media agent 344, media agent index 353, deduplication appliance 380-1 comprising secondary copy 519, deduplication appliance 380-2 comprising auxiliary copy 829; and data streams 720, 730, and 890. Media agent 344 uses communication pathway 376Cmd for instructions and responses to/from deduplication appliance 380-2.

The operations in this figure are similar to what is depicted in FIG. 7 except that: (i) Payload data from secondary copy 519 to auxiliary copy 829 is carried by communication pathway 890 between deduplication appliance 380-1 and 380-2; it does not pass through media agent 344; and (ii) auxiliary copy 829 resides in deduplication appliance 380-2 which is different from deduplication appliance 380-1 that stores the source secondary copy 519. No payload data flows through media agent 344 to generate auxiliary copies from one deduplication appliance to another.

Data streams 720 and 730 were described in more detail in FIG. 7. Here, they originate at data agent 344 and terminate at deduplication appliance 380-2. Data streams 720 and 730 comprise information retrieved by data agent 344 from its associated index 353 and from deduplication appliance 380-1 as shown by the two-line unidirectional arrows that feed into media agent 344. These were described in more detail in FIG. 7.

Data stream 890 is generated and transmitted by deduplication appliance 380-1 and received and processed by deduplication appliance 380-2, thus offloading media agent 344 from handling payload data.

Although the present figure depicts making an auxiliary copy at a second deduplication appliance from a source at a first deduplication appliance, similar logic applies for making synthetic-full copies. In such a scenario, source backup copies 519A . . . 519J are stored at deduplication appliance 380-1 and synthetic-full copy 629 is stored to deduplication appliance 380-2, wherein the payload for synthetic-full copy 629 is carried by pathway 890 from one appliance to another without passing through media agent 344.

Figure 9:
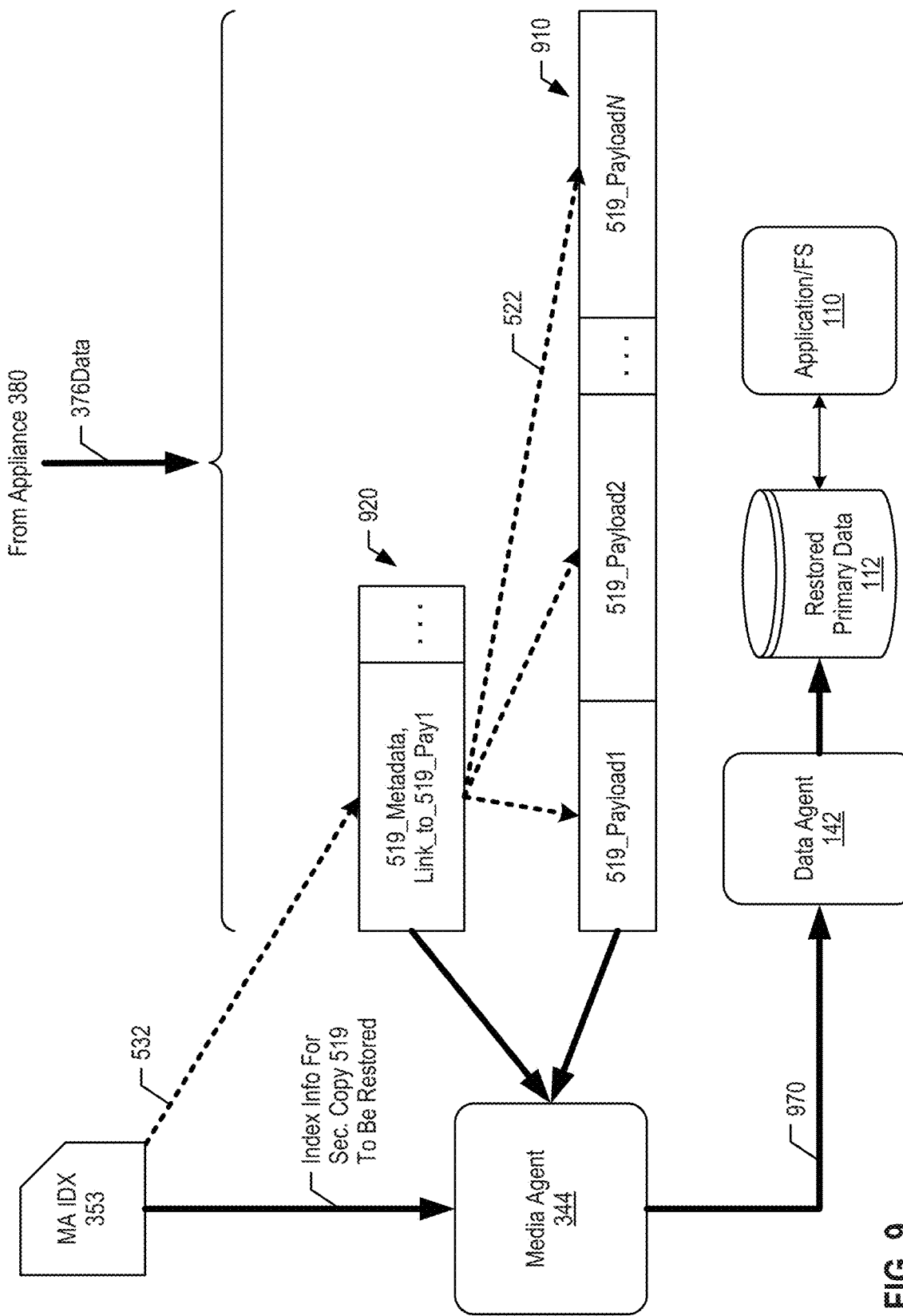
FIG. 9 depicts a logical view of a recovery operation in system 300 for restoring primary data from secondary/tertiary copies stored in an example deduplication appliance.

FIG. 9 depicts a logical view of a recovery operation in system 300 for restoring primary data from secondary/tertiary copies stored in an example deduplication appliance 380. FIG. 9 depicts: application/file system 110, restored primary data 112, data agent 142, media agent 344, media agent index 353, and data streams 910 and 920 and 970. See also FIG. 13. Source secondary copy 519 is not shown in the present figure, but see FIG. 5A. Collectively, data streams 910 and 920 are received by media agent 344 from deduplication appliance 380 via communication pathway 376Data. Logically, FIG. 9 reverses the flow of data depicted in FIGS. 5A and 5B when secondary copy 519 was initially made and which is now being restored. Tertiary copies such as 629, 729, and/or 829 are restored in like fashion. Logical data flows for restoring copy 519 are depicted by bold unidirectional arrows.

Dotted arrow 532 indicates that pointers in index 353 provide media agent 344 with information to retrieve meta-chunks from deduplication appliance 380 using metadata stream 920. From the retrieved meta-chunks, media agent 344 retrieves pointers to corresponding payload data stored in deduplication appliance as depicted by dotted arrows 522. The payload data chunks are retrieved using data stream 910.

Data stream 910 is analogous to data stream 510 and comprises payload data that was originally stored to deduplication appliance 380 when secondary copy 519 was created. Data stream 910 originates at deduplication appliance 380 and terminates at media agent 344.

Data stream 920 originates at deduplication appliance 380 and terminates at media agent 344. Data stream 920 is analogous to data stream 520 and comprises meta-chunks that comprise: (i) metadata content of secondary copy 519, and (ii) pointers to payload data stored at deduplication appliance 380, as depicted by dotted arrows 522. Illustratively, media agent 344 uses index 353 (e.g., data structure 553) to identify meta-chunks associated with the copy to be restored, e.g., 519, and as shown by dotted arrow 532, uses that information to instruct deduplication appliance 380 to provide the meta-chunks in data stream 920. In turn, the pointers in meta-chunks of data stream 920 are used to identify payload data for secondary copy 519 as depicted by arrows 522. Data agent 344 instructs deduplication appliance to transmit those payload data using data stream 910. Illustratively metadata content for the restored copy is retrieved from index 353 and/or from the meta-chunk(s) in data stream 920.

Deduplication appliance 380 applies its native features as appropriate, e.g., rehydrating deduplicated data, decompressing compressed data, decrypting encrypted data before generating data streams 910 and 920.

Data stream 970 is analogous to data stream 170 and/or data stream 171 described in more detail in FIGS. 1F and 1G. Data stream 970 is configured with interleaved metadata and payload data according to a traditional format employed by prior art data storage management systems. Data stream 970 is formed by media agent 344 from segregated data received in data streams 910 and 920 and/or metadata content retrieved from index 353. Data stream 970 is transmitted to data agent 142, which in turn "deposits" the restored data to primary storage in the form of native format (primary) data 112. An application or file system 110 directly accesses and consumes the restored primary data 112. Data agent 142 thus lacks awareness of how the data was transmitted to media agent 344 and simply receives a traditionally-formatted data stream 970.

Figure 10:
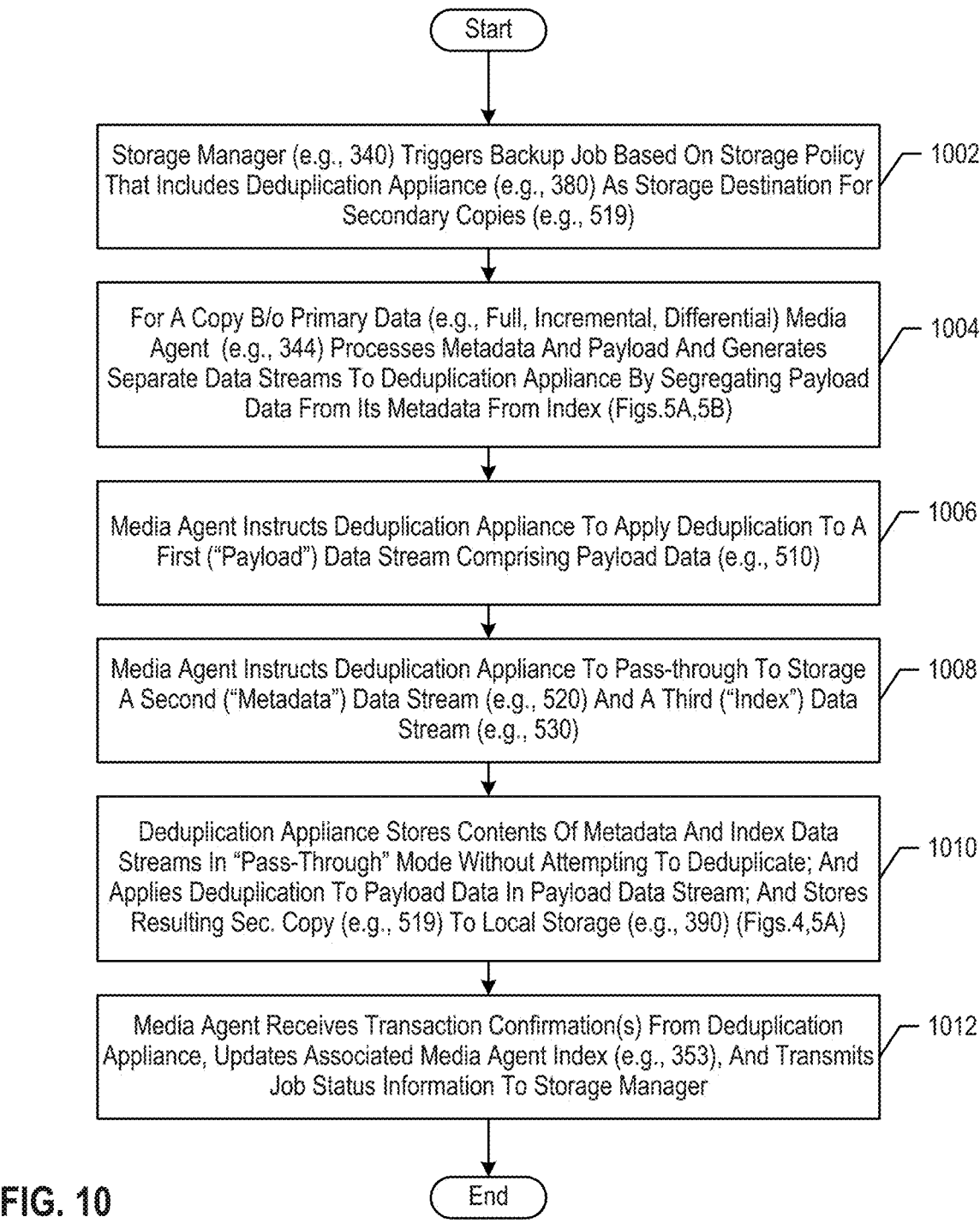
FIG. 10 depicts a method 1000 in system 300 for generating secondary copies based on primary data by segregating payload, metadata, and index into separate data streams, according to an illustrative embodiment of the present invention.

FIG. 10 depicts a method 1000 in system 300 for generating secondary copies based on primary data by segregating payload, metadata, and index information into separate data streams, according to an illustrative embodiment of the present invention. Media agent 344 performs the operations of method 1000, except as otherwise noted. See also FIGS. 3B-5B.

At block 1002, storage manager 340 triggers a backup job (or information management job, or storage operation job) based on a storage policy that includes deduplication appliance 380 as a storage destination for secondary copies (e.g., 519). Illustratively management database 346 is where storage policies are stored in system 300. Based on a storage policy (e.g., 148), storage manager 340 initiates a backup job by instructing data agent 142 and media agent 344 to generate a backup copy from a certain data source and to store the backup copy to the specified destination, e.g., deduplication appliance 380. A backup copy can be a secondary copy based on primary data or a tertiary copy based on a pre-existing copy. The present figure generally describes how secondary copies are generated and stored to deduplication appliance 380. Tertiary copies are discussed in more detail in FIGS. 6-8 and 12.

At block 1004, for a copy based on primary data (e.g., full, incremental, differential copies) media agent 344 processes metadata and payload to generate a plurality of data chunks. From the plurality of data chunks, media agent 344 generates separate data streams to deduplication appliance 380 by segregating payload data from its metadata from index. More details are given in another figure. See also FIGS. 5A and 5B.

At block 1006, media agent 344 instructs deduplication appliance 380 to apply deduplication to a first ("payload") data stream comprising payload data (e.g., 510). Instructions are illustratively transmitted using an Application Programming Interface ("API") over a command channel such as communication pathway 376Cmd. See also FIG. 4.

At block 1008, media agent 344 instructs deduplication appliance 380 to pass-through to storage a second ("metadata") data stream (e.g., 520) and a third ("index") data stream (e.g., 530), i.e., to store the received data without applying deduplication. Instructions are illustratively transmitted using an Application Programming Interface ("API") over a command channel such as communication pathway 376Cmd. See also FIG. 4.

In some embodiments, data streams 510, 520, and 530 operate concurrently. In other embodiments the data streams are transmitted sequentially from media agent 344 to deduplication appliance 380, e.g., 510, 520, and 530. In some embodiments, instructions also include a location or other identifier for where deduplication appliance 380 should store the secondary copy being created based on data streams 510, 520, and 530. In other embodiments, deduplication appliance 380 picks a suitable location and reports it to media agent 344.

At block 1010, deduplication appliance 380 stores contents of the second (metadata) data stream 520 (i.e., meta-chunks) and third (index) data stream 530 in pass-through mode without attempting to deduplicate. Deduplication appliance 380 applies deduplication to payload data in the first (payload) data stream 510; and stores the resulting data to one or more of its local storage devices (e.g., 390). See also FIG. 4. Deduplication is applied by deduplication appliance 380 according to its own native logic and feature capabilities. The data is stored by deduplication appliance 380 using its own native logic and feature capabilities, and responsive to instructions received from media agent 344. Transaction confirmation(s) are sent back to media agent 344 using the API. See also FIGS. 4, 5A, and 5B.

At block 1012, media agent 344 receives transaction confirmation(s) and/or suitable reporting information, such as data size, storage location, timestamps, etc., from deduplication appliance 380. Media agent 344 updates associated media agent index 353 (e.g., adding a timestamp and a location for secondary copy 519), and transmits job status information to storage manager 340. At this point, one or more secondary copies 519 have been created, appropriately deduplicated, and stored to deduplication appliance 380. Secondary copies 519 are tracked by media agent 344 in its associated index 353 and in some embodiments are storage manager 340 tracks them in its management database 346.

Figure 11:
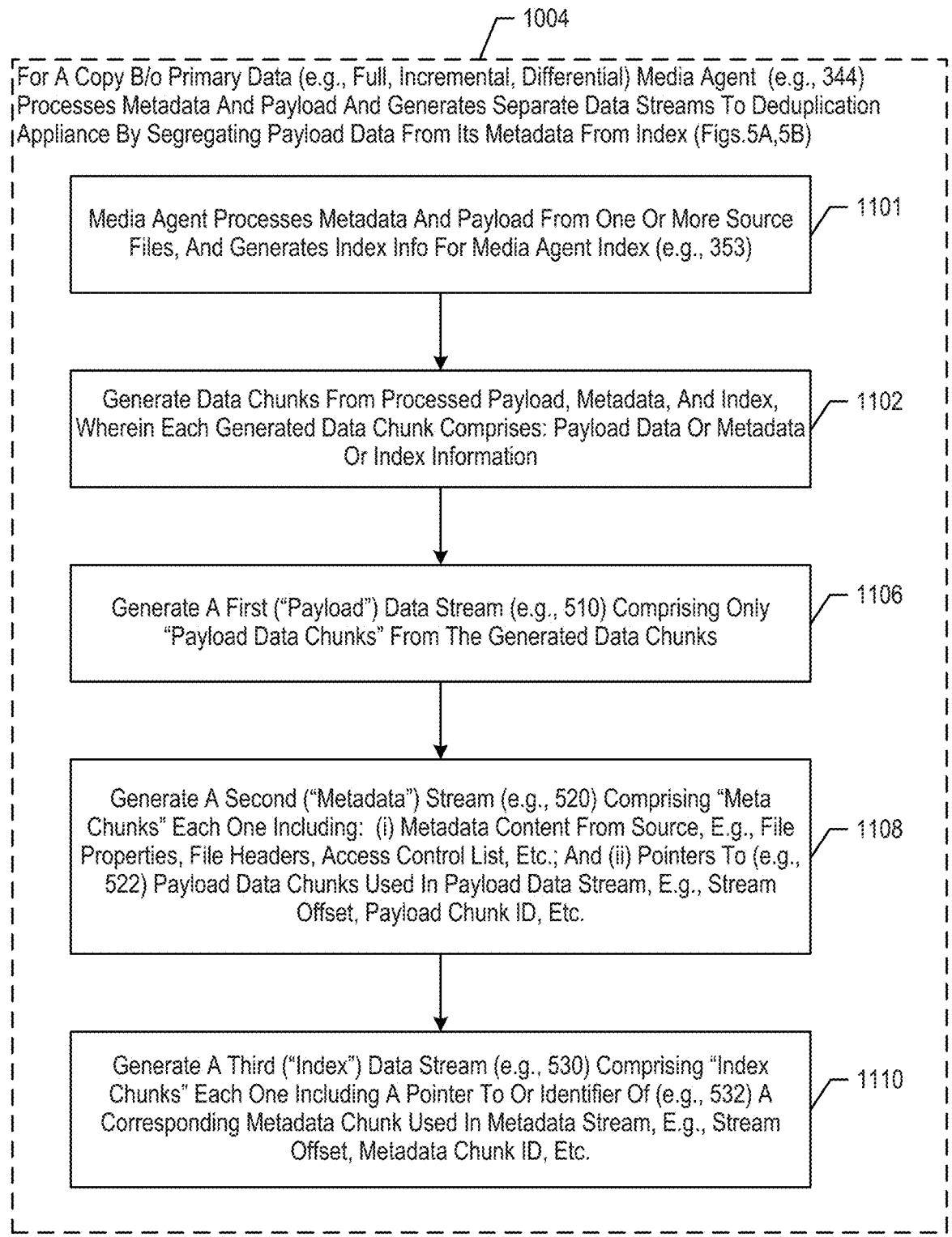
FIG. 11 depicts some salient operations in block 1004 of method 1000.

FIG. 11 depicts some salient operations in block 1004 of method 1000. This block is directed to: for a copy based on primary data (e.g., full, incremental, differential copies) media agent 344 processes metadata and payload and generates separate data streams to deduplication appliance by segregating payload data from its metadata from index Some salient operations are described below. See also FIGS. 5A and 5B.

At block 1101, media agent 344 receives payload and metadata of the source file(s) in a data stream (e.g., 170/171) transmitted by a data 142 that is specially configured to back up the source data. Media agent 344 processes the received metadata and payload data, and generates index information for its associated media agent index 353. See, e.g., table 553.

At block 1102, media agent 344 generates data chunks from processed payload, metadata content, pointers, and index information, wherein each generated data chunk comprises payload data or metadata content or index information.

At block 1106, media agent 344 generates a first ("payload") data stream (e.g., 510) comprising only "payload data chunks" from the generated data chunks. The payload data for these payload data chunks was extracted by media agent 344 from the source data being backed up, e.g., from a data stream 170/171 received from data agent 142.

At block 1108, media agent 344 generates a second ("metadata") data stream (e.g., 520) comprising meta-chunks. Metadata content from the source data and pointers to the payload data chunks in data stream 510 are included in each meta-chunk in data stream 520. See also FIGS. 5A and 5B and accompanying text.

At block 1110, media agent 344 generates a third ("index") data stream (e.g., 530) comprising "index chunks." Each index chunk comprises index information such as a pointer to a corresponding meta-chunk used in metadata stream 520, e.g., offset, meta-chunk id, etc. See also table 553 and accompanying text. Thus, each index chunk points to a corresponding meta-chunk, which in turn points to payload data chunks. Indexing information in the index chunks and metadata content are stored to index 353, thus preserving in media agent 344 information for streamlined and granular access to data stored at deduplication appliance 380. See also FIGS. 5A and 5B and accompanying text.

FIG. 12 depicts a method 1200 in system 300 for generating tertiary copies based on other copies, according to an illustrative embodiment of the present invention. Media agent 344 performs the operations of method 1200, except where otherwise noted. See also FIGS. 6, 7, and 8.

At block 1202, storage manager 340 triggers a backup job (or information management job, or storage operation job) based on a storage policy that includes deduplication appliance 380 as a storage destination for tertiary copies (e.g., 629, 729, 829). Illustratively management database 346 is where storage policies are stored in system 300. Based on a storage policy (e.g., 148), storage manager 340 initiates a backup job by instructing media agent 344 to generate a tertiary copy from one or more secondary copy sources (e.g., 519) or from other copies and to store the resulting tertiary copy to deduplication appliance 380. The present figure generally describes how tertiary copies are generated and stored to one or more deduplication appliances 380.

At block 1204, which is a decision point, media agent 344 determines whether the tertiary copy to be made is of a kind for which granularity of the source data is needed. For example, for auxiliary copies, which are complete copies of pre-existing copies, no granularity is needed since the entire set of data chunks belonging to the source copy are copied to the tertiary copy in a substantially linear fashion based on a file ID obtained from storage manager 340 and/or index 353. In such a case, control passes to block 1210. For example, for synthetic-full copies, data chunk granularity (or even sub-chunk granularity) is needed to find and properly integrate the latest data from multiple source copies into the synthetic-full copy. In such a case, control passes to block 1206.

At block 1206, for a synthetic-full copy (which is generated from one or more full, incremental, and/or differential copies) media agent 344 uses index information & meta-chunks of source files to generate metadata stream 620 and index stream 630 for the synthetic-full copy, including determining which portions of source files to include in the synthetic-full copy. See also FIG. 6 and accompanying text.

The illustrative synthetic-full copy 629 is formed by integrating the most recently created/changed data chunks found in the plurality of source secondary copies 519. Hence the need for chunk granularity within the source secondary copies 519. Notably, these secondary copies 519 are stored at deduplication appliance 380 in deduplicated format that is natively supplied and managed by the appliance. In some embodiments, granularity is finer than the chunk level, e.g., data blocks, data extents, but the same process applies. Only the most recent data from the source files are identified by media agent 344 and referenced in instructions to deduplication appliance 380. Media agent 344 transmits both index information (stream 630) and meta-chunks (stream 620) to deduplication appliance 380 with instructions to find corresponding payload data chunks and integrate them into synthetic-full copy 629 along with appropriate metadata content. See also FIG. 6 and accompanying text.

At block 1208, media agent 344 instructs deduplication appliance 380 to generate and store synthetic-full copy 629 based on payload data pointed to by metadata stream 620 and using metadata content from metadata stream 620 as identified by index stream 630. See also FIG. 6 and accompanying text. No payload data passes through and/or plays back at media agent 344, which is one of the advantageous aspects of interoperability with deduplication appliance 380 according to the present invention. Control passes to block 1213.

Block 1210 is reached from block 1204. For an auxiliary copy (e.g., 729/829), media agent 344 uses a file ID and metadata chunks of the source file (e.g., 519) to generate metadata stream 720 and index stream 730 for the resultant auxiliary copy 729/829. See also FIGS. 7 and 8 and accompanying text.

At block 1212, media agent 344 instructs deduplication appliance 380 to generate and store auxiliary copy 729/829 by copying payload data as pointed to by metadata stream 720 and using metadata content from metadata stream 720. In some other embodiments (see, e.g., FIG. 8), media agent 344 extracts meta-chunks from a first deduplication appliance, e.g., 380-1, and transmits the meta-chunks to a second deduplication appliance, e.g., 380-2, with instructions to copy the payload data chunks from the first deduplication appliance 380-1 and generate and store auxiliary copy 829. In all the auxiliary copy scenarios, no payload data passes through and/or plays back at media agent 344, which is one of the advantageous aspects of interoperability with deduplication appliance 380 according to the present invention. See also FIGS. 7 and 8 and accompanying text. Control passes to block 1213.

At block 1213, which is reached from block 1208 and from block 1212, deduplication appliance 380 handles compression, encryption, and/or deduplication of resultant tertiary copy 629/729/829 using the appliance's native features. Deduplication appliance 380 illustratively stores tertiary copy 629/729/829 within its data storage devices 390 and transmits transaction confirmation(s) to media agent 344 using the API over communication pathway 376Cmd. In some embodiments, deduplication appliance 380 transmits synthetic-full copy 629 to another deduplication appliance 380.

At block 1214, media agent 344 receives transaction confirmation for tertiary copy 629/729/829 from deduplication appliance 380. Media agent 344 updates index 353 to track the new tertiary copy, and reports backup job status and tertiary copy information to storage manager 340.

Figure 13:
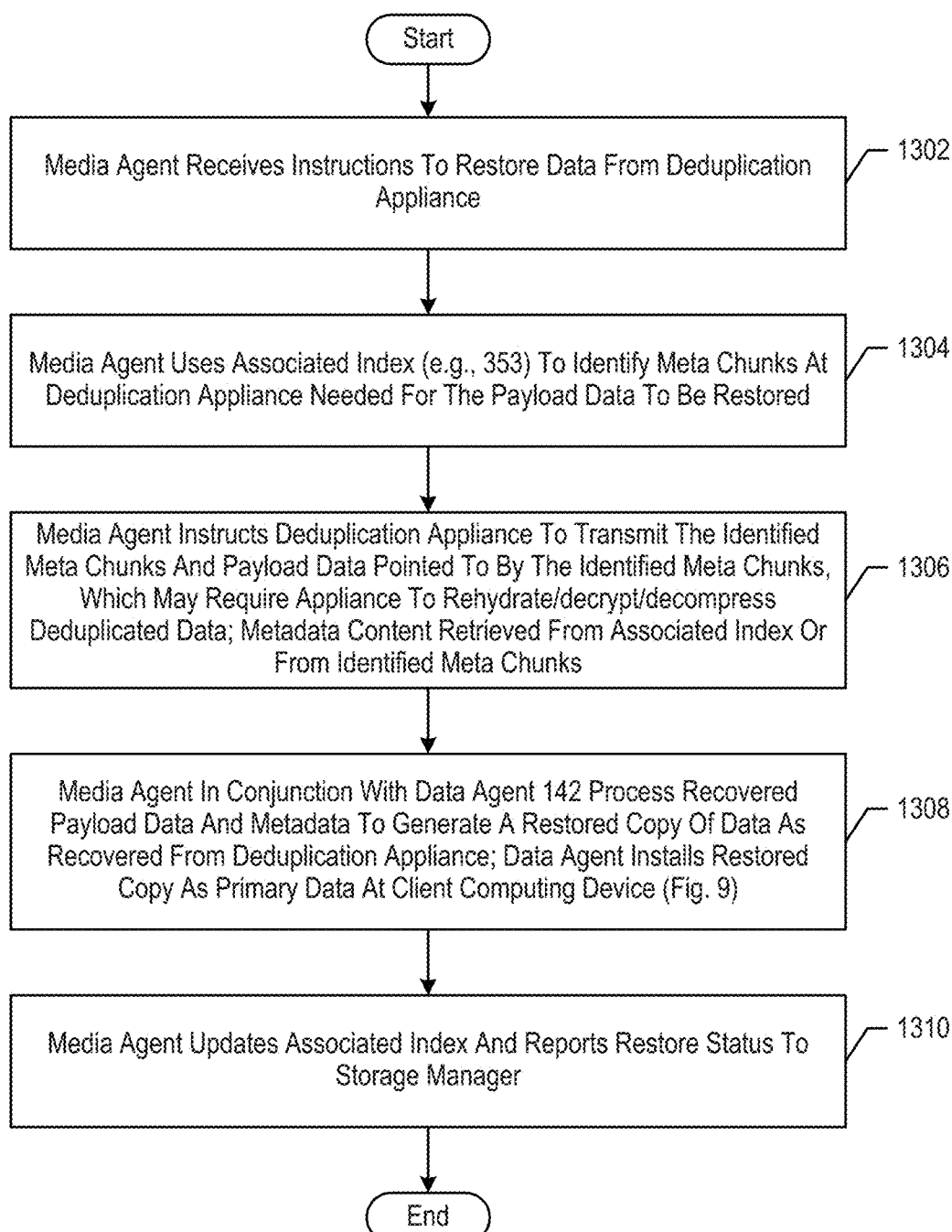
FIG. 13 depicts a method 1300 in system 300 for restoring primary data from secondary/tertiary copies stored in an example deduplication appliance, according to an illustrative embodiment of the present invention.

FIG. 13 depicts a method 1300 in system 300 for restoring primary data from secondary/tertiary copies stored in an example deduplication appliance 380, according to an illustrative embodiment of the present invention. Method 1300 is performed by media agent 344 except where expressly stated otherwise. See also FIG. 9 and accompanying text.

At block 1302, media agent 344 receives instructions to restore data stored at deduplication appliance 380 (e.g., 519, 629, 729, 829) to a client computing device 102. Illustratively, instructions are received from storage manager 340, which in turn receives restore request(s) via a user interface, such as via an administration console or via a data agent interface at client computing device 102. Requests to restore data are well known in the art.

At block 1304, media agent 344 uses its associated media agent index 353 (e.g., data structure 553) to identify meta-chunks at deduplication appliance 380 that are needed for restoring the requested data (e.g., file F1). Illustratively, table 553 indicates that file F1 is associated with meta-chunk Ch1, which is to be found at offset location Off1—see, e.g., FIG. 5B.

At block 1306, media agent 344 instructs deduplication appliance 380 to transmit the identified meta-chunks (e.g., Ch1) and payload data pointed to by the identified meta-chunks (e.g., F1_Payload1A . . . F1_Payload1M), which may require deduplication appliance 380 to rehydrate/decrypt/decompress data before transmitting to media agent 344. Media agent 344 receives data stream 920, parses the meta-chunks to find pointers to payload data, and requests the payload data, which arrives in payload data stream 910 from deduplication appliance 380. Deduplication appliance 380 illustratively uses its own native logic and feature capabilities to automatically rehydrate payload data belonging to a deduplicated copy, without needing media agent 344 to instruct it on rehydration, though the present invention is not so limited.

At block 1308, media agent 344 in conjunction with data agent 142 process recovered payload data and corresponding metadata content to generate a restored copy of data as recovered from deduplication appliance 380. Illustratively, media agent 344 takes metadata content and payload data and generates an interleaved data stream (e.g., 970) that it transmits to data agent 142. Data agent 142 processes the received data stream 970 and installs the restored copy as primary data 112 at client computing device 102. At this point, the application and/or file system 110 that consumes this data can natively access it.

At block 1310, media agent 344 updates media agent index 353 and reports the restore status to storage manager 340.

In regard to the figures described herein, other embodiments are possible within the scope of the present invention, such that the above-recited components, steps, blocks, operations, messages, requests, queries, and/or instructions are differently arranged, sequenced, sub-divided, organized, and/or combined. In some embodiments, a different component may initiate or execute a given operation. For example, in some embodiments, media agent 344 triggers backup and/or restore jobs without instructions from storage manager 340. In some embodiments, media agent 344 receives metadata and status/performance reporting from deduplication appliance 380 that media agent 344 incorporates into index 353 and/or reports to storage manager 340. These latter features largely depend upon the feature capabilities of API to/from deduplication appliance 380.

EXAMPLE EMBODIMENTS

Some example enumerated embodiments of the present invention are recited in this section in the form of methods, systems, and non-transitory computer-readable media, without limitation.

According to an example embodiment, a method comprises by a media agent that executes on a first computing device comprising one or more processors and computer memory, during a backup job for primary data that results in one or more secondary copies, generating a plurality of data chunks, wherein the media agent configures each data chunk to comprise: (i) payload data, or (ii) metadata, or (iii) index information; by the media agent, generating a first data stream transmitted to an appliance that comprises one or more data storage devices and that also is capable of self-managed deduplication, wherein the first data stream comprises first data chunks and does not comprise second data chunks and third data chunks, and wherein each first data chunk comprises payload data based on the primary data being backed up in the backup job; by the media agent, generating a second data stream transmitted to the appliance, wherein the second data stream comprises second data chunks and does not comprise first data chunks and third data chunks, wherein each second data chunk comprises metadata for the primary data being backed up and further wherein each second data chunk points to one or more first data chunks in the first data stream; by the media agent, generating a third data stream transmitted to the appliance, wherein the third data stream comprises third data chunks and does not comprise first data chunks and second data chunks, wherein each third data chunk points to a corresponding second data chunk in the second data stream.

The above-recited method further comprises: by the media agent, instructing the appliance to apply deduplication to the first data chunks in the first data stream; by the media agent, instructing the appliance not to apply deduplication to the second data chunks in the second data stream and to the third data chunks in the third data stream; and by the media agent, instructing the appliance to store the one or more secondary copies resulting from the metadata in the second data chunks and from the payload data in the first data chunks to the one or more data storage devices in the appliance. The above-recited method wherein the one or more secondary copies are stored at the appliance in deduplicated form, and wherein during the backup job the media agent does not deduplicate the first data stream, the second data stream, and the third data stream. The above-recited method further comprises: by the media agent, storing to an associated index at the first computing device: contents of the third data chunks which point to corresponding second data chunks in the second data stream, and metadata for the primary data from the second data chunks. The above-recited method further comprises: By the media agent, updating an associated index at the first computing device with at least one of: (a) storage results reported to the media agent by the appliance, and (b) for each of the one or more secondary copies a corresponding storage location within the appliance. The above-recited method wherein based on determining that the appliance is capable of deduplication, the media agent generates the first data stream, the second data stream, and the third data stream, and instructs the appliance to apply deduplication to the first data chunks, and further instructs the appliance to store without deduplication the second data chunks and the third data chunks. The above-recited method wherein a given second data chunk includes an offset of the corresponding first data chunk within the first data stream. The above-recited method wherein a given third data chunk includes an offset of the corresponding second data chunk within the second data stream. The above-recited method wherein the media agent instructs the appliance where to store the one or more secondary copies within the one or more storage devices in the appliance; and wherein the index associated with the media agent includes for each of the one or more secondary copies a corresponding storage location within the appliance. The above-recited method wherein a storage manager instructs the media agent and a first data agent to process the primary data being backed up in the backup job for further processing by and storage at the appliance as the one or more secondary copies. The above-recited method wherein based on a first storage policy, a storage manager instructs the media agent and a first data agent to process the primary data being backed up in the backup job for further processing by and storage at the appliance as the one or more secondary copies. The above-recited method wherein based on a first storage policy, a storage manager instructs the media agent to process the primary data being backed up in the backup job for further processing by and storage at the appliance as the one or more secondary copies; and wherein the storage manager indicates to the media agent that the appliance is capable of deduplication and storage of the one or more secondary copies. The above-recited method wherein a storage manager instructs the media agent to generate the first, second, and third data stream, and further to transmit the first data stream to the appliance with instructions to deduplicate the first data chunks therein. The above-recited method wherein based on a first storage policy, a storage manager instructs the media agent to generate the first, second, and third data stream, and further to transmit the first data stream to the appliance with instructions to deduplicate the first data chunks therein. The above-recited method wherein based on a first storage policy, a storage manager instructs the media agent to back up the primary data to the appliance, and further wherein: based on determining that the appliance is capable of deduplication, the media agent generates the first data stream, the second data stream, and the third data stream, and instructs the appliance to apply deduplication to the first data chunks in the first data stream, and further instructs the appliance to store without deduplication the second data chunks in the second data stream and the third data chunks in the third data stream. The above-recited method wherein the media agent co-resides on the first computing device with a first data agent that accesses the primary data being backed up in the backup job; and wherein the first data agent in conjunction with the media agent process the primary data being backed up in the backup job for deduplication by and storage at the appliance as the one or more secondary copies. The above-recited method wherein the media agent co-resides on the first computing device with a first data agent that accesses the primary data being backed up in the backup job; and wherein the first data agent in conjunction with the media agent process the primary data being backed up in the backup job for deduplication by and storage at the appliance as the one or more secondary copies; and wherein an index associated with the media agent tracks the one or more secondary copies stored at the appliance.

A data storage management system (e.g., system 300) that performs the above-recited methods.

A non-transitory computer readable medium storing instructions, which when executed by at least one computing device (e.g., media agent 344), perform the above-recited methods.

According to another example embodiment, a method for using an appliance to generate and store tertiary copies based on secondary copies, the method comprises: by a media agent that executes on a first computing device comprising one or more processors and computer memory, receiving instructions from a storage manager to generate a synthetic-full copy from a plurality of secondary copies that are stored in an appliance in communication with the media agent, wherein the appliance comprises one or more data storage devices and is capable of self-managed deduplication; by the media agent, extracting from an associated index at the first computing device information about the plurality of secondary copies, wherein the information comprises pointers to a plurality of second data chunks stored without deduplication at the appliance, wherein a given second data chunk comprises metadata for a corresponding secondary copy among the plurality of secondary copies, and further comprises pointers to one or more first data chunks stored with deduplication at the appliance, and wherein a given first data chunk comprises payload data of the corresponding secondary copy among the plurality of secondary copies; by the media agent, determining which first data chunks and which metadata from the second data chunks to be included in the synthetic-full copy; by the media agent, generating a first data stream transmitted to the appliance, wherein the first data stream comprises a third data chunk comprising the metadata from the second data chunks determined by the media agent to be included in the synthetic-full copy, and further comprises pointers to one or more first data chunks determined by the media agent to be included in the synthetic-full copy; by the media agent, generating a second data stream transmitted to the appliance, wherein the second data stream comprises a fourth data chunk comprising a pointer to a corresponding third data chunk in the first data stream; by the media agent, instructing the appliance to generate and store the synthetic-full copy based on payload data in the one or more first data chunks and further based on the metadata in the third data chunk; and wherein the synthetic-full copy is generated and stored at the appliance without passing payload data through the media agent.

The above-recited method wherein at least some of the plurality of secondary copies are stored at the appliance in deduplicated form. The above-recited method wherein the secondary copies and the synthetic-full copy are stored at the appliance in deduplicated form. The above-recited method wherein the media agent instructs the appliance to apply deduplication to the payload data in the one or more first data chunks, and further instructs the appliance not to apply deduplication to the first data stream and to the second data stream. The above-recited method wherein the synthetic-full copy is stored at the appliance in deduplicated form based on the media agent instructing the appliance to apply deduplication to the payload data in the one or more first data chunks, and further instructing the appliance not to apply deduplication to the first data stream and to the second data stream. The above-recited method wherein the synthetic-full copy is stored at the appliance in deduplicated form, and further wherein no deduplication is applied by the media agent to the first data stream and the second data stream. The above-recited method further comprises: by the media agent, instructing the appliance to store the synthetic-full copy to the one or more data storage devices in the appliance. The above-recited method further comprises: by the media agent, instructing the appliance to store the synthetic-full copy to the one or more data storage devices in the appliance; and by the media agent, updating an associated index to track the synthetic-full copy stored at the appliance.

A data storage management system that performs the above-recited methods.

A non-transitory computer readable medium storing instructions, which when executed by at least one computing device, perform the above-recited methods.

According to yet another example embodiment, a method for using an appliance to generate and store tertiary copies based on secondary copies, the method comprises: by a media agent that executes on a first computing device comprising one or more processors and computer memory, receiving instructions from a storage manager to generate an auxiliary copy from a secondary copy that is stored in an appliance in communication with the media agent, wherein the appliance comprises one or more data storage devices and is capable of self-managed deduplication; by the media agent, extracting from an associated index at the first computing device a storage location of the secondary copy in the appliance, wherein a second data chunk at the storage location comprises metadata for the secondary copy, and further comprises pointers to one or more first data chunks stored with deduplication at the appliance, and wherein a given first data chunk comprises payload data of the secondary copy; by the media agent, determining that the one or more first data chunks and the metadata from the second data chunk are to be copied to the auxiliary copy; by the media agent, generating a first data stream transmitted to the appliance, wherein the first data stream comprises a third data chunk comprising the metadata from the second data chunk, and further comprises pointers to the one or more first data chunks; by the media agent, generating a second data stream transmitted to the appliance, wherein the second data stream comprises a fourth data chunk comprising a pointer to the third data chunk in the first data stream; by the media agent, instructing the appliance to generate and store the auxiliary copy based on payload data in the one or more first data chunks and further based on the metadata in the third data chunk; and wherein the auxiliary copy is generated and stored at the appliance without passing payload data through the media agent.

The above-recited method wherein the secondary copy and the auxiliary copy are stored at the appliance in deduplicated form. The above-recited method wherein the media agent instructs the appliance to apply deduplication to the payload data in the one or more first data chunks, and further instructs the appliance not to apply deduplication to the first data stream and to the second data stream. The above-recited method wherein the auxiliary copy is stored at the appliance in deduplicated form based on the media agent instructing the appliance to apply deduplication to the payload data in the one or more first data chunks, and further instructing the appliance not to apply deduplication to the first data stream and to the second data stream. The above-recited method wherein the auxiliary copy is stored at the appliance in deduplicated form, and further wherein no deduplication is applied by the media agent to the first data stream and the second data stream. The above-recited method further comprises: by the media agent, instructing the appliance to store the auxiliary copy to the one or more data storage devices in the appliance. The above-recited method further comprises: by the media agent, instructing the appliance to store the auxiliary copy to the one or more data storage devices in the appliance; and by the media agent, updating an associated index to track the auxiliary copy stored at the appliance. The above-recited method further comprises: by the media agent, instructing the appliance to transmit the auxiliary copy to a second appliance also in communication with the media agent; by the media agent, instructing the second appliance to store the auxiliary copy; and by the media agent, updating an associated index to track the auxiliary copy stored at the second appliance; and wherein no second data chunks that are part of the secondary copy flow through the media agent to generate or store the auxiliary copy.

A data storage management system that performs the above-recited methods.

A non-transitory computer readable medium storing instructions, which when executed by at least one computing device, perform the above-recited methods.

According to another illustrative embodiment, a method for restoring deduplicated secondary copies from an appliance, the method comprises: by a media agent that executes on a first computing device comprising one or more processors and computer memory, receiving instructions from a storage manager to restore a secondary copy from an appliance in communication with the media agent, wherein the appliance deduplicated the secondary copy when storing it; by the media agent, extracting from an associated index at the first computing device information about the secondary copy, wherein the information comprises pointers to a second data chunk stored without deduplication at the appliance, wherein the second data chunk comprises metadata for the secondary copy and further comprises pointers to one or more first data chunks stored with deduplication at the appliance, and wherein a given first data chunk comprises payload data of the secondary copy; by the media agent, causing a first data stream from the appliance to transmit to the media agent, wherein the first data stream comprises the second data chunk; by the media agent, causing a second data stream from the appliance to transmit to the media agent, wherein the second data stream comprises the one or more first data chunks pointed to by the pointers in the second data chunk, wherein the appliance rehydrates at least some of the first data chunks before transmitting to the media agent; by the media agent processing the first data chunks and the metadata in the second data chunk to generate a third data stream transmitted to a data agent for restoring the secondary copy to primary data.

The above-recited method wherein the third data stream interleaves portions of the metadata and portions of the payload from the first data chunks. The above-recited method further comprises: by the media agent, transmitting the third data stream to the data agent that transforms data in the third data stream into primary data accessible to an application that executes on the first computing device.

A data storage management system that performs the above-recited methods.

A non-transitory computer readable medium storing instructions, which when executed by at least one computing device, perform the above-recited methods.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method comprising:
    backing up primary data into one or more secondary copies to be stored at a deduplication appliance that comprises one or more data storage devices and wherein the deduplication appliance is capable of performing deduplication;
    wherein the backing up comprises:
        by a first computing device, generating without deduplication a first data stream transmitted to the deduplication appliance, wherein the first data stream comprises first data chunks and does not comprise second data chunks and third data chunks,
        wherein each first data chunk comprises payload data from the primary data being backed up, and
        wherein the first computing device comprises one or more processors and computer memory;
        by the first computing device, generating without deduplication a second data stream transmitted to the deduplication appliance, wherein the second data stream comprises the second data chunks and does not comprise the first data chunks and the third data chunks,
        wherein each second data chunk comprises metadata for the primary data being backed up and further wherein each second data chunk points to one or more first data chunks of the first data stream;
        by the first computing device, generating without deduplication a third data stream transmitted to the deduplication appliance, wherein the third data stream comprises the third data chunks and does not comprise the first data chunks and the second data chunks,
        wherein each third data chunk points to a corresponding second data chunk of the second data stream; and
        by the first computing device, instructing the deduplication appliance: to apply deduplication to the first data chunks of the first data stream, which results in deduplicated first data chunks, to store the deduplicated first data chunks at the deduplication appliance, to store the second data chunks of the second data stream at the deduplication appliance without applying deduplication thereto, and to store the third data chunks of the third data stream at the deduplication appliance without applying deduplication thereto.

2. The method of claim 1 further comprising:
    by the first computing device, storing in an associated index contents of the third data chunks which point to the corresponding second data chunks of the second data stream.

3. The method of claim 1, further comprising:
    by the first computing device, storing in an index, which is associated with the first computing device, contents of the third data chunks which point to the corresponding second data chunks of the second data stream,
    wherein the first computing device adds to the index the metadata for the primary data from the second data chunks.

4. The method of claim 1, wherein the first computing device is configured to transmit the first data stream, the second data stream, and the third data stream without deduplication to the deduplication appliance.

5. The method of claim 1, wherein a given second data chunk includes an offset of a corresponding first data chunk within the first data stream.

6. The method of claim 1, wherein a given third data chunk includes an offset of the corresponding second data chunk within the second data stream.

7. The method of claim 1, wherein the first computing device executes a media agent that generates the first data stream, the second data stream, and the third data stream, and also executes a data agent that accesses the primary data being backed up; and
    wherein the first computing device processes the primary data being backed up for deduplication by and storage at the deduplication appliance as the one or more secondary copies.

8. The method of claim 1 further comprising:
in response to instructions to restore a first secondary copy from the deduplication appliance:
by the first computing device, extracting from an associated index, information about the first secondary copy, wherein the information comprises pointers to a second data chunk stored without deduplication at the deduplication appliance, wherein the second data chunk comprises metadata for the first secondary copy and further comprises one or more pointers to corresponding one or more first data chunks stored with deduplication at the deduplication appliance, and wherein a given first data chunk comprises payload data of the first secondary copy;
by the first computing device, causing the deduplication appliance to transmit to the first computing device a fourth data stream that comprises the second data chunk;
by the first computing device, causing the deduplication appliance to transmit to the first computing device a fifth data stream that comprises the one or more first data chunks pointed to by the one or more pointers of the second data chunk, wherein the deduplication appliance rehydrates at least some of the first data chunks before transmitting the fifth data stream to the first computing device; and
by the first computing device processing the first data chunks and the metadata in the second data chunk to generate a sixth data stream that restores the first secondary copy into primary data.

9. The method of claim 1 further comprising:
in response to instructions to restore a first secondary copy from the deduplication appliance:
by the first computing device, extracting from an associated index a second data chunk, wherein the second data chunk comprises metadata for the first secondary copy and further comprises one or more pointers to corresponding one or more first data chunks stored with deduplication at the deduplication appliance, and wherein a given first data chunk comprises payload data of the first secondary copy;
by the first computing device, causing the deduplication appliance to transmit to the first computing device a fourth data stream that comprises the one or more first data chunks pointed to by the one or more pointers of the second data chunk, wherein at least some of the first data chunks are rehydrated by the deduplication appliance before transmitting the fourth data stream to the first computing device; and
by the first computing device processing the first data chunks and the metadata in the second data chunk to generate a sixth data stream that restores the first secondary copy into primary data.

10. The method of claim 1, wherein a storage manager instructs the first computing device to process the primary data being backed up for further processing by and storage at the deduplication appliance as the one or more secondary copies, and wherein the storage manager executes on one of: the first computing device and a second computing device distinct from the first computing device.

11. A system comprising:
a first computing device comprising one or more hardware processors and computer memory;
wherein the first computing device is programmed to:
generate without deduplication a first data stream transmitted to a deduplication appliance, wherein the deduplication appliance comprises one or more data storage devices and is capable of performing deduplication, wherein the first data stream comprises first data chunks and does not comprise second data chunks and third data chunks,
wherein each first data chunk comprises payload data from primary data being backed up into one or more secondary copies that are to be stored at the deduplication appliance;
generate without deduplication a second data stream transmitted to the deduplication appliance, wherein the second data stream comprises the second data chunks and does not comprise the first data chunks and the third data chunks,
wherein each second data chunk comprises metadata for the primary data being backed up and further wherein each second data chunk points to one or more first data chunks of the first data stream;
generate without deduplication a third data stream transmitted to the deduplication appliance, wherein the third data stream comprises the third data chunks and does not comprise the first data chunks and the second data chunks,
wherein each third data chunk points to a corresponding second data chunk of the second data stream; and
instruct the deduplication appliance: to apply deduplication to the first data chunks of the first data stream, which results in deduplicated first data chunks, to store the deduplicated first data chunks at the deduplication appliance, to store the second data chunks of the second data stream at the deduplication appliance without applying deduplication thereto, and to store the third data chunks of the third data stream at the deduplication appliance without applying deduplication thereto.

12. The system of claim 11, wherein the first computing device is further programmed to store, in an associated index, contents of the third data chunks which point to the corresponding second data chunks of the second data stream.

13. The system of claim 11, wherein the first computing device is further programmed to:
store, in an index, which is associated with the first computing device, contents of the third data chunks, wherein the contents point to the corresponding second data chunks of the second data stream; and
add to the index the metadata for the primary data from the second data chunks.

14. The system of claim 11, wherein a given second data chunk includes an offset of a corresponding first data chunk within the first data stream, and
wherein a given third data chunk includes an offset of the corresponding second data chunk within the second data stream.

15. The system of claim 11, wherein the first computing device is further programmed to:
execute a media agent that generates the first data stream, the second data stream, and the third data stream,
execute a data agent that accesses the primary data being backed up, and
process the primary data being backed up for deduplication by, and for storage at, the deduplication appliance as the one or more secondary copies.

16. The system of claim 11, wherein the first computing device is further programmed to:
in response to instructions to restore a first secondary copy from the deduplication appliance:
extract from an associated index a second data chunk, which comprises metadata for the first secondary copy and further comprises one or more pointers to corresponding one or more first data chunks stored with deduplication at the deduplication appliance, and wherein a given first data chunk comprises payload data of the first secondary copy;

cause the deduplication appliance to transmit to the first computing device a fourth data stream that comprises the one or more first data chunks pointed to by the one or more pointers in the second data chunk, wherein at least some of the first data chunks are rehydrated by the deduplication appliance before transmitting the fourth data stream to the first computing device; and process the first data chunks and the metadata in the second data chunk to generate a sixth data stream that restores the first secondary copy into primary data.

17. A computer-implemented method comprising:

by a first computing device comprising one or more hardware processors and computer memory, receiving instructions to generate an auxiliary copy that is based on a secondary copy that is stored in a deduplication appliance, wherein the deduplication appliance is distinct from and in communication with the first computing device, and wherein the deduplication appliance comprises one or more data storage devices and is capable of self-managed deduplication; and responsive to the instructions to generate the auxiliary copy:

accessing an index that comprises index data chunks, wherein each index data chunk points to a corresponding metadata chunk previously transmitted by the first computing device to the deduplication appliance when the secondary copy was initially created, wherein each metadata chunk comprises metadata about the secondary copy and one or more pointers to corresponding one or more payload data chunks of the secondary copy previously transmitted by the first computing device to the deduplication appliance when the secondary copy was initially created, and wherein each payload data chunk is stored with deduplication at the deduplication appliance and comprises payload data of the secondary copy;

based on the index, determining a first set of index data chunks corresponding to the secondary copy;

transmitting the first set of index data chunks corresponding to the secondary copy to the deduplication appliance; and instructing the deduplication appliance to generate the auxiliary copy based on (i) a set of metadata chunks at the deduplication appliance that are pointed to by the first set of index data chunks, and further based on (ii) a set of payload data chunks at the deduplication appliance that are pointed to by the set of metadata chunks, wherein to generate the auxiliary copy, the first computing device does not transmit the set of payload data chunks to the deduplication appliance; and wherein the auxiliary copy is generated by the deduplication appliance, based on the set of metadata chunks and the set of payload data chunks that are stored at the deduplication appliance.

18. The method of claim 17, wherein the index further comprises the set of metadata chunks.

19. The method of claim 17, wherein the index further comprises the set of metadata chunks, and further comprising:

further based on the index, determining the set of metadata chunks pointed to by the first set of index data chunks;

generating a second data stream transmitted to the deduplication appliance, wherein the second data stream comprises the set of metadata chunks.

20. The method of claim 17, further comprising:

based on the index, generating a second data stream transmitted to a second deduplication appliance, which is distinct from the deduplication appliance, wherein the second data stream comprises the first set of index data chunks corresponding to the secondary copy;

instructing the second deduplication appliance to generate and store a second auxiliary copy based on: (a) the set of metadata chunks, which are stored at the deduplication appliance and are pointed to by the first set of index data chunks and further based on (b) the set of payload data chunks pointed to by the set of metadata chunks and which are also stored at the deduplication appliance, wherein to generate the second auxiliary copy, the first computing device does not transmit the set of payload data chunks to either one of the deduplication appliance and the second deduplication appliance; and wherein the second auxiliary copy is generated by the second deduplication appliance, and wherein the second deduplication appliance obtains the set of metadata chunks and the set of payload data chunks for the second auxiliary copy from the deduplication appliance.

* * * * *